(12) United States Patent
Moon et al.

(10) Patent No.: US 9,999,074 B2
(45) Date of Patent: Jun. 12, 2018

(54) METHOD AND APPARATUS FOR TRANSMITTING DOWNLINK REFERENCE SIGNAL AND METHOD AND APPARATUS FOR TRANSMITTING CONTROL INFORMATION IN COOPERATIVE MULTI-POINT COMMUNICATION SYSTEM

(71) Applicant: ELECTRONICS AND TELECOMMUNICATIONS RESEARCH INSTITUTE, Daejeon (KR)

(72) Inventors: Sung-Hyun Moon, Daejeon (KR); Cheulsoon Kim, Daejeon (KR); Wooram Shin, Daejeon (KR); Gi Yoon Park, Daejeon (KR); Young Jo Ko, Daejeon (KR); Junyoung Nam, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days. days.

(21) Appl. No.: 15/316,544

(22) PCT Filed: Jan. 29, 2016

(86) PCT No.: PCT/KR2016/001014
§ 371 (c)(1),
(2) Date: Dec. 6, 2016

(87) PCT Pub. No.: WO2016/122257
PCT Pub. Date: Aug. 4, 2016

(65) Prior Publication Data
US 2017/0202014 A1    Jul. 13, 2017

(30) Foreign Application Priority Data

Jan. 30, 2015   (KR) .................. 10-2015-0015603
Feb. 6, 2015    (KR) .................. 10-2015-0018919
(Continued)

(51) Int. Cl.
*H04W 74/00*    (2009.01)
*H04B 7/06*     (2006.01)
(Continued)

(52) U.S. Cl.
CPC ........ *H04W 74/006* (2013.01); *H04B 7/0626* (2013.01); *H04L 5/005* (2013.01); *H04L 47/824* (2013.01)

(58) Field of Classification Search
CPC .... H04W 74/006; H04B 7/0628; H04L 5/005; H04L 47/824
(Continued)

(56) References Cited

U.S. PATENT DOCUMENTS 8,634,363 B2   1/2014  Kim et al.
8,964,705 B2   2/2015  Xu et al.
(Continued)

FOREIGN PATENT DOCUMENTS

KR   10-2011-0083445 A   7/2011
KR   10-2014-0041359 A   4/2014
(Continued)

OTHER PUBLICATIONS

3GPP TS 36.211 V12.6.0, 3rd Generation Partnership Project; Technical Specification Group Radio Access Network; Evolved Universal Terrestrial Radio Access (E-UTRA); Physical channels and modulation (Release 12), pp. 1-136, Jun. 2015.
(Continued)

*Primary Examiner* — Khai M Nguyen
(74) *Attorney, Agent, or Firm* — Rabin & Berdo, P.C.

(57) ABSTRACT

A method for a base station to configure a channel state information (CSI)-reference signal (RS) is provided. The
(Continued)

base station configures a CSI-RS antenna port for a terminal. The base station selects one of at least one port number mapping rule for mapping a port number on the CSI-RS antenna port for the terminal. The base station notifies the terminal of the selected port number mapping rule.

17 Claims, 46 Drawing Sheets

(30) Foreign Application Priority Data

| Apr. 10, 2015 | (KR) | 10-2015-0051184 |
|---|---|---|
| May 7, 2015 | (KR) | 10-2015-0064053 |
| Jun. 26, 2015 | (KR) | 10-2015-0091400 |
| Jul. 24, 2015 | (KR) | 10-2015-0105272 |
| Aug. 13, 2015 | (KR) | 10-2015-0114925 |
| Aug. 13, 2015 | (KR) | 10-2015-0114927 |
| Jan. 4, 2016 | (KR) | 10-2016-0000596 |
| Jan. 13, 2016 | (KR) | 10-2016-0004344 |
| Jan. 28, 2016 | (KR) | 10-2016-0011000 |

(51) Int. Cl.
 *H04L 5/00* (2006.01)
 *H04L 12/911* (2013.01)

(58) Field of Classification Search
 USPC .................................................. 455/455, 450
 See application file for complete search history.

(56) References Cited

U.S. PATENT DOCUMENTS

| 9,077,519 | B2 | 7/2015 | Kim et al. | |
| 9,325,443 | B2* | 4/2016 | Kishiyama | H04J 11/0026 |
| 2010/0157918 | A1 | 6/2010 | Kim et al. | |
| 2011/0176634 | A1* | 7/2011 | Yoon | H04L 5/0023 |
| | | | | 375/295 |
| 2012/0046033 | A1 | 2/2012 | Ko et al. | |
| 2012/0127945 | A1* | 5/2012 | Ko | H04B 7/0413 |
| | | | | 370/329 |
| 2012/0269285 | A1 | 10/2012 | Jeong et al. | |
| 2013/0044727 | A1* | 2/2013 | Nory | H04L 5/0092 |
| | | | | 370/330 |
| 2013/0070719 | A1 | 3/2013 | Xu et al. | |
| 2013/0100901 | A1 | 4/2013 | Shan et al. | |
| 2013/0135984 | A1 | 5/2013 | Choi et al. | |
| 2013/0229992 | A1 | 9/2013 | Yue et al. | |
| 2014/0098689 | A1 | 4/2014 | Lee et al. | |
| 2014/0192917 | A1 | 7/2014 | Nam et al. | |
| 2014/0204853 | A1 | 7/2014 | Ko et al. | |
| 2015/0103801 | A1* | 4/2015 | Nam | H04L 5/0016 |
| | | | | 370/330 |
| 2015/0124758 | A1 | 5/2015 | Kim et al. | |
| 2015/0173049 | A1 | 6/2015 | Chen et al. | |
| 2015/0288497 | A1* | 10/2015 | Li | H04B 7/0413 |
| | | | | 370/329 |
| 2015/0312927 | A1 | 10/2015 | Ko et al. | |
| 2015/0341093 | A1* | 11/2015 | Ji | H04B 1/707 |
| | | | | 375/267 |
| 2016/0021551 | A1 | 1/2016 | Park et al. | |
| 2016/0112167 | A1* | 4/2016 | Xu | H04L 5/005 |
| | | | | 370/329 |
| 2016/0142189 | A1* | 5/2016 | Shin | H04L 5/0048 |
| | | | | 370/329 |

FOREIGN PATENT DOCUMENTS

| WO | WO-2014-069821 A1 | 5/2014 |
| WO | WO-2014-073846 A1 | 5/2014 |
| WO | WO-2014-157824 A1 | 10/2014 |
| WO | WO-2014-161145 A1 | 10/2014 |

OTHER PUBLICATIONS

3GPP TS 36.212 V12.5.0, 3rd Generation Partnership Project; Technical Specification Group Radio Access Network; Evolved Universal Terrestrial Radio Access (E-UTRA); Multiplexing and channel coding (Release 12), pp. 1-94, Jun. 2015.

3GPP TS 36.213 V12.6.0, 3rd Generation Partnership Project; Technical Specification Group Radio Access Network; Evolved Universal Terrestrial Radio Access (E-UTRA); Physical layer procedures (Release 12), pp. 1-241, Jun. 2015.

3GPP TS 36.214 V12.2.0, 3rd Generation Partnership Project; Technical Specification Group Radio Access Network; Evolved Universal Terrestrial Radio Access (E-UTRA); Physical layer; Measurements (Release 12), pp. 1-17, Mar. 2015.

3GPP TR 36.819 V11.2.0, 3rd Generation Partnership Project; Technical Specification Group Radio Access Network; Coordinated multi-point operation for LTE physical layer aspects (Release 11), pp. 1-70, Sep. 2013.

3GPP TS 36.331 V12.3.0, 3rd Generation Partnership Project; Technical Specification Group Radio Access Network; Evolved Universal Terrestrial Radio Access (E-UTRA); Radio Resource Control (RRC); Protocol specification (Release 12), pp. 1-378, Sep. 2014.

R1-157908, 3GPP TSG-RAN Meeting #83 Anaheim, CA, USA, Nov. 15-22, 2015.

R1-154396, 3GPP TSG RAN WG1 Meeting #82 Beijing, China, Aug. 24-28, 2015.

R1-153007, 3GPP TSG RAN WG1 Meeting #81 Fukuoka, Japan, May 25-29, 2015.

\* cited by examiner

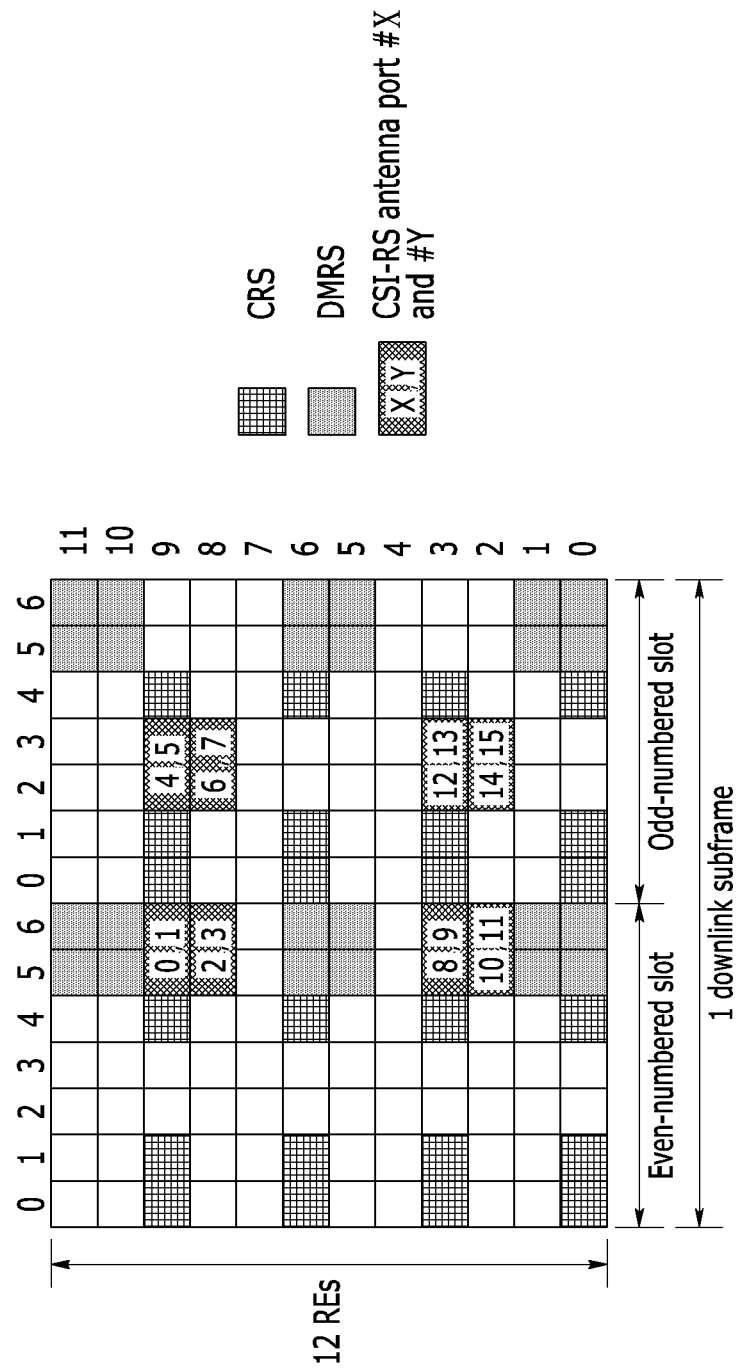

(a1)

(b3)

(Case-A)　　　(Case-B)

(Case-A)　　　(Case-B)

METHOD AND APPARATUS FOR TRANSMITTING DOWNLINK REFERENCE SIGNAL AND METHOD AND APPARATUS FOR TRANSMITTING CONTROL INFORMATION IN COOPERATIVE MULTI-POINT COMMUNICATION SYSTEM

TECHNICAL FIELD

The present invention relates to a method and apparatus for transmitting a downlink reference signal.

Further, the present invention relates to a method and apparatus for measuring channel state information.

In addition, the present invention relates to a method and apparatus for transmitting control information in a cooperative multi-point communication system.

BACKGROUND ART

A multiple-input multiple-output (MIMO) scheme of a wireless communication system is a transmitting/receiving method using a plurality of transmitting antennas and a plurality of receiving antennas. In the MIMO system, a plurality of radio channel paths are generated between transmitting and receiving antennas, and transmitting/receiving ends separate them or combine them to increase data transmission capacity or improve transmission quality. The MIMO scheme includes a spatial multiplexing scheme and a spatial diversity scheme. A downlink MIMO scheme introduced to a long term evolution (LTE) system includes transmit diversity, cyclic delay diversity (CDD), beamforming, and spatial multiplexing schemes. Also, a multiuser MIMO (MU-MIMO) scheme for simultaneously transmitting data to a plurality of terminals from an identical resource is supported.

An antenna port of the LTE standard is a logical antenna unit realized by a weighted sum of one or a plurality of physical antenna elements, and is generally defined by the transmitting end. The antenna port is a basic unit by which a reference signal (RS) is transmitted. Therefore, a terminal estimates a channel not for the physical antenna element but for each antenna port, and measures and reports channel state information (CSI) based upon it. Different antenna port numbers are assigned to a cell-specific RS (CRS), a user equipment-specific RS (URS), and a CSI-RS that are LTE downlink reference signals, respectively. A purpose of the URS is to decode a physical downlink shared channel (PDSCH) of the terminal, so the URS is also called a demodulation RS (DMRS). The antenna port number for the CRS may be 0 to 3, the antenna port number for the URS may be 7 to 14, and the antenna port number for the CSI-RS may be 15 to 22. Mapping between the antenna port and the physical antenna element(s) is referred to as antenna virtualization. The terminal may not basically know which virtualization is applied to each antenna port.

The CSI-RS is a downlink reference signal transmitted by a base station so that the terminal may acquire CSI, and it is introduced in LTE Release 10. The CSI-RS is also referred to as a non-zero-power (NZP) CSI-RS in order to distinguish it from a zero-power (ZP) CSI-RS to be described. In the existing Release 8/9 system, the CRS is used to acquire CSI of the terminal, and starting from Release 10, an introduction of a new reference signal for channel estimation with lower density than the existing CRS is needed so as to support downlink transmission of up to 8 layers. CSI-RS configuring information is transmitted to the terminal through user equipment-specific radio resource control (RRC) signaling. Numbers of CSI-RS antenna ports configurable for the terminal are 1, 2, 4, 8, 12, and 16 up to the present Release 13. Regarding the number of CSI-RS antenna ports, numbers of total REs occupied by transmission of CSI-RS per pair of physical resource blocks (PRBs) are 2, 2, 4, 8, 12, and 16.

A transmission period of CSI-RS on a time axis may be configured as 5, 10, 20, 40, or 80 ms. According to the present standard, each CSI-RS antenna port has a gap of 12 resource elements (REs) on a frequency axis.

In order for a base station to perform three-dimensional beamforming in a full dimension (FD)-MIMO (or three-dimensional MIMO) system, the terminal needs to measure and report CSI on a vertical axis in addition to existing CSI on a horizontal axis. Methods for increasing the number of CSI-RS antenna ports configurable to the terminal when a size of two-dimensional antenna array is large have been researched.

Further, the existing terminal only recognizes the CSI-RS antenna port array as one dimension. Methods for the terminal to recognize the CSI-RS antenna port array as two dimensions (2D) or three dimensions (3D) are necessary.

DISCLOSURE

Technical Problem

The present invention has been made in an effort to provide a method and apparatus for configuring a CSI-RS and transmitting the same in a MIMO wireless communication system.

The present invention has been made in another effort to provide a method and apparatus for increasing a number of CSI-RS antenna ports configurable to a terminal.

The present invention has been made in another effort to provide a method and apparatus for recognizing a CSI-RS antenna port array as one-dimensional or multi-dimensional.

The present invention has been made in another effort to provide a method and apparatus for configuring control information for cooperative multi-point communication so as to reduce a CSI-RS transmission overhead in a wireless communication system.

The present invention has been made in another effort to provide a method and apparatus for extending an RE configurable as a CSI-RS resource.

The present invention has been made in another effort to provide a method and apparatus for transmitting a CSI-RS by using the extended RE.

Technical Solution

An exemplary embodiment of the present invention provides a method for a base station to configure a channel state information (CSI)-reference signal (RS). The method for configuring a CSI-RS by the base station includes: configuring a CSI-RS antenna port for a terminal; selecting, for the terminal, one of at least one port number mapping rule for mapping a port number on the CSI-RS antenna port; and notifying the terminal of the selected port number mapping rule.

The configuring of a CSI-RS antenna port for the terminal may include configuring CSI-RS antenna port array in which the CSI-RS antenna port is disposed on at least two of a first axis, a second axis, and a third axis.

An axis order for mapping a port number on the first axis, the second axis, and the third axis may be preconfigured irrespective of the selected port number mapping rule.

The configuring of a CSI-RS antenna port for the terminal may further include transmitting at least one of a number of CSI-RS antenna ports disposed on the first axis, a number of CSI-RS antenna ports disposed on the second axis, and a number of CSI-RS antenna ports disposed on the third axis from among the CSI-RS antenna ports included in the CSI-RS antenna port array to the terminal.

The configuring of a CSI-RS antenna port for the terminal may further include omitting the transmitting of the number of CSI-RS antenna ports disposed on one axis to the terminal when the number of CSI-RS antenna ports disposed on the one axis of the first axis, the second axis, and the third axis is identical with the number of entire CSI-RS antenna ports configured to the terminal.

The configuring of a CSI-RS antenna port for the terminal may further include: finding a first value by summing the number of CSI-RS antenna ports disposed on the first axis and the number of CSI-RS antenna ports disposed on the third axis from among the CSI-RS antenna ports included in the CSI-RS antenna port array; and transmitting at least one of the number of CSI-RS antenna ports disposed on the second axis from among the CSI-RS antenna ports included in the CSI-RS antenna port array and the first value to the terminal.

The selected port number mapping rule, in the case of channel estimation by the terminal, may allow the terminal to divide entire CSI-RS antenna ports configured to the terminal into CSI-RS antenna port groups of a number that corresponds to the selected port number mapping rule, and provide a port number to the CSI-RS antenna port belonging to each of the CSI-RS antenna port groups according to the preconfigured axis order for the respective CSI-RS antenna port groups.

The number of CSI-RS antenna ports belonging to each of the CSI-RS antenna port groups may be a submultiple of the number of entire CSI-RS antenna ports configured to the terminal.

The notifying of the terminal of a selected port number mapping rule may include transmitting a bit code for indicating the selected port number mapping rule to the terminal.

The notifying of the terminal of a selected port number mapping rule may include transmitting a bit code for indicating the number of the CSI-RS antenna port groups generated according to the selected port number mapping rule to the terminal.

The number of entire CSI-RS antennas configured to the terminal may be greater than 8.

The first axis may be a horizontal axis, the second axis may be a vertical axis, and the third axis may be a polarization axis.

The method for configuring a CSI-RS of the base station may further include: selecting, for the terminal, one of axis orders for mapping a port number on a first axis, a second axis, and a third axis; and notifying the terminal of the selected axis order.

The configuring of a CSI-RS antenna port for a terminal may include configuring CSI-RS antenna port array in which the CSI-RS antenna port is disposed on at least two of the first axis, the second axis, and the third axis.

Another embodiment of the present invention provides a method for a terminal to measure channel state information (CSI). The method for measuring CSI by the terminal includes: receiving a first port number mapping rule for a CSI-reference signal (RS) antenna port from a base station; dividing the CSI-RS antenna ports into CSI-RS antenna port groups by a number that corresponds to the first port number mapping rule based on the first port number mapping rule; providing a port number to the CSI-RS antenna port belonging to each of the CSI-RS antenna port groups for the respective CSI-RS antenna port groups; and performing channel estimation on the CSI-RS antenna port to which the port number is provided.

The method for measuring CSI of the terminal may further include: again providing a port number to the CSI-RS antenna port according to a second port number mapping rule that is different from the first port number mapping rule; and performing a CSI measurement on the CSI-RS antenna port to which the port number is again provided based on a result of the channel estimation.

The receiving of a first port number mapping rule may include receiving a bit code for indicating the first port number mapping rule from the base station.

The CSI-RS antenna port may be disposed on at least two of a first axis, a second axis, and a third axis.

The providing of a port number to the CSI-RS antenna port includes: providing a port number to the CSI-RS antenna port belonging to a first CSI-RS antenna port group from among the CSI-RS antenna port groups according to an axis order for providing a port number to the first axis, the second axis, and the third axis; and providing a port number to the CSI-RS antenna port belonging to a second CSI-RS antenna port group from among the CSI-RS antenna port groups according to the axis order.

The first port number provided to the second CSI-RS antenna port group may be a port number that is next to a last port number provided to the first CSI-RS antenna port group.

The other embodiment of the present invention provides a method for a terminal to measure channel state information (CSI). The method for measuring CSI by a terminal includes: allowing configuration with a CSI-reference signal (RS) antenna port from a base station; receiving port number providing state information on the CSI-RS antenna port from the base station; providing a port number to part of the CSI-RS antenna ports based on the port number providing state information; and measuring CSI by using the CSI-RS antenna port to which a port number is provided.

The receiving of port number providing state information may include receiving a bitmap having a length that corresponds to the number of the CSI-RS antenna ports and indicating a port number providing state for each of the CSI-RS antenna ports from the base station.

The providing of a port number to part of the CSI-RS antenna ports may include providing a port number to the CSI-RS antenna port corresponding to a bit with a first value from among bits belonging to the bitmap.

The receiving of port number providing state information may include receiving a bitmap having a length that is half the number of the CSI-RS antenna ports and indicating a port number providing state for each CSI-RS antenna port pair from the base station.

The providing of a port number to part of the CSI-RS antenna ports may include providing port numbers to the CSI-RS antenna port pair corresponding to a bit with a first value from among the bits belonging to the bitmap.

The CSI-RS antenna port pair may include two CSI-RS antenna ports transmitted through a same resource element (RE).

The CSI-RS antenna port may be included in CSI-RS antenna port array, and may be disposed on at least two of a first axis, a second axis, and a third axis.

The receiving of port number providing state information may include receiving a bitmap having a length that corresponds to a sum of the number of CSI-RS antenna ports disposed on the first axis and the number of CSI-RS antenna ports disposed on the second axis and indicating a port number providing state on respective rows and respective columns of the CSI-RS antenna port array from the base station.

The method for measuring CSI by a terminal may further include assuming that it is possible to receive a physical downlink shared channel (PDSCH) from a remainder except for an RE (resource element) for the CSI-RS antenna port to which the port number is provided from among the REs for the entire CSI-RS antenna ports configured to the terminal.

Advantageous Effects

According to an exemplary embodiment of the present invention, the base station may configure a plurality of channel-estimating RS antenna ports to the terminal for the purpose of estimating channels, and may transmit the same to the terminal in the MIMO antenna communication system.

According to an exemplary embodiment of the present invention, the number of CSI-RS antenna ports configurable to the terminal may be increased.

According to an exemplary embodiment of the present invention, the terminal may recognize the CSI-RS antenna port array as one-dimensional or multi-dimensional (e.g., two-dimensional or three-dimensional). That is, the terminal may recognize the port number of the one-dimensional or multi-dimensional (e.g., two-dimensional or three-dimensional) CSI-RS antenna port configured to the terminal.

According to an exemplary embodiment of the present invention, the base station may efficiently configure the CSI-RS and may efficiently transmit the CSI-RS according to it.

According to an exemplary embodiment of the present invention, part of the non-zero-power (NZP) CSI-RS resource region configured for a CSI report of the terminal is used so as to receive the physical downlink shared channel (PDSCH) of the corresponding terminal, thereby solving the CSI-RS transmission overhead problem and preventing deterioration of the data rate caused by a reduction of the PDSCH transmission resource.

According to an exemplary embodiment of the present invention, the base station may configure PDSCH rate matching information and quasi-co-location (QCL) information to the terminal, and by use of this, the base station and the terminal may perform a PDSCH transmission.

According to an exemplary embodiment of the present invention, the RS (e.g., CSI-RS) for channel estimation is configured by using a plurality of PRB pairs provided near the frequency axis to thus extend the resource pool for the RS for channel estimation. Through this, the full-dimension (FD)-MIMO system may efficiently transmit the RS for channel estimation.

DESCRIPTION OF THE DRAWINGS

FIG. 26C, FIG. 26D, FIG. 26E, and FIG. 26F show a case in which a terminal maps CSI-RS antenna port numbers on REs composing a CSI-RS RE set when a base station notifies the terminal of one of port number mappings shown in FIG. 26A by a method Mc221 according to an exemplary embodiment of the present invention.

MODE FOR INVENTION

Figure 1:
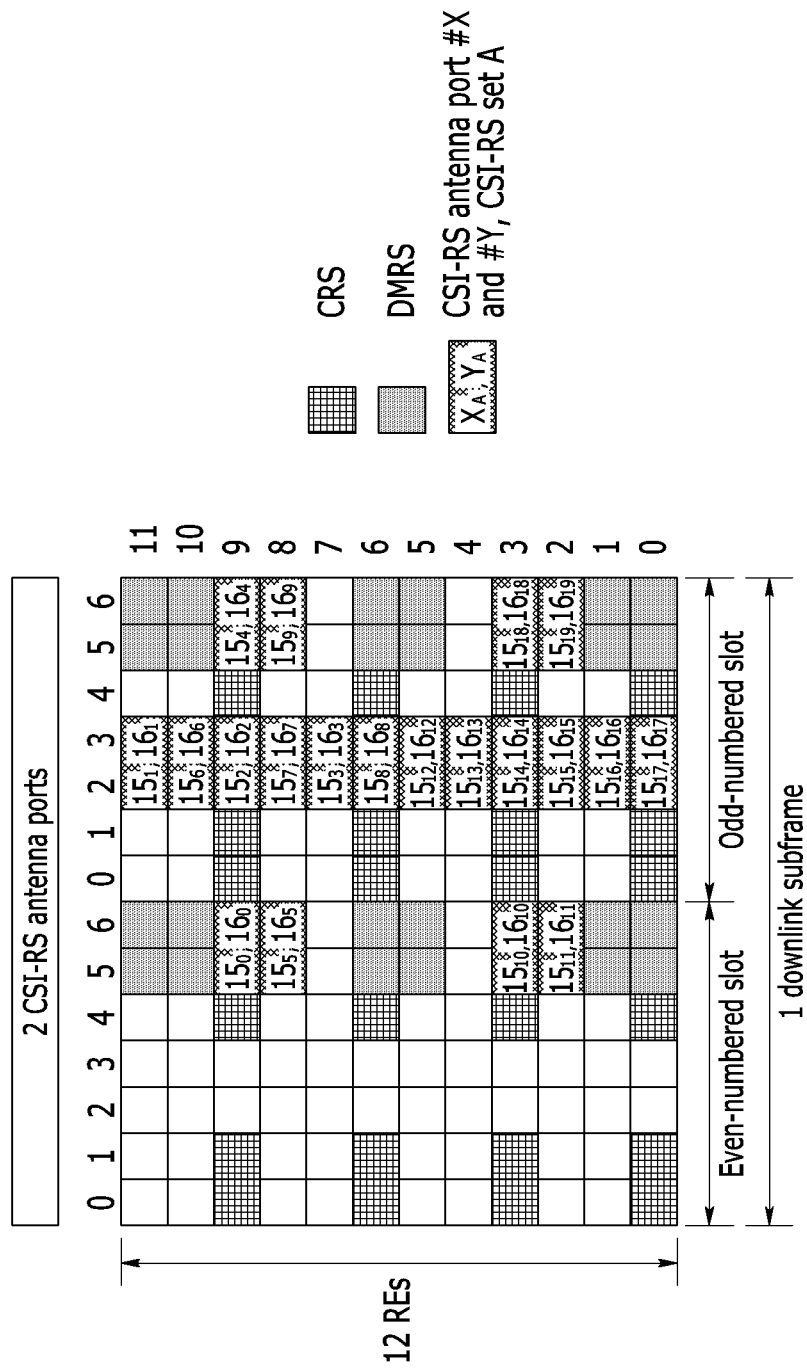
FIG. 1 shows mapping of a CSI-RS resource element (RE) set when a number of CSI-RS antenna ports is 2.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may indicate a mobile terminal, a mobile station, an advanced mobile station, a high reliability mobile station, a subscriber station, a portable subscriber station, an access terminal, or user equipment, and it may include entire or partial functions of the terminal, the mobile terminal, the mobile station, the advanced mobile station, the high reliability mobile station, the subscriber station, the portable subscriber station, the access terminal, or the user equipment.

In addition, a base station (BS) may indicate an advanced base station, a high reliability base station, a node B, an evolved node B (eNodeB), an access point, a radio access station, a base transceiver station, a mobile multihop relay (MMR)-BS, a relay station functioning as a base station, a high reliability relay station functioning as a base station, a repeater, a macro base station, or a small base station, and it may include entire or partial functions of the base station, the advanced base station, the HR-BS, the nodeB, the eNodeB, the access point, the radio access station, the base transceiver station, the MMR-BS, the relay station, the high reliability relay station, the repeater, the macro base station, or the small base station.

In the present specification, 'A or B' may include 'A', 'B', or 'both A and B'.

1. A Method for Transmitting Control Information in a Cooperative Multi-Point Communication System In a cell-based wireless communication system, a terminal on a border of a cell generally has a limit in being served with a high data rate because of an interference signal provided by an adjacent cell. A cooperative multi-point (CoMP) transmission technique represents a technique for a plurality of adjacent cells or transmission points (TPs) to cooperate with each other and relax inter-cell interference or avoid the same, thereby increasing the data rate of the terminal on the border of a cell.

For the cooperative multi-point transmission, the terminal may measure downlink channel state information (CSI) on neighboring cell(s) or TP(s) in addition to a serving cell to which the terminal belongs, and may report the same. For this, the base station may configure a plurality of CSI processes to the terminal configured with a transmission mode (TM) 10. One CSI process includes resource configuring information on a CSI-reference signal (RS) for channel estimation and CSI-interference measurement (IM) for interference measurement, and CSI information induced from the respective CSI processes is reported to the base station by the terminal according to independent periodicity and a subframe offset.

When the base station transmits a physical downlink shared channel (PDSCH) to the terminal in an area excluding all the configured NZP CSI-RS resource, the data rate may be reduced because of a decrease of a PDSCH transmission resource. The CSI-RS transmission overhead problem is further remarkable in the full dimension multiple-input multiple-output (FD-MIMO) system, but without being restricted to this, it is also a job to solve when the TPs transmit the CSI-RS within a range supported by existing standards.

Figure 2:
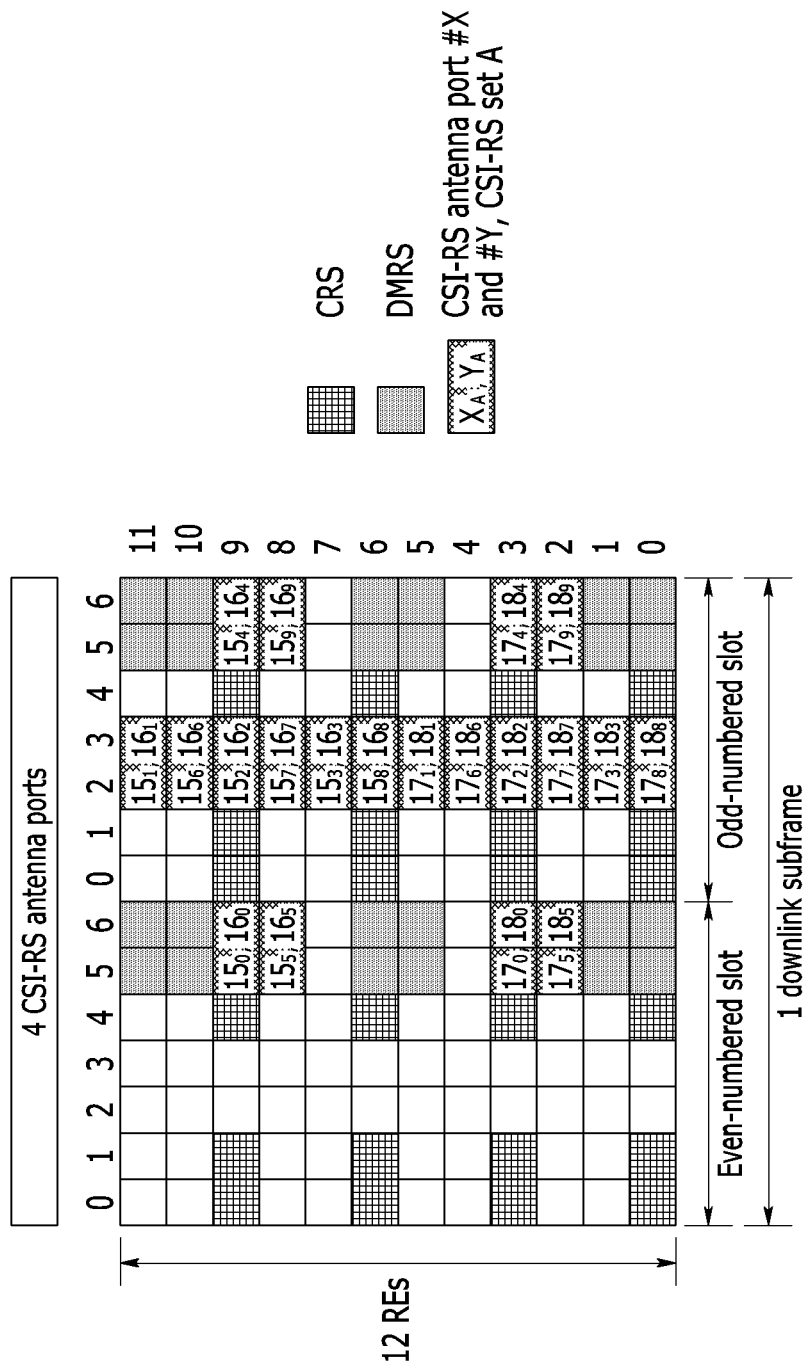
FIG. 2 shows mapping of a CSI-RS RE set when a number of CSI-RS antenna ports is 4.
Figure 3:
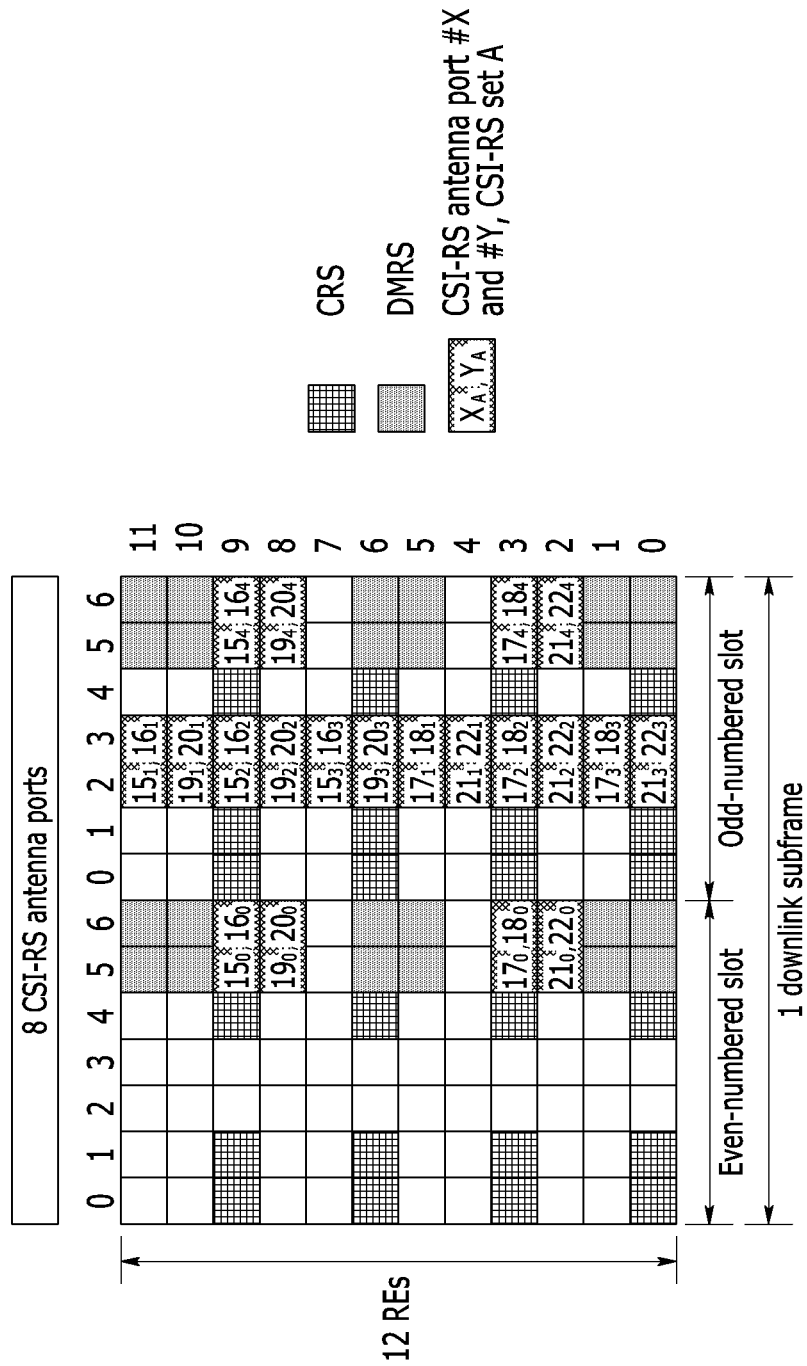
FIG. 3 shows mapping of a CSI-RS RE set when a number of CSI-RS antenna ports is 8.

FIG. 1 shows mapping of a CSI-RS resource element (RE) set when a number of CSI-RS antenna ports is 2, FIG. 2 shows mapping of a CSI-RS RE set when a number of CSI-RS antenna ports is 4, and FIG. 3 shows mapping of a CSI-RS RE set when a number of CSI-RS antenna ports is 8.

Mapping of a resource element (RE) by which the CSI-RS is transmitted may follow a predetermined pattern for each number of antenna ports, and may be configured in a predetermined CSI-RS resource pool. A CSI-RS resource configuration (referred to as a 'CSI-RS configuration' hereinafter) is respectively defined for a normal cyclic prefix (CP) and an extended CP. Further, the CSI-RS configuration is classified as configurable to a frequency division duplex (FDD) and a time division duplex (TDD), and only configurable to the TDD.

FIG. 1 to FIG. 3 show RE mapping for the CSI-RS configurations of numbers 0 to 19 when a normal CP is configured and a number of CSI-RS antenna ports is 2, 4, or 8, respectively.

As exemplified in FIG. 1 to FIG. 3, one downlink subframe includes two time slots. In detail, when the normal CP is configured, one subframe includes an even-numbered time slot (hereinafter, 'slot0') and an odd-numbered time slot (hereinafter, ' slot1') after the slot0. The slot0 and the slot1 respectively include seven orthogonal frequency division multiplexing (OFDM) symbols (number 0 to number 6) on a time axis and twelve subcarriers (number 0 to number 11) on a frequency axis. That is, the slot0 and the slot1 in a subframe or a physical resource block (PRB) pair respectively have 84 (=7×12) REs. Some of the REs in one subframe or PRB pair may be configured as REs for a CRS transmission, some may be configured as REs for a demodulation reference signal (DMRS) transmission, and some may be configured as REs for a CSI-RS transmission. For example, the CSI-RS antenna ports of the number 15 and the number 16 of the CSI-RS configuration of the number 0 are mapped (configured) on the two REs corresponding to the OFDM symbols of the number 5 and the number 6 of the slot0 and corresponding to the subcarrier of the number 9 in FIG. 1. That is, two CSI-RS antenna ports (the number 15 and the number 16) for the respective CSI-RS configurations of the number 0 to the number 19 are mapped on the two REs. For ease of description, below, the RE corresponding to the OFDM symbol of the number n in the slot and corresponding to the subcarrier of the number k in the PRB pair will be referred to as RE(n, k).

For another example, in FIG. 2, the CSI-RS antenna ports of the number 15 and the number 16 of the CSI-RS configuration of the number 1 are mapped on the RE(2, 11) and the RE(3, 11) of the slot1, and the CSI-RS antenna ports of the number 17 and the number 18 of the CSI-RS configuration of the number 1 are mapped on the RE(2, 5) and the RE(3, 5) of the slot1. That is, four CSI-RS antenna ports (number 15 to number 18) for the respective CSI-RS configurations of the number 0 to number 9 are mapped on four REs.

For the other example, in FIG. 3, the CSI-RS antenna ports of the number 15 and the number 16 of the CSI-RS configuration of the number 0 are mapped on an RE(5, 9) and a RE(6, 9) of the slot0, the CSI-RS antenna ports of the number 17 and the number 18 of the CSI-RS configuration of the number 0 are mapped on the RE(5, 3) and the RE(6, 3) of the slot0, the CSI-RS antenna ports of the number 19 and the number 20 for the CSI-RS configuration of the number 0 are mapped on the RE(5, 8) and the RE(6, 8) of the slot0, and the CSI-RS antenna ports of the number 21 and the number 22 for the CSI-RS configuration of the number 0 are mapped on the RE(5, 2) and the RE(6, 2) of the slot0. That is, eight CSI-RS antenna ports (number 15 to number 22) for the respective CSI-RS configurations of the number 0 to the number 4 are mapped on the eight REs.

Code division multiplexing (CDM) is applied as an inter-antenna-ports multiplexing method between the CSI-RS antenna ports (e.g., CSI-RS antenna ports of the number 15 and the number 16) transmitted through a same RE. For example, in FIG. 1, the CSI-RS antenna ports of the number 15 and the number 16 are transmitted through the RE(5, 9) of the slot0, and the CSI-RS antenna ports of the number 15 and the number 16 are transmitted through the RE(6, 9) of the slot0. In this case, the CDM is applied between the CSI-RS antenna ports of the number 15 and the number 16 so as to distinguish the CSI-RS antenna ports of the number 15 and the number 16 transmitted through a same RE.

Frequency division multiplexing (FDM) is applied as an inter-antenna-port multiplexing method between the CSI-RS antenna ports (e.g., CSI-RS antenna ports of the number 15 and the number 17) transmitted through different REs. For example, in FIG. 2, the CSI-RS antenna port of the number 15 is transmitted through the RE(5, 9) and the RE(6, 9) of the slot0, and the CSI-RS antenna port of the number 17 is transmitted through the RE(5, 3) and the RE(6, 3) of the slot0. In this case, the FDM is applied between the CSI-RS antenna ports of the number 15 and the number 17 so as to distinguish the CSI-RS antenna ports of the number 15 and the number 17 transmitted through different REs.

The CSI-RS set A denoted in the drawings of the present specification signifies the CSI-RS configuration of the number A, and X and Y indicate numbers of the CSI-RS antenna ports. $X_A$ and $Y_A$ denoted in the drawings of the present specification may indicate the CSI-RS antenna ports of the number X and the number Y of the CSI-RS configuration of the number A, or may indicate the CSI-RS antenna ports of the number X and the number Y for a terminal A (here, UE-A is UE-a, UE-b, UE-c, . . . ). In the present specification, transmission of a CSI-RS antenna port or a CSI-RS antenna port of the number X may include transmission of a CSI-RS of the CSI-RS antenna port or a CSI-RS of the CSI-RS antenna port of the number X.

The terminal assumes that the PDSCH is not mapped on the RE configured with a ZP CSI-RS when performing PDSCH rate matching. The ZP CSI-RS may be used for two purposes. First, the base station may improve CSI-RS measuring performance on an adjacent cell by the terminal by not transmitting a signal from the RE by which the CSI-RS of the adjacent cell is transmitted (i.e., by applying muting to the corresponding RE). In this instance, the base station may notify the terminal of the REs to which muting is applied through a ZP CSI-RS configuration. Second, the ZP CSI-RS may be configured for the purpose of configuring a resource for measuring an interference signal of the terminal. According to the present standard, except the terminal to which the Release 12 TDD enhanced interference mitigation & traffic adaptation (eIMTA) is applied, a CSI-IM resource used for measuring an interference signal may always be configured within a range of the ZP CSI-RS resource configured to the terminal.

The LTE standard defined a PDSCH RE mapping and quasi-co-location indicator (PQI) field in a downlink control information (DCI) format 2D for a CoMP-based PDSCH transmission of the transmission mode (TM) 10. Based upon the PQI field, the terminal may acquire RE mapping information of the PDSCH scheduled through the DCI format 2D and quasi-co-location (QCL) information of the PDSCH antenna port. The PQI field is composed with 2 bits, and it may indicate up to four parameter sets depending on a value of a bit string expressed in Table 1.

TABLE 1

PQI field in DCI format 2D

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

Hereinafter, the parameter set will be referred to as a PQI parameter set.

The four PQI parameter sets may respectively include a parameter crs-PortsCount-r11, a parameter crs-FreqShift-r11, a parameter mbsfn-SubframeConfigList-r11, a parameter csi-RS-ConfigZPId-r11, a parameter pdsch-Start-r11, and a parameter qcl-CSI-RS-ConfigNZPId-r11. The PQI parameter set may be configured to the terminal through RRC signaling.

When the base station attempts to support a dynamic point selection (DPS) transmission to the terminal, the respective PQI parameter sets may correspond to different cells or TPs (hereinafter, the cells or TPs will be called TPs). The DPS transmission will be described in detail with reference to FIG. 4.

Figure 4:
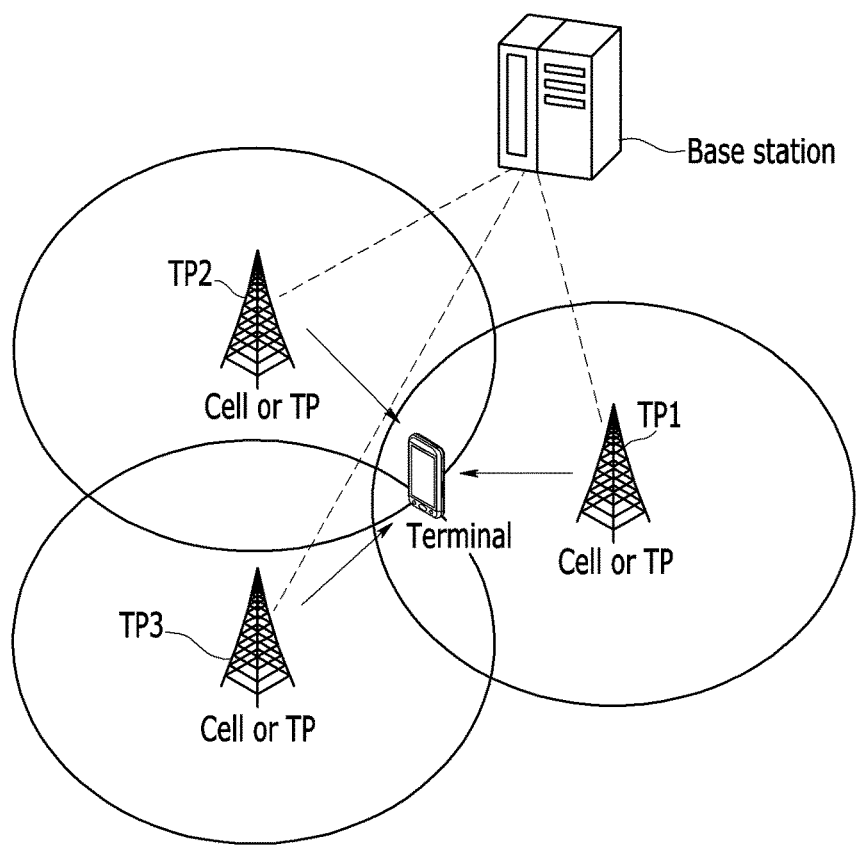
FIG. 4 shows a case when a terminal receives a downlink cooperative transmission from a plurality of TPs.

FIG. 4 shows a case in which a terminal receives a downlink cooperative transmission from a plurality of TPs. For ease of description, FIG. 4 exemplifies the case in which three adjacent TPs (TP1, TP2, and TP3) controlled by a base station cooperate for signal transmission to the terminal.

The base station may configure a CSI-RS and a CSI-IM for the respective TPs (TP1 to TP3) to the terminal using three CSI processes, and the terminal may independently perform a CSI measurement and report on the respective TPs (TP1 to TP3).

The base station selects a TP for transmitting a PDSCH to the terminal from among the TPs (TP1 to TP3) based on the CSI reported by the terminal, and transmits the PDSCH for the corresponding terminal through the selected TP. In this instance, the base station may implicitly notify the terminal of from which TP the corresponding PDSCH is transmitted by indicating the PQI parameter set corresponding to the TP that transmits the PDSCH through the PQI field of the DCI format 2D including PDSCH scheduling information.

The base station may configure the CSI-RSs transmitted by the TPs (TP1 to TP3) so that they may overlap on the same resource and may be transmitted, and the base station may configure the same so that they may be transmitted from different resources in order to avoid interference among them. In the latter case, the respective TPs (TP1 to TP3) may improve CSI-RS channel estimating performance of the terminal by configuring the REs in which the CSI-RS is transmitted by other TPs in the CoMP cooperative set with the ZP CSI-RS and performing muting. A configuration of the CSI-RS resource for the latter case in the DPS transmission is shown in FIG. 5.

Figure 5:
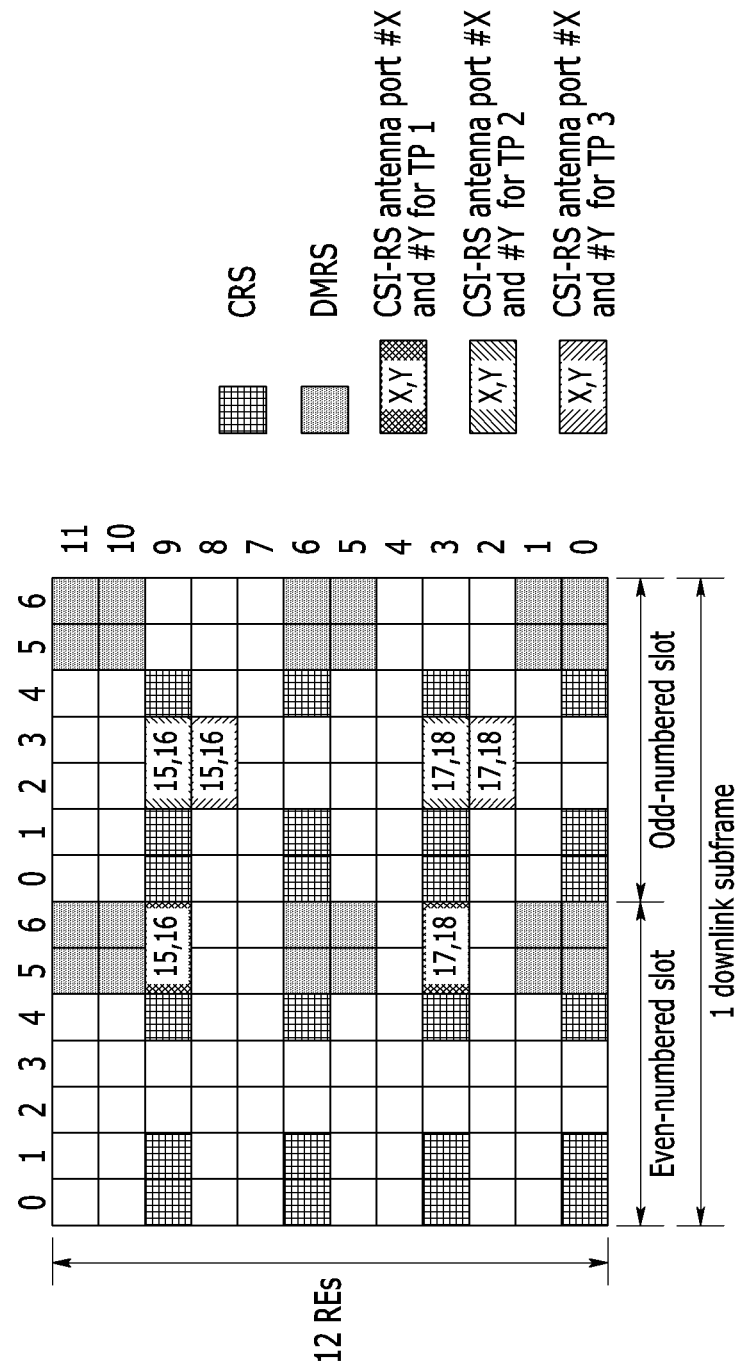
FIG. 5 shows a method for three TPs to configure a CSI-RS resource by using different REs in a subframe.

FIG. 5 shows a method for three TPs (TP1 to TP3) to configure a CSI-RS resource by using different REs in a subframe.

As exemplified in FIG. 5, the NZP CSI-RS RE sets of the three TPs (TP1 to TP3) are configured to different resource regions in one subframe. FIG. 5 exemplifies the case in which the number of CSI-RS antenna ports of the respective TPs (TP1 to TP3) is 4. For example, the CSI-RS antenna ports of the number 15 to the number 18 for the TP (TP1) are mapped on the RE(5, 9), RE(6, 9), RE(5, 3), and RE(6, 3) of the slot0. For another example, the CSI-RS antenna ports of the number 15 to the number 18 for the TP (TP2) are mapped on the RE(2, 9), RE(3, 9), RE(2, 3), and RE(3, 3) of the slot1. For the other example, the CSI-RS antenna ports of the number 15 to the number 18 for the TP (TP3) are mapped on the RE(2, 8), RE(3, 8), RE(2, 2), and RE(3, 2) of the slot1.

Figure 6:
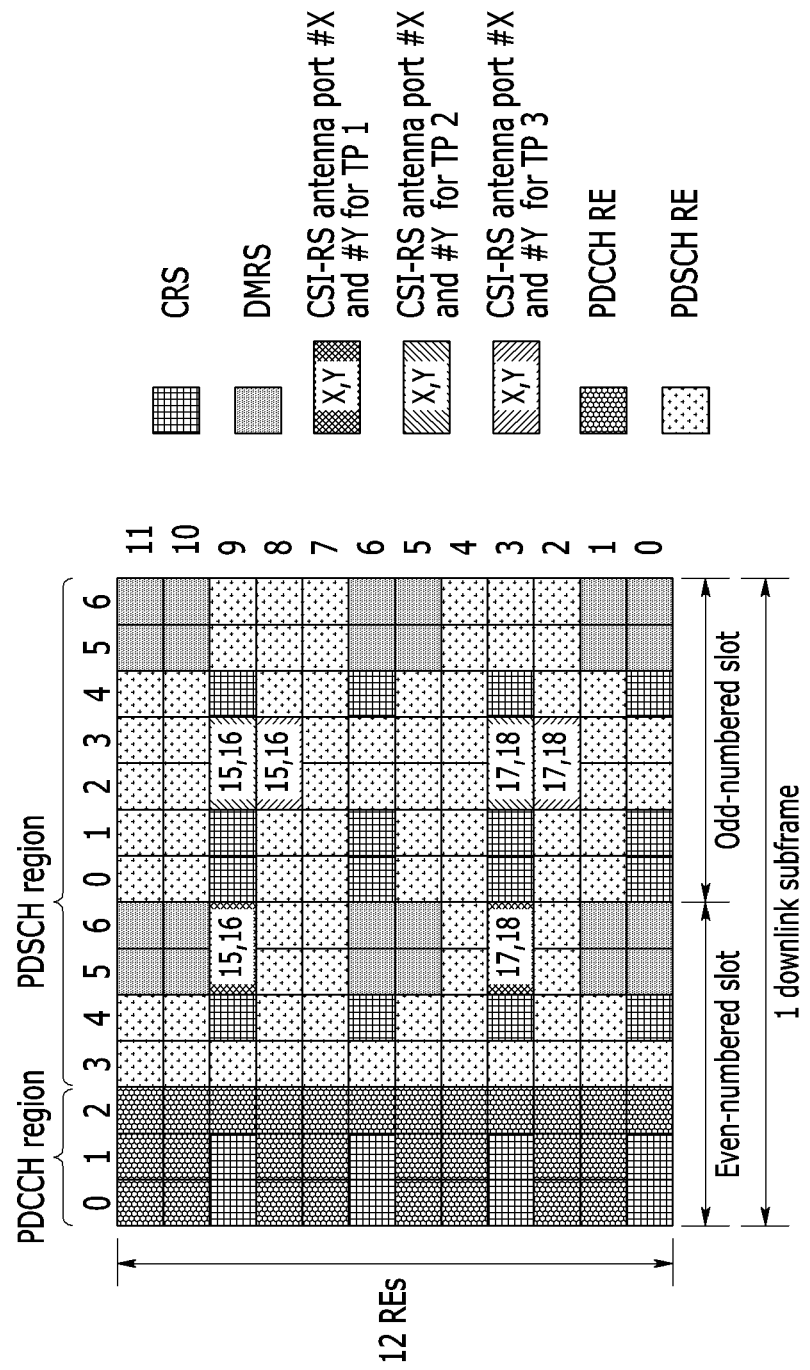
FIG. 6 shows a method for mapping a PDSCH RE for a terminal.

FIG. 6 shows a method for mapping a PDSCH RE for a terminal.

According to the present standard, the terminal receiving a transmission mode 10-based downlink PDSCH assumes that PDSCH data are not transmitted from the entire NZP CSI-RS resource region configured for the respective CSI processes. For example, as shown in FIG. 5, when the terminal is configured with a CRS, a DMRS, and a CSI-RS, the RE mapping of a PDSCH assumed by the terminal may be like an example shown in FIG. 6. FIG. 6 exemplifies the case in which the OFDM symbol number of a physical downlink control channel (PDCCH) region is 3. In detail, some of the REs corresponding to the OFDM symbols of the number 0 to the number 2 of the slot0 are configured as a CRS RE, and the rest are configured as a PDCCH RE. Some of the REs corresponding to the OFDM symbols of the number 3 to the number 6 of the slot0 and the number 0 to the number 6 of the slot1 are configured as a CRS RE, some are configured as a DMRS RE, some are configured as a CSI-RS RE, and the rest are configured as a PDSCH RE. As exemplified in FIG. 6, the PDSCH is not mapped on the CSI-RS RE set of the three TPs (TP1 to TP3).

In the case of the system to which the FD-MIMO is applied, the case in which the respective TPs belonging to the CoMP cooperative set transmit a plurality of CSI-RS antenna ports in order to sufficiently acquire a large antenna array gain. For example, in the example of FIG. 4, three TPs (TP1 to TP3) may transmit 16, 32, or 64 CSI-RS antenna ports, respectively. In this instance, when a CSI-RS transmission periodicity of the respective TPs (TP1 to TP3) is 5 ms, weights of a CSI-RS transmission overhead occupied in the entire downlink resource region are 5.71%, 11.43%, and 22.86%, which are substantial, when the numbers of CSI-RS ports are 16, 32, and 64, respectively. Therefore, when the PDSCH is transmitted in the region in which all the NZP CSI-RS resource configured to the terminal is excluded in a like manner of a prior art, the data rate may be reduced because of a reduction of the PDSCH transmission resource. That is, a combination of the cooperative multi-point transmission scheme and the FD-MIMO may be restrictive. The CSI-RS transmission overhead problem is further remarkable in the FD-MIMO system, and without being limited to this case, it is the same problem to be solved in the case when the TPs transmit the CSI-RS within the range supported by the existing standard.

Hereinafter, a method for solving the problem (e.g., a CSI-RS transmission overhead problem, etc.) will be described. In detail, in order for part of a NZP CSI-RS resource region configured for reporting a CSI by a terminal to be used for receiving a PDSCH of a corresponding terminal, a method for designing downlink control information and a method for signaling downlink control information will now be described. In further detail, various and detailed methods for using a concept of a next method Ma100 will be described.

The method Ma100 is a method for notifying the terminal of whether a PDSCH desired to receive by the terminal is mapped (hereinafter, 'whether a PDSCH is mapped') on the CSI-RS RE set configured to the terminal by the NZP CSI-RS configuration (or NZP CSI-RS ID). The NZP CSI-RS ID is an identifier for indicating the NZP CSI-RS configuration.

According to the Release 12 standard, the CSI process includes one CSI-RS configuration, and the CSI-RS configuration has its own NZP CSI-RS ID. The CSI process introduced in Release-13 for the FD-MIMO is classified into Class-A and Class-B according to a CSI report type. The CSI process for a CSI report of Class-B (hereinafter, 'Class-B CSI process') may include a plurality of NZP CSI-RS configurations, and respective NZP CSI-RS configurations included in the Class-B CSI process have their own NZP CSI-RS ID.

The method Ma100 may be mainly applied to the case when the terminal is configured as the transmission mode (TM) 10 and the PDSCH scheduled by the DCI format 2D is received. Regarding signaling that may be used for the base station to notify the terminal of a PDSCH mapping state in the method Ma100, physical layer signaling (e.g., a control field parameter of a physical layer control channel), media access control (MAC) signaling (e.g., control information in a MAC protocol data unit (PDU) form, or control information in a MAC header form), RRC signaling (e.g., a RRC control message or a control parameter in an information element (IE) form may be considered. Particularly, physical layer signaling or control signaling through a MAC signaling scheme may have merits in that a dynamic resource may be utilized according to a method for composing the same with scheduling information for the corresponding terminal or simultaneously transmitting them. As the other method, a method for notifying the terminal of whether to apply the method Ma100 and configuration information by using RRC signaling, and notifying of a PDSCH mapping on the CSI-RS RE set through physical layer signaling or MAC signaling.

When indicated to receive the PDSCH from the CSI-RS RE set configured by a predetermined NZP CSI-RS configuration based on the method Ma100, the terminal may expect to receive a mixed signal of the CSI-RS and the PDSCH from the corresponding RE set. In this instance, the terminal may expect that the CSI-RS and the PDSCH may be transmitted from different TPs in the CoMP cooperative set. This may be explicitly defined in the standard, and it is also possible for the terminal to be implicitly notified of it according to a PDSCH receiving indication based on the method Ma100 without explicit disclosure in the standard. Therefore in this case, the terminal may perform CSI-RS-based channel estimation and PDSCH data detection and demodulation in the corresponding RE set. For this, the terminal may use one of three receiving methods (joint channel estimation and data demodulation, application of successive interference cancellation (SIC) (here, CSI-RS first), and application of SIC (here, PDSCH first)).

In detail, when the terminal uses a joint channel estimation and data demodulation method, it may simultaneously and jointly perform CSI-RS-based channel estimation and PDSCH data demodulation. In another way, when the terminal uses the SIC method for processing the CSI-RS first, it may perform CSI-RS-based channel estimation while considering the PDSCH signal as interference, remove the CSI-RS signal from the received signal, and perform PDSCH demodulation. In another way, when the terminal uses the SIC method for processing the PDSCH first, it may perform PDSCH data demodulation while considering the CSI-RS signal as interference, remove the PDSCH signal from the received signal, and perform CSI-RS-based channel estimation.

The above-noted joint channel estimation and data decoding method may include a method for iteratively performing channel estimation and data demodulation. In this instance, the terminal may first perform the channel estimation as a first stage or may first perform the data demodulation as a first stage. The first method (joint channel estimation and data demodulation method) and the second method (the SIC method for processing the CSI-RS first) from among the above-noted three methods may be applied so as to improve PDSCH receiving performance when the terminal receives strong CSI-RS interference from an adjacent cell in addition to the case of cooperative multi-point transmission. However, when not the case of cooperative multi-point transmission, the base station has to notify the terminal of CSI-RS configuration information of an adjacent cell(s) through separate signaling, and the terminal has to additionally perform channel estimation on the adjacent cell(s) by use of a CSI-RS interference signal received from corresponding adjacent cell(s), so signaling overhead and receiving complexity of the terminal may be increased. On the contrary, when the three receiving methods are applied to the terminal configured with a plurality of CSI processes for the cooperative multi-point transmission (particularly, DPS), no additional CSI-RS configuration is needed and an increase of complexity of the terminal may not be large compared to existing operations as a merit.

The terminal may transmit capability information on whether the terminal supports the interference cancellation receiving function to the base station. The base station may determine whether to apply methods that are described in the present specification to the corresponding terminal by using the capability information of the terminal.

Further, the base station may notify the terminal of whether a PDSCH is mapped on the CSI-RS RE set according to transmission of an indicator in the method Ma100. Hereinafter, the indicator transmitted to the terminal by the base station to notify the terminal of whether the PDSCH is mapped will be referred to as a mapping indicator. The base station may notify the terminal of whether the PDSCH is mapped through implicit signaling. Here, the method of notification through an implicit signaling may include a method for using another form of signaling that is different from a form of the mapping indicator, or signaling transmitted to the terminal for another usage. In the present specification, configuring or transmitting the mapping indicator may include notifying through the implicit signaling.

In this instance, the TP transmitting the PDSCH to the terminal may not simultaneously transmit the CSI-RS from the RE where the PDSCH is transmitted, so an effective range of the mapping indicator may be a CSI-RS RE set(s) for the residual TP(s) that are other than the TP for transmitting the PDSCH to the terminal from among the TPs in the CoMP cooperative set. That is, according to the present standard, when the terminal is configured with a QCL type B, the mapping indicator may not be applied to the CSI-RS RE set corresponding to one NZP CSI-RS ID pointed at by 'qcl-CSI-RS-ConfigNZPId-r11' of a PQI parameter set indicated by the DCI format 2D, and the terminal may not expect to receive a PDSCH from the CSI-RS RE set.

The NZP CSI-RS ID in which a same QCL as the PDSCH is assumed in one PQI parameter set may be extended to be plural later. In this case, an effective range of the mapping indicator may be a CSI-RS RE set(s) for a residual NZP CSI-RS ID(s) except an NZP CSI-RS ID(s) for assuming the QCL (hereinafter, 'QCL NZP CSI-RS ID(s)') in the PQI parameter set indicated by the terminal according to the DCI format 2D from among the NZP CSI-RS ID(s) configured to the terminal. According to the present standard, in the case of QCL type B, a QCL NZP CSI-RS ID signifies one NZP CSI-RS ID pointed at by the 'qcl-CSI-RS-ConfigNZPId-r11'. The QCL NZP CSI-RS ID may later correspond to a plurality of NZP CSI-RS configurations. In this case, the effective range of the mapping indicator may be a CSI-RS RE set(s) for a residual CSI-RS configuration(s) except all the CSI-RS configuration(s) corresponding to the QCL NZP CSI-RS ID(s).

Also, when a CSI-RS resource region corresponding to the QCL NZP CSI-RS ID partly or totally overlaps a CSI-RS resource region corresponding to another NZP CSI-RS ID except the QCL NZP CSI-RS ID(s), the terminal may not expect to receive the PDSCH from the CSI-RS resource region corresponding to the QCL NZP CSI-RS ID. In this instance, an application range of the mapping indicator for the other NZP CSI-RS ID may be a residual region generated by excluding the CSI-RS resource region corresponding to the QCL NZP CSI-RS ID from the corresponding CSI-RS resource region.

In another way, a method for not distinguishing the TP for transmitting the PDSCH to the terminal and the TP for not transmitting the PDSCH to the terminal, and including all the TPs in the CoMP cooperative set into the effective range of the mapping indicator, may be considered. That is, the terminal may assume to receive the PDSCH from the CSI-RS RE set(s) for the entire NZP CSI-RS ID(s) including the QCL NZP CSI-RS ID(s) by the mapping indicator. In this case, the base station may schedule the PDSCH so that the CSI-RS and the PDSCH may not be mapped on the same resource for any TPs. When the resource of the scheduled PDSCH partly or totally overlaps the CSI-RS resource of all the TPs included in the CoMP cooperative set, the terminal may consider it as a configuring or receiving error of the DCI and may not receive the PDSCH from the corresponding subframe. In another way, in the above-noted case, it may be assumed that the terminal performs the operation caused by the mapping indicator in a like manner.

A method for configuring a mapping indicator to a terminal by RRC signaling will now be described.

Regarding the method Ma110, a mapping indicator may be configured for respective PQI parameter sets, and one mapping indicator is applied in common to the NZP CSI-RS IDs configured to the terminal.

For example, the mapping indicator may be one bit in the method Ma110. The base station may notify, through the one-bit mapping indicator, the terminal of whether to assume PDSCH RE mapping on the CSI-RS RE set corresponding to the residual NZP CSI-RS IDs except the QCL NZP CSI-RS ID(s). In another way, the base station may notify, through the one-bit mapping indicator, the terminal of whether to assume PDSCH RE mapping on the CSI-RS RE set corresponding to the entire NZP CSI-RS IDs including QCL NZP CSI-RS ID(s) for respective PQI parameter sets.

In the method Ma110, the mapping indicator may be included in each PQI parameter set and then be defined.

Figure 7:
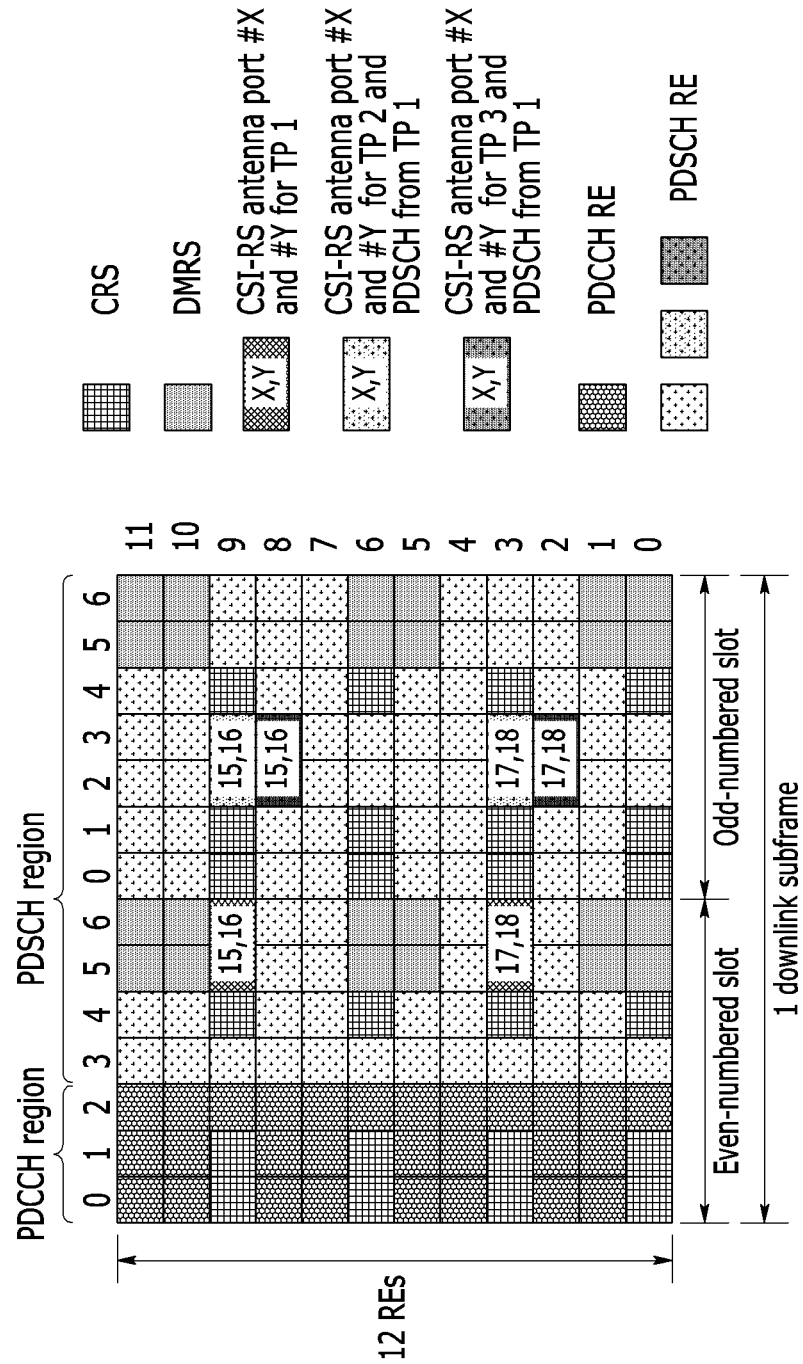
FIG. 7 shows a method for mapping a PDSCH RE for a terminal when a base station uses a method Ma110 according to an exemplary embodiment of the present invention.

FIG. 7 shows a method for mapping a PDSCH RE for a terminal when a base station uses a method Ma110 according to an exemplary embodiment of the present invention.

For ease of description, the method Ma110 will be described on the assumption that, regarding the DPS transmission of FIG. 4, the terminal receives the PDSCH from the TP (TP1) through the DCI format 2D (i.e., the case in which QCL information of the PDSCH scheduled to the terminal includes an ID of the NZP CSI-RS transmitted by the TP (TP1)).

Assuming that PDSCH RE mapping information and QCL information needed for the terminal to receive the PDSCH from the TP (TP1) is configured to a PQI parameter set 1, the base station configures a PQI field of the DCI format 2D as 00 according to Table 1. In this instance, when the base station uses the method Ma110, whether the terminal will receive the PDSCH of the TP (TP1) from the REs of the CSI-RS transmitted by the TP (TP2) and the TP (TP3) may be configured through the mapping indicator. As described, the mapping indicator may be one bit and may be configured to the terminal by the RRC signaling. For example, when a value of the mapping indicator corresponding to the PQI parameter set 1 is 0, the terminal may assume that the PDSCH is not mapped on the REs of the CSI-RS transmitted by the TP (TP2) and the TP (TP3), and may assume a PDSCH RE mapping exemplified in FIG. 6. On the contrary, when the value of the mapping indicator is 1, the terminal may assume that the PDSCH is mapped on the REs of the CSI-RS transmitted by the TP (TP2) and the TP (TP3), and may assume a PDSCH RE mapping exemplified in FIG. 7. In detail, FIG. 7 exemplifies that the residual CSI-RS REs except the CSI-RS RE (e.g., RE(5, 9), RE(6, 9), RE(5, 3), and RE(6, 3) of the slot0) for the TP (TP1) for transmitting the PDSCH from among the CSI-RS REs are configured as PDSCH REs. That is, the CSI-RS REs (e.g., RE(2, 9), RE(3, 9), RE(2, 3), and RE(3, 3) of the slot1) for the TP (TP2) and the CSI-RS REs (e.g., RE(2, 8), RE(3, 8), RE(2, 2), and RE(3, 2) of the slot1) for the TP (TP3) are configured for the REs for transmitting/receiving the PDSCH of the TP (TP1). As a result, the PDSCH RE includes the PDSCH RE exemplified in FIG. 6 and the eight REs (e.g., RE(2, 9), RE(3, 9), RE(2, 8), RE(3, 8), RE(2, 3), RE(3, 3), RE(2, 2), and RE(3, 2)). The CSI-RS of the TPs (TP2 and TP3) and the PDSCH of the TP (TP1) may be transmitted/received at the eight REs (e.g., RE(2, 9), RE(3, 9), RE(2, 8), RE(3, 8), RE(2, 3), RE(3, 3), RE(2, 2), and RE(3, 2)).

Further, when the value of the mapping indicator is 1, the terminal has to estimate the CSI-RS-based channel and receive the PDSCH at the corresponding eight REs (e.g., RE(2, 9), RE(3, 9), RE(2, 8), RE(3, 8), RE(2, 3), RE(3, 3), RE(2, 2), and RE(3, 2)) which is a burden to the terminal, but when the base station and/or the terminal appropriately controls CSI-RS interference on the PDSCH, PDSCH receiving performance may be increased or transmission capacity may be increased.

For another example of the method Ma110, when the value of the mapping indicator is 0, the terminal may assume that the PDSCH is not mapped on the REs (i.e., CSI-RS RE set(s) for the entire NZP CSI-RS ID configured to the terminal) of the CSI-RS transmitted by all the TPs (e.g., TP1, TP2, and TP3) included in the CoMP cooperative set. On the contrary, when the value of the mapping indicator is 1, the terminal may assume that the PDSCH is mapped on the REs of the CSI-RS transmitted by all the TPs (e.g., TP1, TP2, and TP3) included in the CoMP cooperative set.

Regarding the method Ma110, when the CSI process including a QCL NZP CSI-RS ID(s) of the PQI parameter set pointed at by the PQI field of the DCI format 2D is a class-B CSI process, the terminal may assume that the mapping indicator is applied to all the NZP CSI-RS IDs included in the corresponding class-B CSI process. In another way, in the above-noted case, the terminal may assume that the mapping indicator is applied to part of the NZP CSI-RS IDs included in the corresponding class-B CSI process. In another way, in the above-noted case, the terminal may assume that the mapping indicator is applied to a QCL NZP CSI-RS ID(s) configured in the PQI parameter set from among the NZP CSI-RS IDs included in the corresponding class-B CSI process. In the above-noted case, the terminal may assume that, regardless of the value of the mapping indicator, no PDSCH is always transmitted to the CSI-RS RE set configured by the NZP CSI-RS ID in which the mapping indicator is not applied.

A method Ma111 represents a method in which the mapping indicator may be configured for each PQI parameter set, and the mapping indicator may be configured for each NZP CSI-RS ID in one PQI parameter set.

The method Ma111 represents a method that allows further detailed configuration than the method Ma110. For example, the mapping indicator may be one bit, and the mapping indicator may be defined for the respective residual NZP CSI-RS IDs except the QCL NZP CSI-RS ID(s) from the NZP CSI-RS ID configured to the terminal. In this case, a number of mapping indicators for the respective PQI parameter sets may be a maximum value of the residual NZP CSI-RS IDs. According to the Release 12 standard, the terminal may be configured with up to three CSI processes, and one CSI process may have one NZP CSI-RS ID, so the number of the mapping indicator may be 2 at a maximum.

According to the Release 13 standard, the terminal supporting a class-B CSI report may be configured with eight NZP CSI-RS IDs per CSI process as a maximum, so in this case, the maximum number of mapping indicators for the respective PQI parameter sets may be 16.

In another way, in the method Ma111, for the respective PQI parameter sets, the mapping indicator may be defined for the entire NZP CSI-RS IDs configured to the terminal. In this case, the number of mapping indicators for the respective PQI parameter sets may correspond to the number of NZP CSI-RS IDs configured to the terminal.

In the method Ma111, one or a plurality of mapping indicators may be defined to be included in the respective PQI parameter sets. For example, assuming the case in which the terminal receives a PDSCH from the TP (TP1) through the DCI format 2D in the DPS transmission of FIG. 4, the base station configures the mapping indicator for each NZP CSI-RS ID in the PQI parameter set for the terminal to configure the CSI-RS RE for one TP (e.g., TP2) from among the CSI-RS RE for the TPs (TP2 and TP3) not transmitting the PDSCH to the corresponding terminal as the PDSCH RE and not configure the CSI-RS RE for the other TP (e.g., TP3) as the PDSCH RE.

A method Ma112 represents a method in which the mapping indicator may be configured for the respective PQI parameter sets, and the mapping indicator may be configured for the respective CSI processes in one PQI parameter set.

In the method Ma112, for example, the mapping indicator may be one bit, and the mapping indicator may be indicated by the PQI field from among the CSI process configured to the terminal and may be defined for the residual CSI processes except the CSI process including the QCL NZP CSI-RS ID(s). In another way, in the method Ma112, for the respective PQI parameter sets, the mapping indicator may be defined for the entire CSI processes configured to the terminal. Regarding the terminal configured with the class-B CSI process, the method Ma111 may configure a plurality of mapping indicators for the respective PQI parameter sets, while the method Ma112 does not allow the number of mapping indicators for the respective PQI parameter sets to exceed the number of CSI processes configured to the terminal in a corresponding carrier.

The method Ma113 represents a method in which the mapping indicator is applied in common to the entire PQI parameter set and the entire NZP CSI-RS IDs.

The method Ma113 represents a method in which, regardless of a PQI field value of the DCI format 2D, the terminal performs PDSCH rate matching and PDSCH resource element mapping according to a configuration value of a single mapping indicator. In this instance, the mapping indicator may be one bit. Cooperative multi-point communication represents a method for acquiring a short-term channel selection gain caused by a dynamic TP selection when a terminal on a cell border (or TP border) conventionally undergoes similar long-term channel characteristics from a plurality of TPs. When the mapping indicator is transmitted by semi-static RRC signaling, the method Ma113 will sufficiently work to guarantee PDSCH receiving performance after removal of CSI-RS interference.

In a like manner, in the method Ma113, the mapping indicator may not be applied to the QCL NZP CSI-RS ID(s). That is, the terminal may not expect to receive the PDSCH in the CSI-RS RE set corresponding to the QCL NZP CSI-RS ID(s). In another way, in the method Ma113, the mapping indicator may be equally applied to the QCL NZP CSI-RS ID(s). That is, the terminal may expect to receive the PDSCH in the CSI-RS RE set corresponding to the QCL NZP CSI-RS ID(s) according to the mapping indicator value.

In the method Ma113, the mapping indicator may be included in equal or higher-level information of the PQI parameter set.

As described above, not in the case of the cooperative multi-point transmission, the base station has to notify the terminal of CSI-RS configuration information of an adjacent cell(s) through a separate signaling, and in this case, a method for the base station to define the mapping indicator for each CSI-RS configuration on each adjacent cell and notify the terminal of the same together with the CSI-RS configuration may be used. In another way, in a like manner of the method Ma113, a method for defining one mapping indicator and applying the same in common to the CSI-RS configuration of entire adjacent cell(s) may be considered.

A method for configuring a mapping indicator to a terminal by a physical layer signaling will now be described.

A method Ma120 represents a method for including a mapping indicator in a downlink DCI including PDSCH scheduling information of a terminal.

The terminal may be dynamically indicated, through the mapping indicator included in the downlink DCI, regarding whether PDSCH data are mapped on the CSI-RS RE set(s) configured to the terminal. According to a channel state of the terminal, the base station may use a corresponding RE set so as to transmit the PDSCH when it is determined that the terminal may successfully receive the CSI-RS and the PDSCH transmitted from different TPs in a predetermined CSI-RS RE set, and the base station may not map the PDSCH data to the corresponding RE set when it is determined to not be that way.

In the case of CoMP transmission (i.e., when the downlink DCI is a DCI format 2D), in the method Ma120, the mapping indicator may be defined in common for the entire residual NZP CSI-RS ID(s) except the QCL NZP CSI-RS ID(s) from among the NZP CSI-RS ID(s) configured to the terminal (similar to the method Ma110), or it may be defined for each residual NZP CSI-RS ID (similar to the method Ma111). In the former case, a field for the mapping indicator may be one bit. In another way, in the method Ma120, the mapping indicator may be defined in common for the entire NZP CSI-RS ID(s) including the QCL NZP CSI-RS ID(s) from among the NZP CSI-RS ID(s) configured to the terminal (similar to the method Ma110), or it may be defined for the entire NZP CSI-RS IDs (similar to the method Ma111). In the former case, a field for the mapping indicator may be one bit.

In the case of not having the CoMP transmission, in the method Ma120, the mapping indicator may be defined in common for the NZP CSI-RS configuration of the entire adjacent cell(s) or may be defined for each NZP CSI-RS configuration of the adjacent cell. In the former case, a field for the mapping indicator may be one bit.

As another method for composing the method Ma120, a method for configuring in advance a set of a NZP CSI-RS ID(s) indicating an RE set for mapping PDSCH data or a set of an NZP CSI-RS ID(s) indicating an RE set for not mapping PDSCH data through RRC signaling, and dynamically notifying the terminal of whether to map the PDSCH for each NZP CSI-RS ID set by using a mapping indicator field (or a field corresponding to the same) in the DCI may be used. The NZP CSI-RS ID set may be configured to be single or plural. When the number of configurable NZP CSI-RS ID sets is one, one bit may be sufficient for the mapping indicator field in the DCI. When the number of configurable NZP CSI-RS ID sets is N, the mapping indicator field in the DCI may exemplarily need $\text{ceil}(\log_2(N+1))$ bits. Here, the ceil(.) signifies a ceiling operation of a value below the decimal point.

Methods based on the mapping indicator (or signaling corresponding to it) may be limited so that they may only be applicable when the terminal is configured with a plurality of NZP CSI-RS IDs by a plurality of CSI processes. In another way, the methods based on the mapping indicator (or signaling corresponding to it) may be limited so that they may only be applicable when the terminal is configured with a plurality of NZP CSI-RS IDs irrespective of the number of CSI processes configured to the terminal. In another way, the methods based on the mapping indicator may be limited so that they may only be applicable when the terminal is configured with the QCL type B. When the terminal is configured as a QCL type A, application of the methods based on the mapping indicator may be unneeded.

A method for solving the same problem (e.g., a CSI-RS transmission overhead problem) by using a ZP CSI-RS will now be described.

A method Ma130 represents a method for a terminal to expect to receive a PDSCH in a CSI-RS RE set(s) configured to the residual TP(s) except the TP for transmitting the PDSCH from among the TPs belonging to the CoMP cooperative set.

According to the present standard, the terminal assumes that, when the PDSCH is scheduled through the downlink DCI except the DCI format 2D from among the downlink DCI, the PDSCH is not transmitted from the REs of the CSI-RS transmitted by a serving cell, and the PDSCH is transmitted in the REs of the CSI-RS transmitted by an adjacent cell as long as the corresponding region is not configured as the ZP CSI-RS, so the terminal already follows the method Ma130. However, when the terminal is scheduled with the PDSCH through the DCI format 2D, the terminal is to perform PDSCH RE mapping on the resource region except the entire NZP CSI-RS REs configured to the terminal. When the method Ma130 is used, the terminal assumes in the latter case that the PDSCH is transmitted as long as the corresponding region is configured as the ZP CSI-RS in the RE set(s) corresponding to the residual NZP CSI-RS ID(s) except the QCL NZP CSI-RS ID(s) indicated by the DCI from among the NZP CSI-RS ID configured to the terminal. Therefore, when attempting to use a certain CSI-RS RE set configured to the terminal for transmission of the PDSCH to the corresponding terminal, the base station may not configure the corresponding CSI-RS RE set as the ZP CSI-RS, and when attempting to not use the corresponding CSI-RS RE set for a transmission of the PDSCH to the corresponding terminal, it may configure the corresponding CSI-RS RE set as the ZP CSI-RS. Assuming the DPS transmission exemplified in FIG. 4, the PDSCH RE mapping exemplified in FIG. 7 corresponds to the former case (not configured as the ZP CSI-RS), and the PDSCH RE mapping exemplified in FIG. 6 corresponds to the latter case (configured as the ZP CSI-RS).

Figure 8:
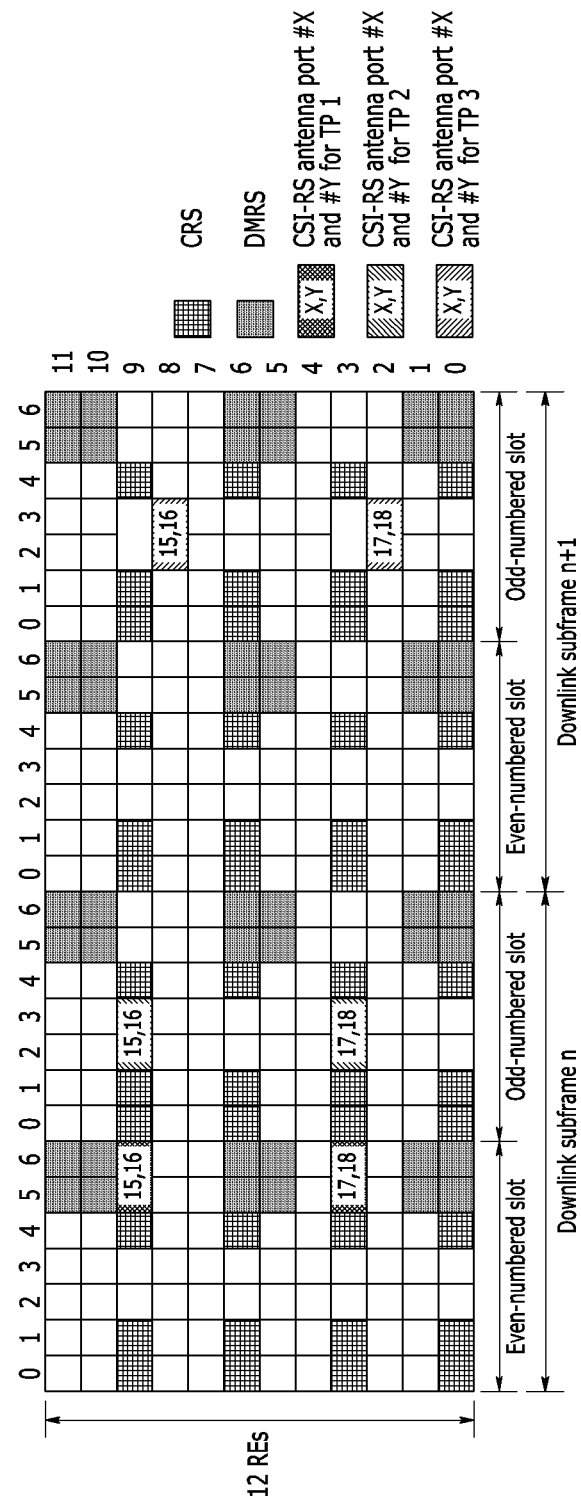
FIG. 8 shows a method for three TPs to configure a CSI-RS resource by using different REs in two subframes according to an exemplary embodiment of the present invention.

FIG. 8 shows a method for three TPs to configure a CSI-RS resource by using different REs in two subframes according to an exemplary embodiment of the present invention.

Each TP participating in the DPS transmission may be configured such that CSI-RSs transmitted to one terminal may be transmitted from different subframes. This corresponds to the case in which a plurality of NZP CSI-RS configurations configured to the terminal with the transmission mode (TM) of 10 are not configured in the same subframe.

In detail, FIG. 8 exemplifies that a terminal is configured with four CSI-RS antenna ports (numbers 15 to 18) over two adjacent subframes (subframe n and subframe n+1) for the respective three TPs (TP1 to TP3). For example, the RE(5, 9), RE(6, 9), RE(5, 3), and RE(6, 3) belonging to the slot0 of the subframe n are configured as the CSI-RS REs for the TP (TP1), the RE(2, 9), RE(3, 9), RE(2, 3), and RE(3, 3) belonging to the slot1 of the subframe n are configured as the CSI-RS REs for the TP (TP2), and the RE(2, 8), RE(3, 8), RE(2, 2), and RE(3, 2) belonging to the slot1 of the subframe n+1 are configured as the CSI-RS REs for the TP (TP3).

Assume that the terminal receives a PDSCH from the TP (TP1) through the DCI format 2D. When the method Ma130 is used, the base station determines through a ZP CSI-RS configuration whether the terminal receives a PDSCH from the REs of the CSI-RS transmitted by the TP (TP2) and the TP (TP3). However, according to the present standard, the terminal may be configured with one ZP CSI-RS configuration for the respective PQI parameter sets. As a result, it is impossible in the present standard to configure the terminal to not receive the PDSCH from the entire REs of the CSI-RS transmitted by the TP (TP2) and the TP (TP3) because two ZP CSI-RS configurations are required.

As a method for configuring a plurality of CSI-RS antenna ports for supporting the FD-MIMO, a method for configuring one or a plurality of NZP CSI-RS configurations over a plurality of subframes through one CSI process may be considered. In this case, for accurate PDSCH rate matching of the terminal, it may be needed to configure a plurality of ZP CSI-RS configurations for the respective PQI parameter sets. In another way, when the method Ma130 is not used, for example, when the TP participating in the DPS transmission transmits the CSI-RS for a plurality of terminals to the different subframes, a plurality of ZP CSI-RS IDs may be needed in a like manner.

A method Ma131 represents a method for the respective PQI parameter sets to include a plurality of ZP CSI-RS IDs. The ZP CSI-RS ID is an identifier for indicating a ZP CSI-RS configuration.

Considering that a ZP CSI-RS configuring periodicity is at least 5 ms, the number of ZP CSI-RS IDs that may be included in one PQI parameter set may be 5 as a maximum in the method Ma131. In another way, in consideration of the RRC signaling overhead, the number of ZP CSI-RS IDs that may be included in one PQI parameter set may be limited to 2 or 3.

The Release 11 ZP CSI-RS ID configurable to one terminal is 4 as a maximum according to the existing standard, so a method for increasing the number of ZP CSI-RS IDs configurable to one terminal may be considered so as to apply the method Ma131. Simultaneously, assuming that the number of TPs participating in the DPS transmission is 3 as a maximum, the number of ZP CSI-RS IDs configurable to one terminal may be 15 as a maximum.

A method Ma132 represents a method for configuring a ZP CSI-RS to a plurality of subframes through one ZP CSI-RS ID.

A set of REs corresponding to one ZP CSI-RS ID will be called a ZP CSI-RS RE set. According to this, one ZP CSI-RS ID or a ZP CSI-RS RE set corresponds to one ZP CSI-RS configuration in the existing standard.

The method Ma132 represents a method in which each PQI parameter set only includes one ZP CSI-RS ID in a like manner of a prior art, but one ZP CSI-RS ID corresponds to a plurality of ZP CSI-RS configurations or one ZP CSI-RS configuration list. For example, when one ZP CSI-RS ID configured to the terminal indicates three ZP CSI-RS configurations, the three ZP CSI-RS configurations may be applied to three subframes, respectively.

The ZP CSI-RS configuration(s) included in the ZP CSI-RS configuration list may be the same as the ZP CSI-RS configuration of the existing standard. In another way, in order to reduce the signaling overhead, the entire configurations included in the ZP CSI-RS configuration list may be assumed to have a same periodicity, or a method for configuring a relative subframe offset between the configurations included in the ZP CSI-RS configuration list to the terminal may be considered.

Assuming that the ZP CSI-RS configuring periodicity is 5 ms at a minimum, the number of ZP CSI-RS configurations corresponding to one ZP CSI-RS ID may be 5 at a maximum in the method Ma132.

The method Ma132 may be analyzed as a method for defining the ZP CSI-RS group ID and allowing one ZP CSI-RS group ID to show a plurality of ZP CSI-RS IDs while maintaining a relationship between the existing ZP CSI-RS ID and the ZP CSI-RS configuration.

A method for simultaneously using the method Ma132 and a method for increasing the maximum number of ZP CSI-RS IDs configurable to one terminal may be considered. Further, a method for simultaneously using the method Ma132 and the method Ma131 may be considered.

A method Ma133 represents a method for including the ZP CSI-RS ID introduced from Release 12 so as to configure a discovery reference signal (DRS) in the respective PQI parameter sets.

The terminal for receiving the DRS introduced from Release 12 may be additionally configured with five ZP CSI-RS IDs at a maximum for the DRS configuration in addition to the existing Release 11 ZP CSI-RS configuration. Therefore, when the method Ma133 is used, the base station may dynamically transmit PDSCH RE mapping information (or PDSCH mapping state information) to the Release 12 terminal that supports the DRS by using nine ZP CSI-RS IDs at a maximum. Therefore, the method Ma133 may solve the problem (e.g., CSI-RS transmission overhead problem) to a certain degree with the ZP CSI-RS ID defined in the present standard.

The ZP CSI-RS configuring method of the method Ma130, the method Ma131, the method Ma132, or the method Ma133 may be used for another purpose in addition to the signaling for removing CSI-RS interference of the terminal.

2. A Method for Transmitting a Downlink Reference Signal 2.1. A CSI-RS Resource Configuration In the present specification, a CSI-RS configuration may signify the CSI-RS resource configuration, and depending on the cases, it may mean a CSI-RS resource composition or a CSI-RS RE set configured by the CSI-RS resource configuration.

A CSI-RS configuration for a normal CP follows Table 2.

TABLE 2

CSI-RS configuration for normal CP

| | | Number of CSI reference signals configured | | | | | |
|---|---|---|---|---|---|---|---|
| | | 1 or 2 | | 4 | | 8 | |
| | CSI-RS configuration | (k', l') | $n_s$ mod 2 | (k', l') | $n_s$ mod 2 | (k', l') | $n_s$ mod 2 |
| Frame structure types 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Regarding Table 2, the CSI-RS configurations of the number 0 to the number 19 may be applied in common to the FDD and the TDD, and the CSI-RS configurations of the number 20 to the number 31 may only be applied to the TDD. The DMRS for the antenna port of the number 5 may be transmitted for the terminal configured with the transmission mode (TM) 7 in the TDD system, so the CSI-RS configurations of the number 20 to the number 31 are additionally defined so as to avoid a resource overlap of the antenna port of the number 5 with the DMRS. Regarding Table 2, an index pair (k', l') pointed at by each CSI-RS configuration signifies an RE that is a reference point of the CSI-RS RE set. It is predefined in the standard how to provide the CSI-RS RE set in one PRB pair with reference to (k', l').

In the present specification, a CSI-RS pattern signifies a CSI-RS resource composition predefined by the standard in a CSI-RS resource pool for the respective numbers of CSI-RS antenna ports, and it may include a frequency axis resource density of the CSI-RS antenna port depending on the case. As shown in FIG. 1 to FIG. 3, the present standard defines the CSI-RS pattern for 1, 2, 4, and 8 CSI-RS antenna ports.

Regarding twelve and sixteen CSI-RS antenna ports introduced in Release 13, one fixed CSI-RS pattern is not defined, and the existing CSI-RS configuration with four or eight CSI-RS antenna ports is aggregated a plurality of times to compose the resource. In detail, twelve CSI-RS antenna ports are composed by aggregating three existing CSI-RS configurations each of which has four antenna ports, and sixteen CSI-RS antenna ports are composed by aggregating two existing CSI-RS configurations each of which has eight antenna ports. In the present specification, the CSI-RS configuration used as an element for aggregating the CSI-RS resource will be referred to as a 'component CSI-RS configuration'.

Further, regarding the twelve and sixteen CSI-RS antenna ports, one of a length-2 CDM (hereinafter, 'CDM-2') and a length-4 CDM (hereinafter, 'CDM-4') may be selectively applied.

A CSI report type of the terminal introduced in Release 13 is classified as Class-A and Class-B. When the transmission mode is 10, the base station may configure a Class-A or Class-B CSI report to the terminal by using a parameter for pointing at a CSI report type in the CSI process. In the present specification, without distinguishing the transmission mode, a set of CSI-RS configuration parameters configured to the terminal for a Class-A CSI report will be referred to as a 'first CSI-RS configuration', and a set of CSI-RS configuration parameters configured to the terminal for a Class-B CSI report will be referred to as a 'second CSI-RS configuration'. When the transmission mode is 10, the first CSI-RS configuration signifies a set of CSI-RS configuration parameters in the CSI process for a Class-A CSI report, and the second CSI-RS configuration signifies a set of CSI-RS configuration parameters in the CSI process for a Class-B CSI report.

The first CSI-RS configuration may include resource configuration information of twelve or sixteen CSI-RS antenna ports. That is, the first CSI-RS configuration may include a plurality of component CSI-RS configurations for a resource aggregation of twelve or sixteen CSI-RS antenna ports and a parameter pointing at the CDM type (i.e., CDM-2 or CDM-4). The second CSI-RS configuration includes one or a plurality of CSI-RS configurations, and in this instance, the respective CSI-RS configurations included in the second CSI-RS configuration are the existing CSI-RS configurations of the 1, 2, 4, or 8 CSI-RS antenna ports. In one second CSI-RS configuration, the CSI-RS configurations may have different numbers of CSI-RS antenna ports, and when the transmission mode is 10, they may have different and its own NZP CSI-RS IDs.

2.2. A Method for Extending the First CSI-RS Configuration

The first CSI-RS configuration may be extended to the numbers of CSI-RS antenna ports other than 8, 12, and 16. For example, the first CSI-RS configuration may be extended to the numbers of CSI-RS antenna ports that are multiples of 8 and are greater than 16. In another way, the first CSI-RS configuration may be extended to the numbers of CSI-RS antenna ports that are multiples of 4 and are greater than 16. In another way, the first CSI-RS configuration may be extended to the numbers of CSI-RS antenna ports that are even numbers and are greater than 16. In another way, the first CSI-RS configuration may be extended to include numbers of CSI-RS antenna ports that are even numbers and are equal to or greater than 8. In this instance, the numbers of configurable CSI-RS antenna ports may be limited to not be greater than N. Here, N is an arbitrary natural number that is greater than 16. For example, N may be 32 or 64.

Regarding the new numbers of CSI-RS antenna ports, in a like manner of the present standard, a method for aggregating a plurality of component CSI-RS configurations may be applied. For example, twenty CSI-RS antenna ports may be composed by aggregating five existing CSI-RS configurations each of which has four antenna ports, and twenty-four CSI-RS antenna ports may be composed by aggregating six existing CSI-RS configurations each of which has four antenna ports or aggregating three existing CSI-RS configurations each of which has eight antenna ports.

In another way, regarding part or all of the new numbers of CSI-RS antenna ports and/or the existing numbers of CSI-RS antenna ports, a method for allowing respective component CSI-RS configurations to have independent numbers of CSI-RS antenna ports may be applied. For example, twenty CSI-RS antenna ports may be composed by aggregating two existing CSI-RS configurations each of which has eight antenna ports and one existing CSI-RS configuration each of which has four antenna ports.

In another way, regarding part or all of the new numbers of CSI-RS antenna ports and/or the existing numbers of CSI-RS antenna ports, a method for allowing all the component CSI-RS configurations to have the same number of CSI-RS antenna ports, and assuming that the terminal receives part of the CSI-RS antenna ports for one component CSI-RS configuration and uses the same to the CSI measurement and report, may be applied. For example, the terminal may assume part of the CSI-RS antenna ports for the last component CSI-RS configuration from among the component CSI-RS configuration(s) composing the first CSI-RS configuration. For example, twenty CSI-RS antenna ports are composed by aggregating three existing CSI-RS configurations each of which has eight antenna ports, and the terminal may assume to receive four (e.g., CSI-RS antenna ports of the number 15 to the number 18) of the eight antenna ports regarding the last component CSI-RS configuration. Regarding the component CSI-RS configuration in which the terminal assumes part of the CSI-RS antenna ports, the number of CSI-RS antenna ports assumed by the terminal may be signaled to the terminal by the base station.

In the present specification, it is assumed that methods applicable to the first CSI-RS configuration are applied to the configuration of new numbers of CSI-RS antenna ports caused by the extension in a same or similar manner.

2.3. A Method for Extending a CSI-RS Resource Configuration

As exemplified in FIG. 1 to FIG. 3, according to the present LTE standard, the total number of REs usable for CSI-RS transmission in a single PRB pair is 40 when the normal CP is configured. Hereinafter, a set of REs configurable as a CSI-RS resource in the PRB pair (or in a plurality of PRB pairs when PRB bundling is used) will be referred to as a CSI-RS resource pool. Extending the CSI-RS resource pool may be helpful in transmission of a plurality of CSI-RS antenna ports in the FD-MIMO system. Two methods may be generally considered as a method for extending the CSI-RS resource pool in one subframe.

The first method is a method for increasing the number of REs included in the CSI-RS resource pool in a single PRB pair. The second method is a method for bundling a plurality of PRB pairs that are adjacent on a frequency axis and extending the CSI-RS resource pool while maintaining the number of REs included in the CSI-RS resource pool in a single PRB pair as 40. According to the latter method, the number of REs usable for the CSI-RS resource configuration is increased, and the number of REs allocated to the respective CSI-RS antenna ports in the entire system bandwidth is reduced. For example, when a PRB pair bundle includes two adjacent PRB pairs, the CSI-RS resource pool totally includes eighty REs in one PRB pair bundle, and the number of symbols composing a sequence of each CSI-RS antenna port is reduced to half compared to the existing case. When the density of the RE on the frequency axis for respective CSI-RS antenna ports is reduced, the number of channel samples usable for a channel estimation of the terminal is reduced, which may influence channel estimation performance depending on a channel characteristic and a channel estimation algorithm. According to the present standard, the CSI measurement and report of the terminal is performed per at least subband, so the actually reported accuracy of CSI or the degradation of scheduler performance may be very much less.

A method for extending a CSI-RS pattern will now be described with a focus on the latter method. That is, a method for extending an existing CSI-RS pattern to a plurality of antenna ports with the PRB pair bundle as a basic unit will now be described.

Further, a method for allowing the CSI-RS pattern to have a lower frequency-axis density than the existing case by using PRB bundling to the 1, 2, 4, or 8 CSI-RS antenna ports will be described. Further, a method for combining the extended CSI-RS patterns and configuring the same to the terminal will be described. The respective methods to be described below will be sequentially described by classifying them into next four cases. The first case will be mainly described, and other cases will be briefly described.

Configuration of a CSI-RS resource applicable to both FDD and TDD when a normal CP is configured
Configuration of a CSI-RS resource applicable to TDD when a normal CP is configured
Configuration of a CSI-RS resource applicable to both FDD and TDD when an extended CP is configured
Configuration of a CSI-RS resource applicable to TDD when an extended CP is configured The methods according to an exemplary embodiment of the present invention may generate different effects depending on an antenna virtualization method. In the present specification, the virtualization signifies mapping between the antenna port and physical antenna element(s), and the antenna virtualization in the digital signal processing-based communication system may include antenna port virtualization and transceiver unit (TXRU) virtualization. Here, the TXRU signifies a unit of an RF device for independently controlling and outputting a phase and an amplitude of an input signal, and it is conventionally called an RF chain. The antenna port virtualization signifies mapping between the antenna port and the TXRU(s), and the TXRU virtualization signifies mapping between the TXRU and the physical antenna element(s). The terminal may not know the virtualization applied to the respective antenna ports as a default.

In the present specification, the CSI-RS signifies a non-zero-power (NZP) CSI-RS as generally used, and is assumed to be different from the zero-power (ZP) CSI-RS.

2.3.1. A Method for Configuring a CSI-RS Resource Applicable to Both FDD and TDD when a Normal CP is Configured First, when a normal CP is configured, a method for configuring a CSI-RS resource applicable in common to FDD and TDD frame structures will now be described.

In advance to a proposed method, a PRB pair bundle will be defined. In the present specification, the PRB pair bundle (hereinafter, a 'PRB bundle') signifies a bundle (or a set) of adjacent PRB pairs on the frequency axis as a basic unit for defining the CSI-RS pattern. That is, the CSI-RS pattern is defined in one PRB bundle, and the CSI-RS pattern is identically repeated to a plurality of PRB bundles throughout a whole band and is then mapped. In this instance, a size of the PRB bundle, that is, the number of PRB pairs included in the PRB bundle, is defined to be $N\^bundle\_RB$, and the number of PRB bundles possessed by the entire system bandwidth is defined to be $N\^DL\_bundle$. When the number of PRBs of the entire band is $N\^DL\_RB$, it is satisfied that $N\^DL\_bundle=ceil(N\^DL\_RB/N\^bundle\_RB)$. For example, when a system bandwidth is 10 MHz in the LTE system, $N\^DL\_RB$ is configured to be 50, the size of the PRB bundle is configured to be 3, the total number of PRB bundles is $N\^DL\_bundle=ceil\ 50/3=17$, and the size of the last PRB bundle is 2. The CSI-RS pattern defined in the existing LTE standard corresponds to the case in which $N\^bundle\_RB=1$.

The PRB bundling (here, $N\^bundle\_RB>1$) will now be described. The CSI-RS pattern may be defined by using a plurality of PRB pairs included in the PRB bundle. In this case, a method Mb100 and a method Mb200 may be mainly considered as methods for extending the CSI-RS pattern.

The method Mb100 is a method for mapping (or configuring) an RE set of the CSI-RS antenna ports included in the CSI-RS pattern in one PRB pair from among a plurality of PRB pairs included in the PRB bundle.

The method Mb100 may reuse the CSI-RS pattern of the existing standard to which the PRB bundling is not applied. That is, the method Mb100 may reuse the existing CSI-RS configuration signaling using Table 2 when 1, 2, 4, or 8 CSI-RS antenna ports are configured. In this case, the base station may have to additionally notify the terminal of the size ($N\^bundle\_RB$) of the PRB bundle and/or an index of the PRB pair on which the CSI-RS RE set in the PRB bundle is mapped. Here, the index of the PRB pair on which the CSI-RS RE set is mapped from among the PRB pairs included in the PRB bundle may be expressed to be an integer that is equal to or greater than 0 and is less than $N\^bundle\_RB$, which will be referred to as a PRB shift in the present specification for convenience. The $N\^bundle\_RB$ and/or the PRB shift may have a fixed value according to a predetermined rule, and may be configured for the respective terminals.

As an example of the former, the $N\^bundle\_RB$ may have a predetermined value for the respective numbers of CSI-RS antenna ports. For example, the $N\^bundle\_RB$ may be set to be 1 when the number of CSI-RS antenna ports is the same or lower than X, and may be set to be a value that is greater than 1 when the number of CSI-RS antenna ports is greater than X. Here, X may be expressed to be an integer that is equal to or greater than 1. As an example of the latter, when the terminal is configured with the transmission mode 10, the $N\^bundle\_RB$ may be configured to the terminal for respective CSI processes.

Figure 9:
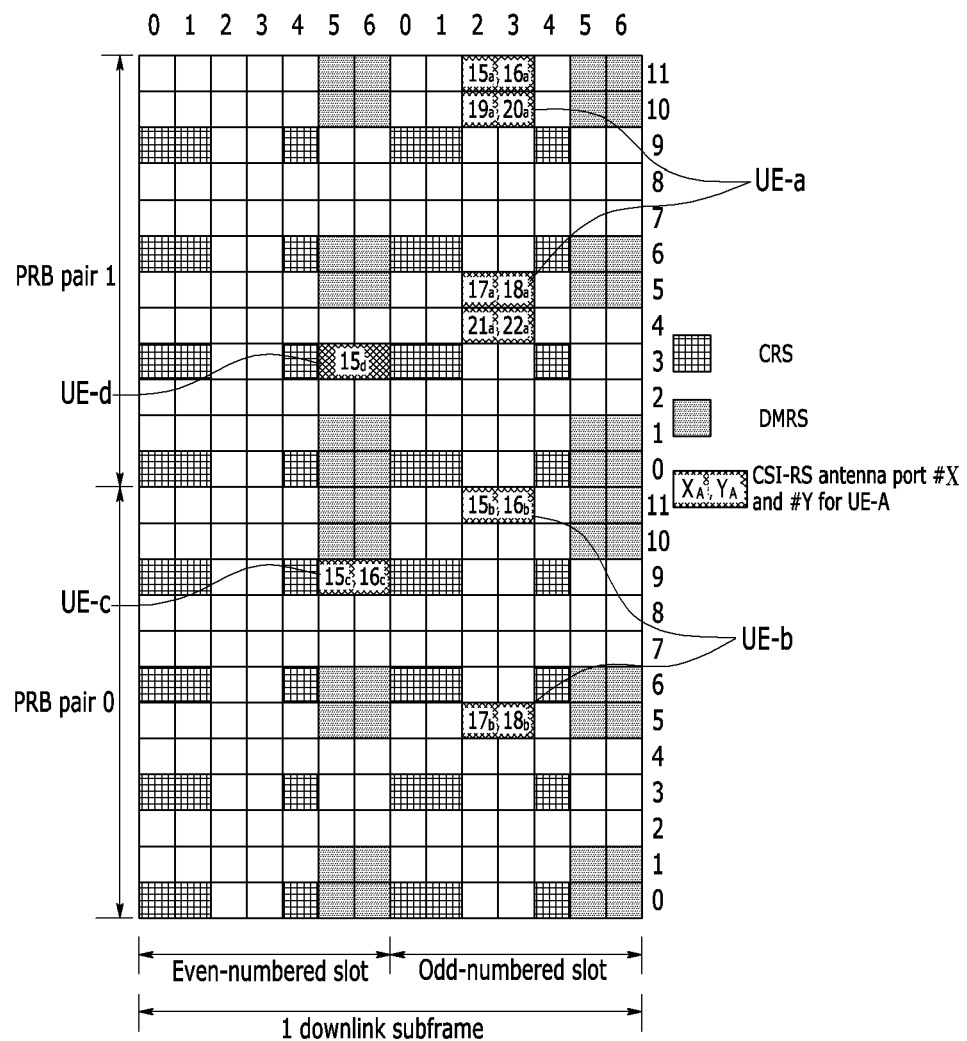
FIG. 9 shows a method for configuring a CSI-RS resource by using a method Mb100 according to an exemplary embodiment of the present invention.

FIG. 9 shows a method for configuring a CSI-RS resource by using a method Mb100 according to an exemplary embodiment of the present invention.

In detail, FIG. 9 exemplifies the case in which the base station applies bundling to two PRB pairs, and configures 8, 4, 2, or 1 CSI-RS antenna ports to the terminals (UE-a, UE-b, UE-c, and UE-d) in the same subframe.

In this instance, in the case of the entire terminals, the N^bundle_RB is 2 in common, the PRB shift for the terminal (UE-a) and the terminal (UE-d) is 1, and the PRB shift for the terminal (UE-b) and the terminal (UE-c) is 0. The size of the PRB bundle is 2, so the frequency-axis density of the entire antenna ports exemplified in the drawing becomes half of the existing case.

For example, the RE(2, 11), RE(3, 11), RE(2, 5), RE(3, 5), RE(2, 10), RE(3, 10), RE(2, 4), and RE(3, 4) of the slot1 in the PRB pair of the number 1 are configured as the CSI-RS RE (e.g., CSI-RS antenna ports of the number 15 to the number 22) for the terminal (UE-a). The RE(5, 3) and RE(6, 3) of the slot0 of the PRB pair of the number 1 are configured as the CSI-RS RE (e.g., CSI-RS antenna port of the number 15) for the terminal (UE-d). The RE(2, 11), RE(3, 11), RE(2, 5), and RE(3, 5) of the slot1 in the PRB pair of the number 0 are configured as the CSI-RS RE (e.g., CSI-RS antenna ports of the number 15 to the number 18) for the terminal (UE-b). The RE(5, 9) and RE(6, 9) of the slot0 in the PRB pair of the number 0 are configured as the CSI-RS RE (e.g., CSI-RS antenna ports of the number 15 and the number 16) for the terminal (UE-c). The drawings of the present specification exemplify that the PRB pair with a lower frequency range has a lower PRB pair index, and on the contrary, the PRB pair with a high frequency range may be assumed to have a low PRB pair index.

According to the method Mb100, a plurality of terminals may use part of REs in one PRB pair by alternatively using the PRB pair on the frequency axis. In the exemplary embodiment exemplified in FIG. 9, the terminal (UE-a) and the terminal (UE-b) use the RE(2, 5), RE(3, 5), RE(2, 11), and RE(3, 11) of the slot1.

In the method Mb100, the size (N^bundle_RB) of the PRB bundle may be an arbitrary natural number. However, when the base station bundles too many PRB pairs, CSI measurement accuracy is deteriorated, so a maximum value of the size (N^bundle_RB) of the PRB bundle may be predefined with an appropriate value. For example, the size of the PRB bundle may be limited so as to not exceed the size of the subband (i.e., so that the N^bundle_RB may be equal to or less than the number of RBs possessed by one subband). In another way, the size of the PRB bundle may be limited to only be a submultiple of the size of the subband. In another way, a limiting method for allowing the N^bundle_RB value to only be 1 and 2 may be considered.

As described, according to the present standard, the CSI-RS pattern is defined for the 1, 2, 4, and 8 CSI-RS antenna ports, and twelve and sixteen CSI-RS antenna ports are composed by aggregating a plurality of component CSI-RS configurations. Regarding the numbers of CSI-RS antenna ports other than 1, 2, 4, and 8, a method for defining the CSI-RS pattern without the resource aggregation may be considered. In this case, the method Mb100 has a restriction that it may not be applied to the sixty-four CSI-RS antenna ports by use of the present CSI-RS resource pool. Further, when the base station attempts to use the method Mb100 to configure thirty-two CSI-RS antenna ports, the CSI-RS pattern may not be defined by a combination of the CDM-2 and the FDM in one PRB pair, and the CSI-RS pattern may be defined by a combination with the TDM or the CDM with more than length-4, so at least four OFDM symbols are needed for a CSI-RS configuration and transmission. Therefore, the case in which thirty-two CSI-RS antenna ports are configured may be relatively further exposed to inter-OFDM-symbol phase drift phenomenon caused by an impairment of an oscillator than the case of configuring less than sixteen CSI-RS antenna ports.

One of merits of the method Mb100 is that the base station may allow a terminal to which the PRB bundling is applicable in the case of CSI-RS transmission and a legacy terminal to which the PRB bundling is not applicable to share part of the REs since the existing CSI-RS pattern is identically maintained in one PRB pair.

Figure 10A:
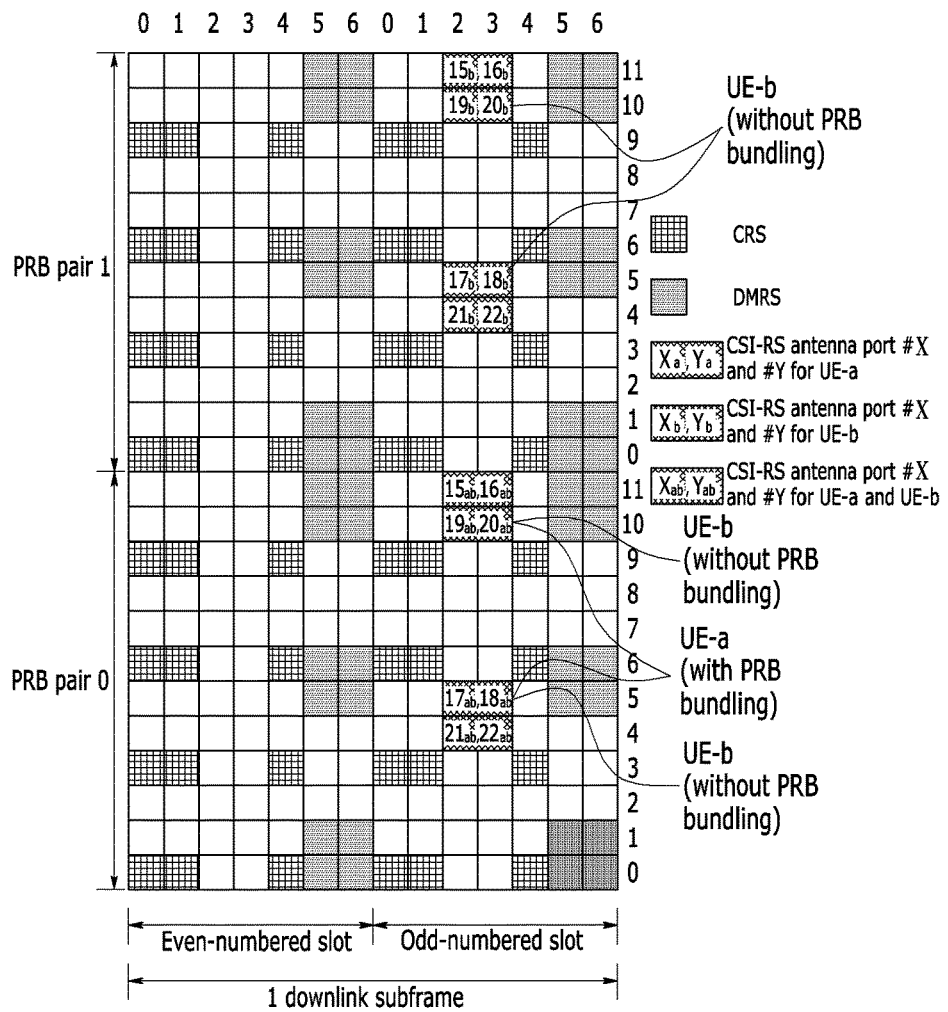
FIG. 10A and FIG. 10B show a method for configuring a CSI-RS resource using a method Mb100 according to another exemplary embodiment of the present invention.
Figure 10B:
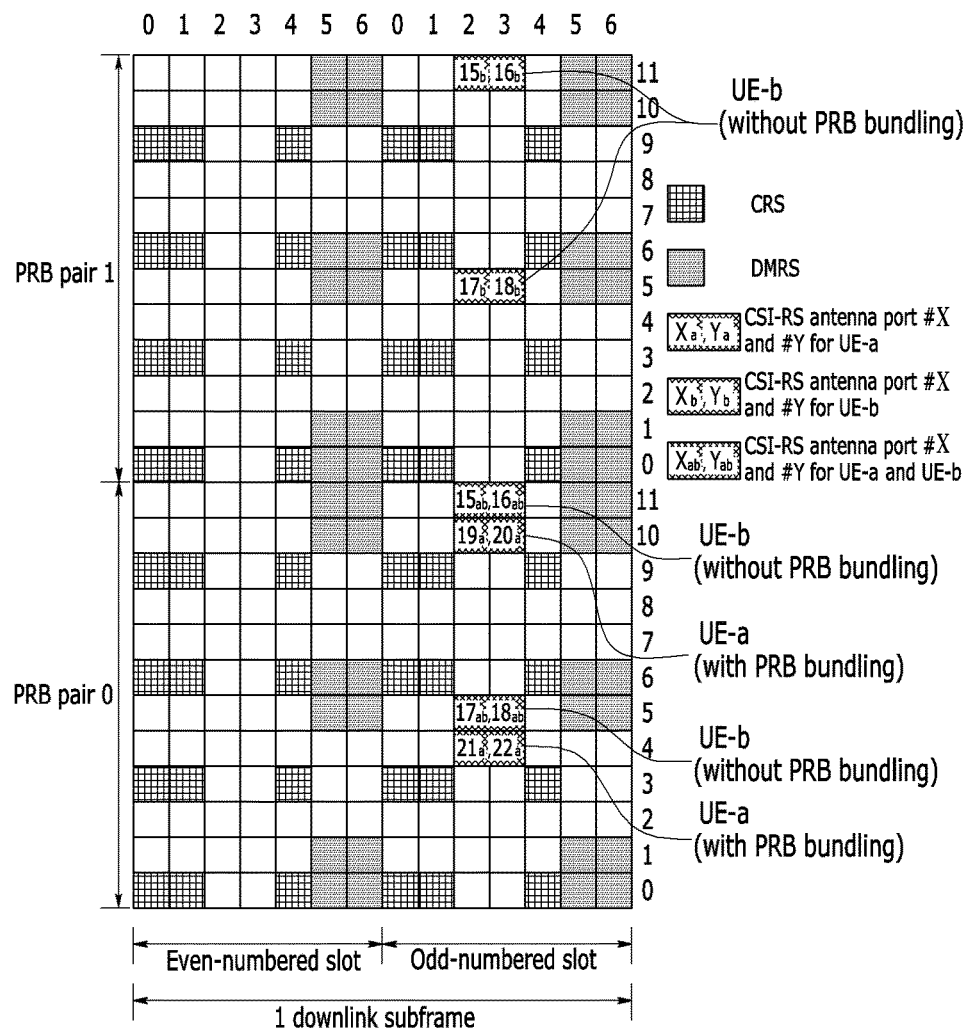

FIG. 10A and FIG. 10B show a method for configuring a CSI-RS resource using a method by Mb100 according to another exemplary embodiment of the present invention.

In detail, FIG. 10A and FIG. 10B exemplify a case in which CSI-RS configurations of a new terminal to which the PRB bundling is applied for the CSI-RS and a legacy terminal (or a new terminal to which the PRB bundling is not applied) to which the PRB bundling is inapplicable share a resource.

FIG. 10A exemplifies a case in which a terminal (UE-a) and a terminal (UE-b) are configured with eight CSI-RS antenna ports according to a same CSI-RS configuration, and bundling is applied to two PRB pairs by the method Mb100 regarding the terminal (UE-a). For example, the RE(2, 11), RE(3, 11), RE(2, 10), RE(3, 10), RE(2, 5), RE(3, 5), RE(2, 4), and RE(3, 4) of the slot1 in the PRB pair of the number 0 are configured as the CSI-RS REs for the terminal (UE-a). The RE(2, 11), RE(3, 11), RE(2, 10), RE(3, 10), RE(2, 5), RE(3, 5), RE(2, 4), and RE(3, 4) of the slot1 in the respective PRB pairs are configured as the CSI-RS REs for the terminal (UE-b) to which PRB bundling is inapplicable. As a result, the RE(2, 11), RE(3, 11), RE(2, 10), RE(3, 10), RE(2, 5), RE(3, 5), RE(2, 4), and RE(3, 4) of the slot1 in the PRB pair of the number 0 are configured as the CSI-RS REs for the terminal (UE-a) and the terminal (UE-b).

FIG. 10B exemplifies a case in which a base station configures bundling of two PRB pairs to the terminal (UE-a) by using the method Mb100, configures a CSI-RS pattern of eight antenna ports to the PRB pair of the number 0, and configures four CSI-RS antenna ports to the terminal (UE-b) without PRB bundling. For example, the RE(2, 11), RE(3, 11), RE(2, 10), RE(3, 10), RE(2, 5), RE(3, 5), RE(2, 4), and RE(3, 4) of the slot1 in the PRB pair of the number 0 are configured as the CSI-RS REs for the terminal (UE-a). The RE(2, 11), RE(3, 11), RE(2, 5), and RE(3, 5) of the slot1 in the respective PRB pairs are configured as the CSI-RS REs for the terminal (UE-b). As a result, the RE(2, 11), RE(3, 11), RE(2, 5), and RE(3, 5) of the slot1 of the PRB pair of the number 0 are configured as the CSI-RS REs for the terminal (UE-a) and the terminal (UE-b).

A method exemplified in FIG. 10A and FIG. 10B may reduce the CSI-RS transmission overhead by allowing the CSI-RS resource configuration on the terminal (UE-a) and the terminal (UE-b) to share part of REs, compared to the method for configuring no intersection between CSI-RS RE sets of the two terminals (UE-a and UE-b).

Figure 11:
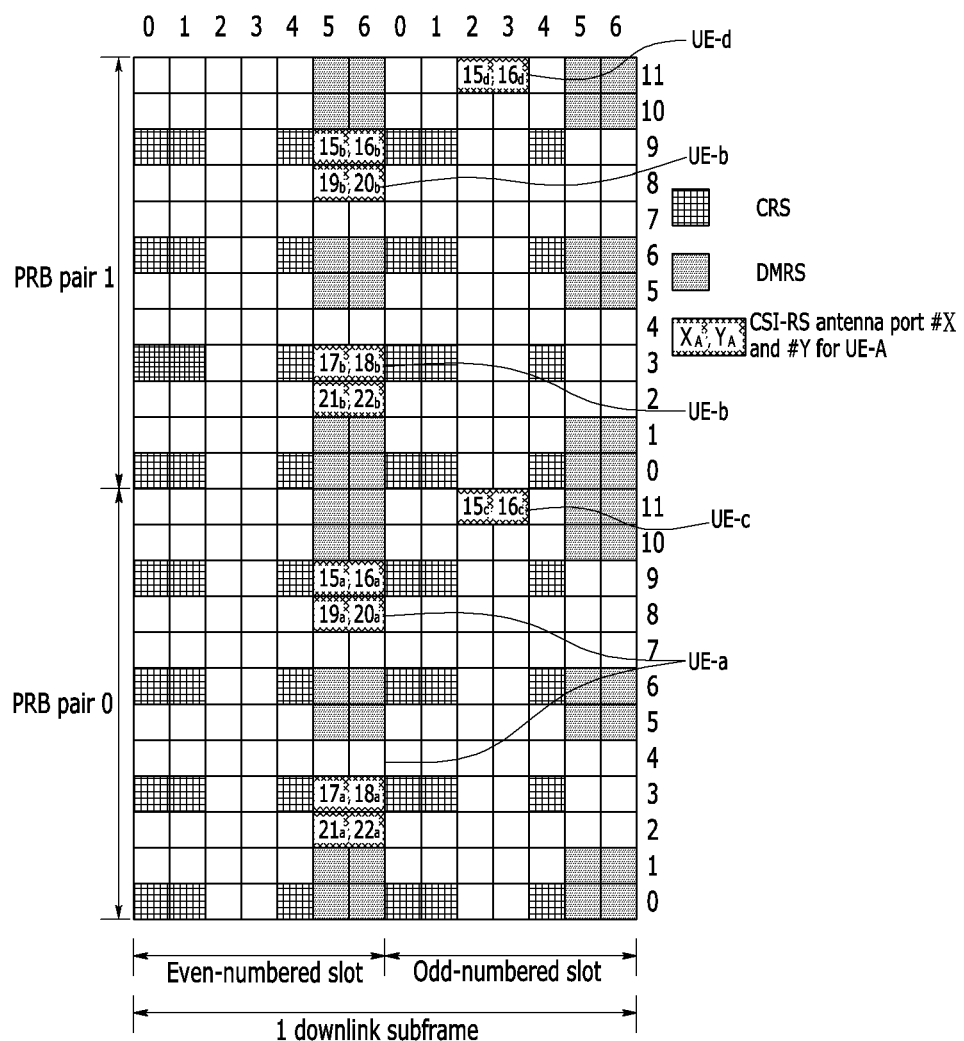
FIG. 11 shows a method for configuring a CSI-RS resource by using a method Mb100 according to the other exemplary embodiment of the present invention.

FIG. 11 shows a method for configuring a CSI-RS resource by using a method Mb100 according to the other exemplary embodiment of the present invention.

In detail, FIG. 11 exemplifies a method for a base station to configure a CSI-RS resource to a plurality of terminals by using different PRB pairs in a PRB bundle, and allow a plurality of terminals to share a same RE on the frequency axis. In FIG. 11, the terminals (UE-a, UE-b, UE-c, and UE-d) are terminals that may be configured with PRB bundling, and the respective terminals (UE-a, UE-b, UE-c, and UE-d) may be configured with bundling of two PRB pairs.

The base station configures the same CSI-RS configuration and the N^bundle_RB=2 for the eight CSI-RS antenna ports in common to the terminal (UE-a) and the terminal (UE-b), configures the PRB shift for the terminal (UE-a) as 0, and configures the PRB shift for the terminal (UE-b) as 1. For example, the RE(5, 9), RE(6, 9), RE(5, 8), RE(6, 8), RE(5, 3), RE(6, 3), RE(5, 2), and RE(6, 2) of the slot0 in the PRB pair of the number 0 are configured as the CSI-RS REs for the terminal (UE-a). The RE(5, 9), RE(6, 9), RE(5, 8), RE(6, 8), RE(5, 3), RE(6, 3), RE(5, 2), and RE(6, 2) of the slot0 in the PRB pair of the number 1 are configured as the CSI-RS REs for the terminal (UE-b).

In this instance, the CSI-RS for the terminal (UE-a) and the terminal (UE-b) is transmitted through different PRB pairs so it is possible to apply a different kind of virtualization to the CSI-RS for the terminal (UE-a) and the terminal (UE-b). That is, user equipment-specific CSI-RS beamforming is possible. This is useful when channels possessed by the terminal (UE-a) and the terminal (UE-b) have different directions in a beam space or a vector space.

The base station configures two CSI-RS antenna ports to the terminal (UE-c) and the terminal (UE-d). A principle applied to the CSI-RS configuration for the terminal (UE-c) and the terminal (UE-d) is identical with that of the example of the terminal (UE-a) and the terminal (UE-b). For example, the RE(2, 11) and RE(3, 11) of the slot1 in the PRB pair of the number 0 are configured as the CSI-RS REs for the terminal (UE-c). The RE(2, 11) and RE(3, 11) of the slot1 in the PRB pair of the number 1 are configured as the CSI-RS REs for the terminal (UE-d).

The method Mb200 represents a method for mapping an RE set of CSI-RS antenna ports included in the CSI-RS pattern on entire PRB pairs included in the PRB bundle with a uniform number (or a most uniform number).

In the method Mb200, in order for the CSI-RS antenna ports to be mapped on the N^bundle_RB-numbered PRB pairs with the same number, N^bundle_RB must be an exponentiation of 2. Therefore, while it is permissible for the size of the PRB bundle to be an arbitrary natural number in the method Mb100, it may be efficient in the method Mb200 to limit the size of the PRB bundle as the exponentiation of 2.

Figure 12:
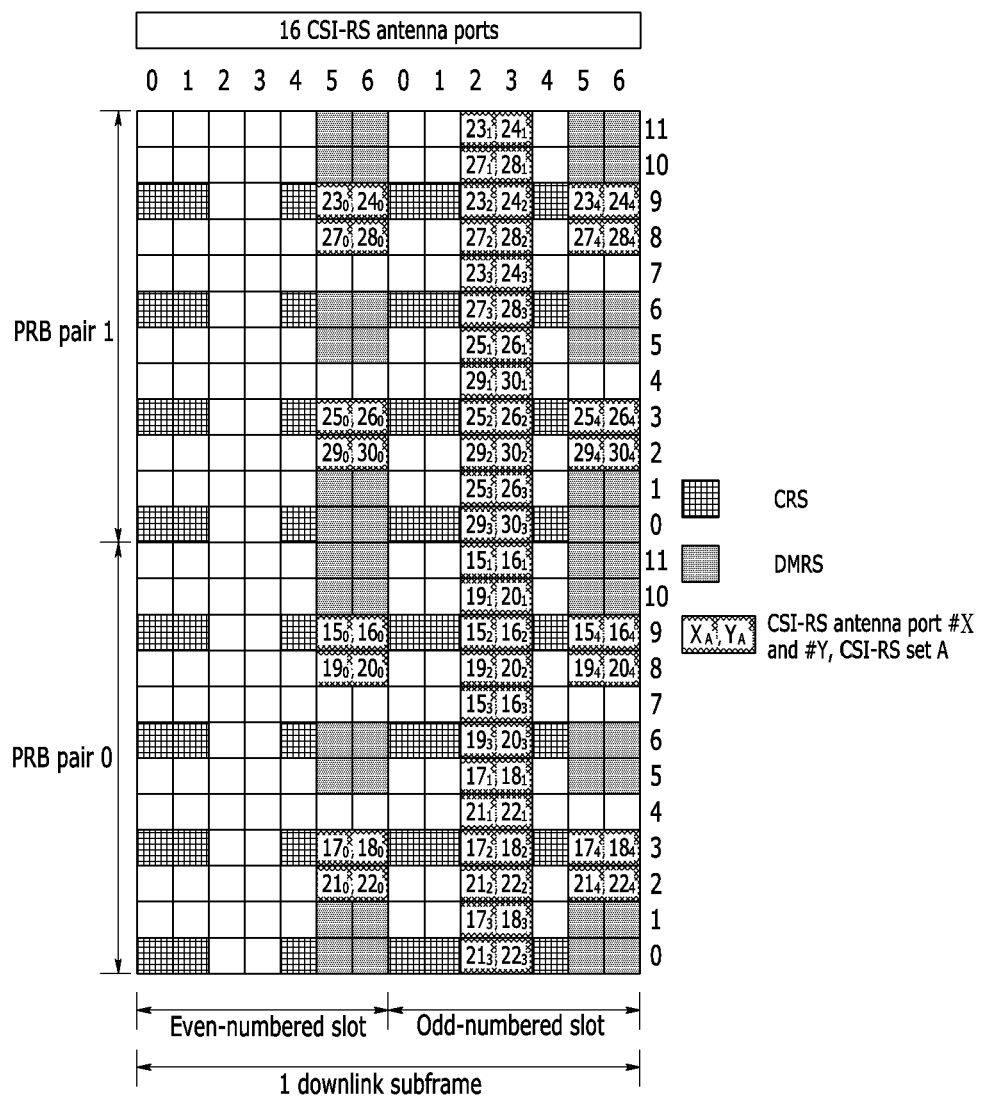
FIG. 12 shows a method for configuring a resource for sixteen CSI-RS antenna ports by using a method Mb200 according to an exemplary embodiment of the present invention.

FIG. 12 shows a method for configuring a resource for sixteen CSI-RS antenna ports by using a method Mb200 according to an exemplary embodiment of the present invention.

In detail, FIG. 12 exemplifies the case in which two PRB pairs are bundled.

As exemplified in FIG. 12, the base station may apply PRB bundling and inter-antenna port multiplexing (FDM) to the eight existing CSI-RS patterns, and may extend the CSI-RS pattern twice on the frequency axis to configure a pattern of sixteen CSI-RS antenna ports.

In this instance, the number of CSI-RS configurations that are configurable in one subframe is 5 (e.g., the number 0 to the number 4). For example, the RE(5, 9), RE(6, 9), RE(5, 8), RE(6, 8), RE(5, 3), RE(6, 3), RE(5, 2), and RE(6, 2) of the slot0 in the PRB pair of the number 0 and the RE(5, 9), RE(6, 9), RE(5, 8), RE(6, 8), RE(5, 3), RE(6, 3), RE(5, 2), and RE(6, 2) of the slot0 in the PRB pair of the number 1 are configured as the CSI-RS RE (e.g., CSI-RS antenna ports of the number 15 to the number 30) for the CSI-RS configuration of the number 0.

According to an exemplary embodiment exemplified in FIG. 12, in a like manner of the method Mb100, two PRB pairs are combined and bundled so the frequency-axis resource density of the respective CSI-RS antenna ports is reduced to half.

Figure 13A:
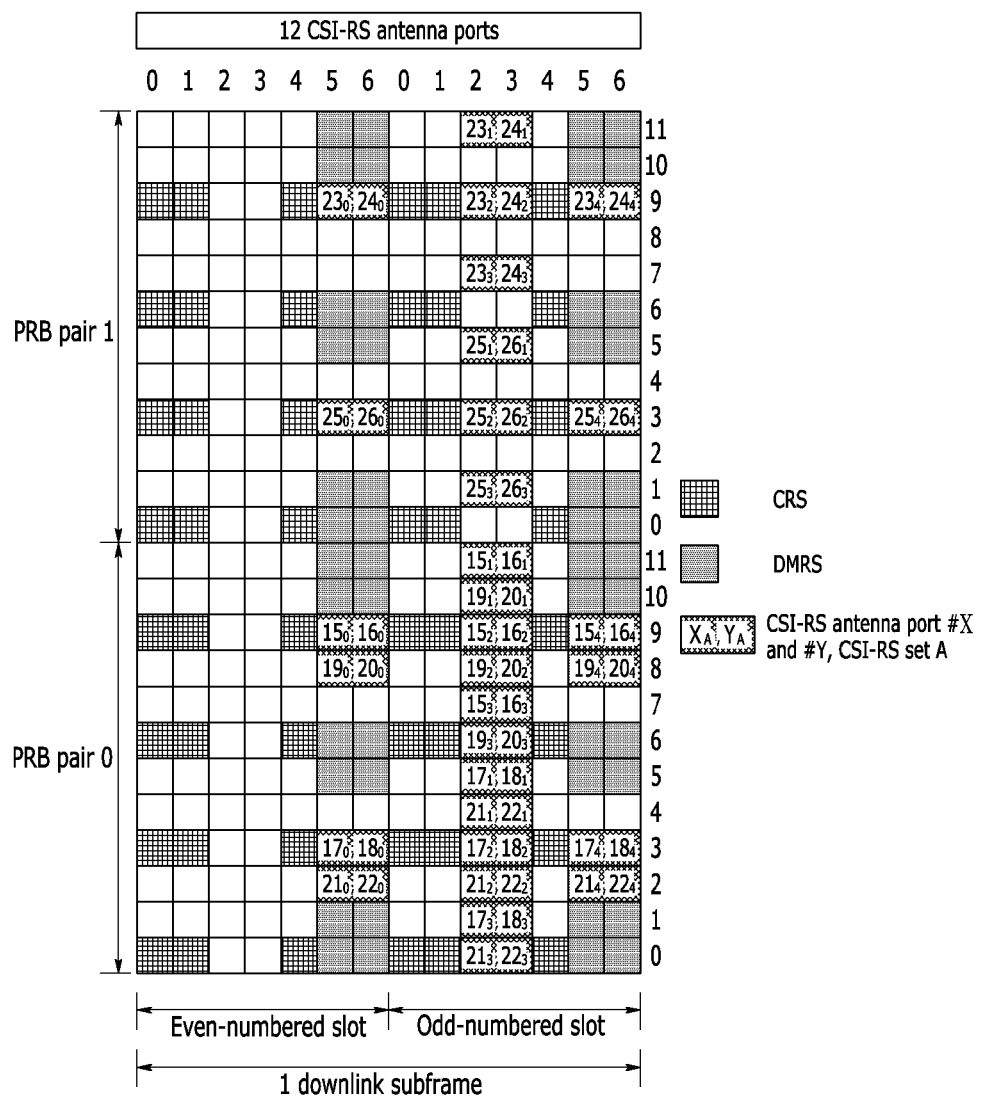
FIG. 13A and FIG. 13B show a method for configuring a resource for twelve CSI-RS antenna ports by using a method Mb200 according to an exemplary embodiment of the present invention.
Figure 13B:
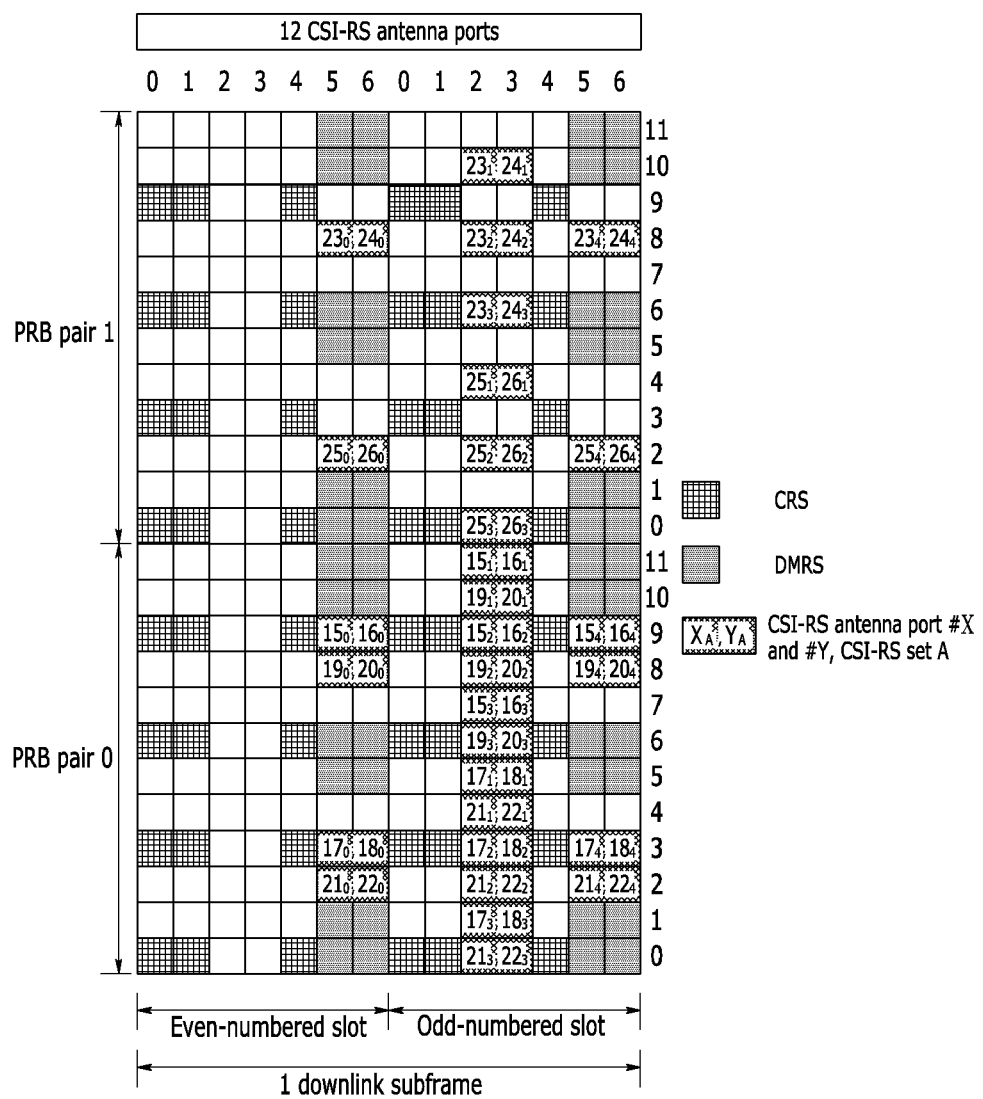

FIG. 13A and FIG. 13B show a method for configuring a resource for twelve CSI-RS antenna ports by using a method Mb200 according to an exemplary embodiment of the present invention.

In detail, FIG. 13A and FIG. 13B exemplify the case in which two PRB pairs are bundled. Differing from the case in which the number of CSI-RS antenna ports is 16, when the number of CSI-RS antenna ports is 12, and if the base station attempts to uniformly divide and configure the CSI-RS antenna ports to two PRB pairs, it has to map six CSI-RS antenna ports in one PRB pair. In this case, the existing standard did not define the pattern on the six CSI-RS antenna ports configured in one PRB pair so a new pattern for the six CSI-RS antenna ports has to be defined. To avoid this, a method for non-uniformly dividing twelve CSI-RS antenna ports and mapping them on two PRB pairs may be considered.

FIG. 13A and FIG. 13B exemplify the case in which a base station maps eight and four CSI-RS antenna ports on the PRB pairs of the number 0 and the number 1.

The pattern on the eight CSI-RS antenna ports of the existing standard is applied to the PRB pair of the number 0, and the pattern on the four CSI-RS antenna ports of the existing standard is applied to the PRB pair of the number 1.

In this instance, the number of CSI-RS configurations that are configurable in one subframe is 5 (e.g., the number 0 to the number 4). For example, in an exemplary embodiment exemplified in FIG. 13A, the RE(5, 9), RE(6, 9), RE(5, 8), RE(6, 8), RE(5, 3), RE(6, 3), RE(5, 2), and RE(6, 2) of the slot0 in the PRB pair of the number 0 and the RE(5, 9), RE(6, 9), RE(5, 3), and RE(6, 3) of the slot0 in the PRB pair of the number 1 are configured as the CSI-RS RE (e.g., CSI-RS antenna ports of the number 15 to the number 26) for the CSI-RS configuration of the number 0. In an exemplary embodiment exemplified in FIG. 13B, the RE(5, 9), RE(6, 9), RE(5, 8), RE(6, 8), RE(5, 3), RE(6, 3), RE(5, 2), and RE(6, 2) of the slot0 in the PRB pair of the number 0 and the RE(5, 8), RE(6, 8), RE(5, 2), and RE(6, 2) of the slot0 in the PRB pair of the number 1 are configured as the CSI-RS RE (e.g., CSI-RS antenna ports of the number 15 to the number 26) for the CSI-RS configuration of the number 0.

In this instance, like the CSI-RS patterns exemplified in FIG. 13A and FIG. 13B, inclusion of the set of the REs configured to the PRB pair of the number 1 into the set of the REs configured to the PRB pair of the number 0 may be effective in the ZP CSI-RS configuration for other terminals.

Figure 14:
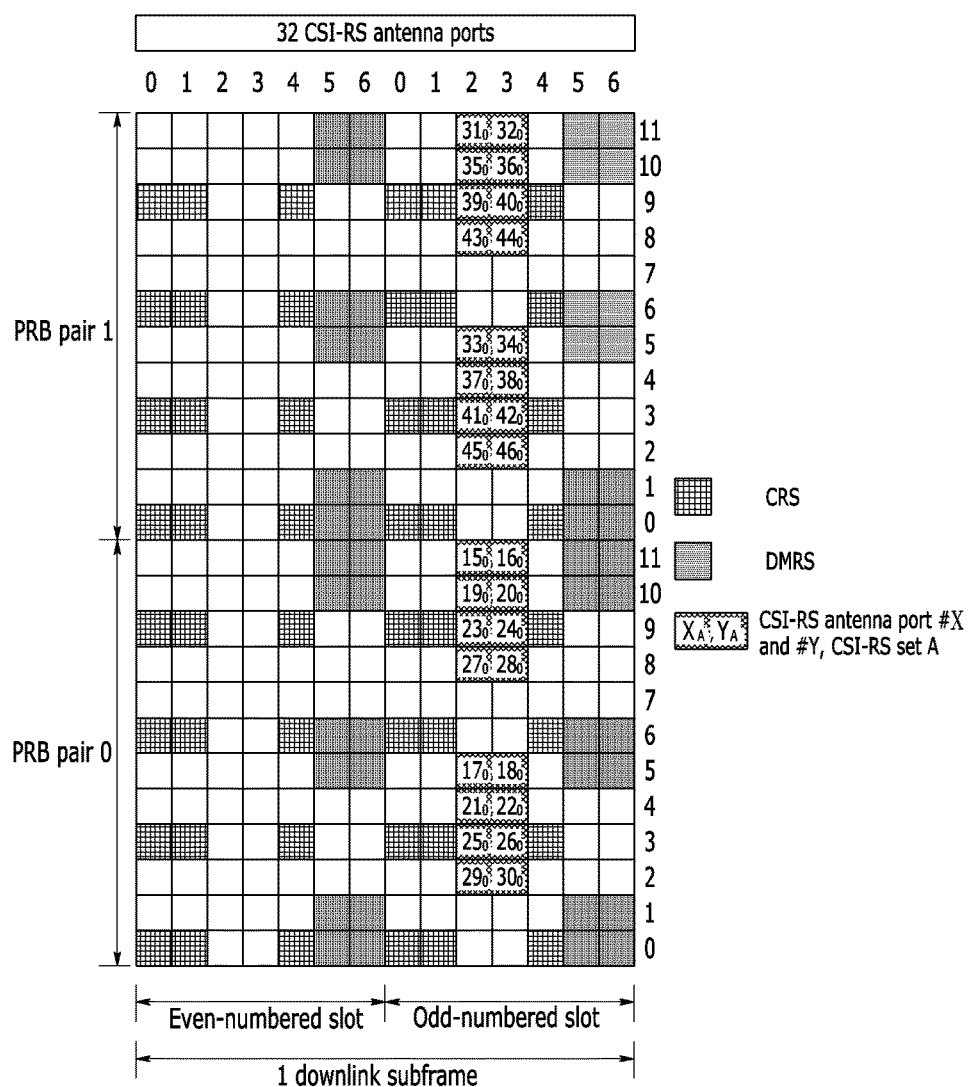
FIG. 14 shows a method for configuring a resource for thirty-two CSI-RS antenna ports by using a method Mb200 according to an exemplary embodiment of the present invention.

FIG. 14 shows a method for configuring a resource for thirty-two CSI-RS antenna ports by using a method Mb200 according to an exemplary embodiment of the present invention.

In detail, FIG. 14 exemplifies the case in which two PRB pairs are bundled.

The base station may apply PRB bundling and inter-antenna port multiplexing (FDM) to the pattern of the eight CSI-RS antenna ports of the existing standard, and may extend the CSI-RS pattern four times on the frequency axis to configure a pattern of thirty-two CSI-RS antenna ports.

In this instance, the number of CSI-RS configurations that are configurable in one subframe is 1 (e.g., the number 0). For example, in an exemplary embodiment exemplified in FIG. 14, the RE(2, 11), RE(3, 11), RE(2, 10), RE(3, 10), RE(2, 9), RE(3, 9), RE(2, 8), RE(3, 8), RE(2, 5), RE(3, 5), RE(2, 4), RE(3, 4), RE(2, 3), RE(3, 3), RE(2, 2), and RE(3, 2) of the slot1 in the PRB pair of the number 0 and the RE(2, 11), RE(3, 11), RE(2, 10), RE(3, 10), RE(2, 9), RE(3, 9), RE(2, 8), RE(3, 8), RE(2, 5), RE(3, 5), RE(2, 4), RE(3, 4), RE(2, 3), RE(3, 3), RE(2, 2), and RE(3, 2) of the slot1 in the PRB pair of the number 1 are configured as the CSI-RS RE (e.g., CSI-RS antenna ports of the number 15 to the number 46) for the CSI-RS configuration of the number 0.

An exemplary embodiment exemplified in FIG. 12 to FIG. 14 is a specific example for defining the CSI-RS pattern. The base station may define various CSI-RS patterns in the CSI-RS resource pool through a method that is the same as or similar to the method using the method Mb200.

In a like manner of the method Mb100, when the method Mb200 is applied, the PRB bundling may be applied to 1, 2, 4, or 8 CSI-RS antenna ports.

Figure 15:
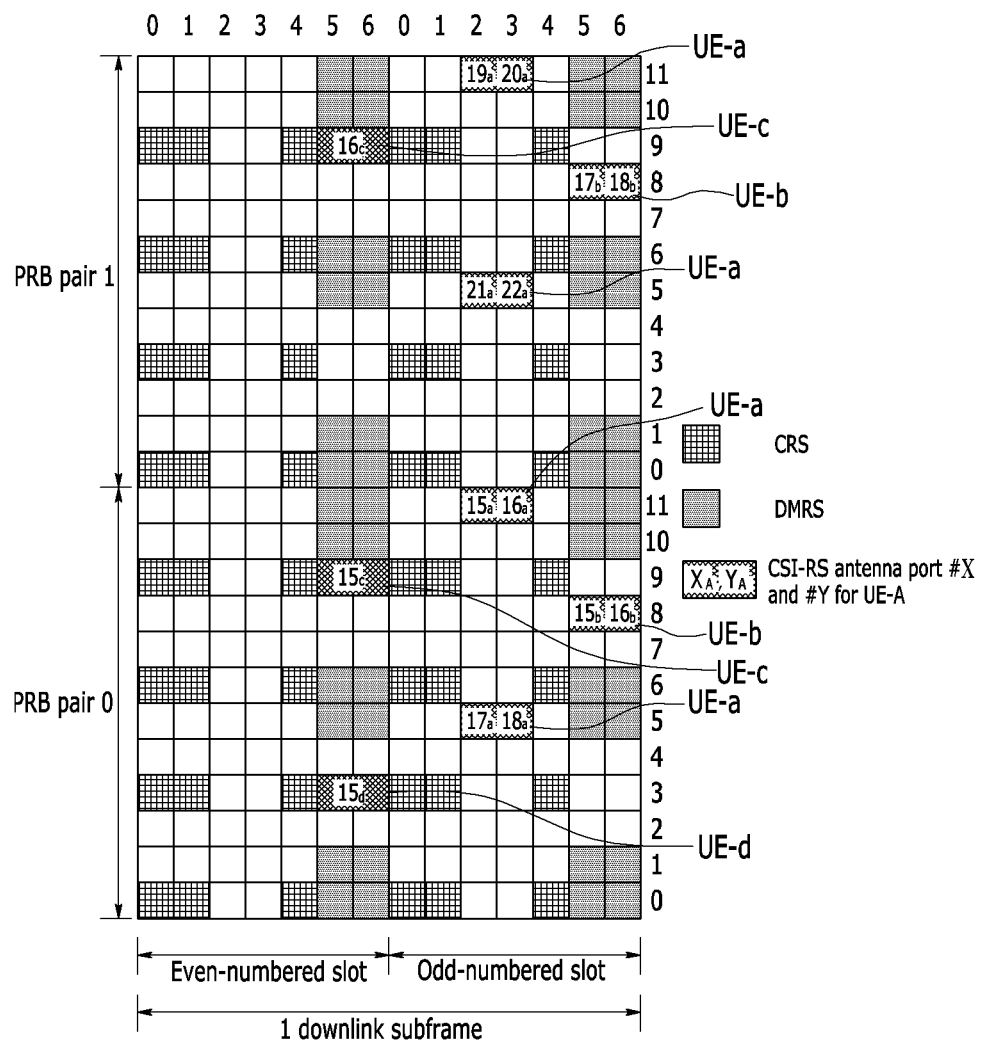
FIG. 15 shows a method for configuring a CSI-RS resource by using a method Mb200 according to another exemplary embodiment of the present invention.

FIG. 15 shows a method for configuring a CSI-RS resource by using a method Mb200 according to another exemplary embodiment of the present invention.

In detail, FIG. 15 exemplifies the case in which a base station bundles two PRB pairs to configure 8, 4, 2, or 1 CSI-RS antenna port to terminals (UE-a, UE-b, UE-c, and UE-d) respectively.

The respective CSI-RS patterns with 2, 4, or 8 antenna ports may be defined in a form in which PRB bundling and inter-antenna port multiplexing (FDM) are applied to the existing CSI-RS pattern of the 1, 2, or 4 antenna ports and the CSI-RS pattern is extended twice on the frequency axis. For example, the RE(2, 11), RE(3, 11), RE(2, 5), and RE(3, 5) of the slot1 in the PRB pair of the number 0 and the RE(2, 11), RE(3, 11), RE(2, 5), and RE(3, 5) of the slot1 in the PRB pair of the number 1 are configured as the CSI-RS RE (e.g., CSI-RS antenna ports of the number 15 to the number 22) for the terminal (UE-a). The RE(5, 8) and RE(6, 8) of the slot1 in the PRB pair of the number 0 and the RE(5, 8) and RE(6, 8) of the slot1 in the PRB pair of the number 1 are configured as the CSI-RS RE (e.g., CSI-RS antenna ports of the number 15 to the number 18) for the terminal (UE-b). The RE(5, 9) and RE(6, 9) of the slot0 in the PRB pair of the number 0 and the RE(5, 9) and RE(6, 9) of the slot0 in the PRB pair of the number 1 are configured as the CSI-RS RE (e.g., CSI-RS antenna ports of the number 15 and the number 16) for the terminal (UE-c).

In the case of the CSI-RS resource configuration on the terminal (UE-a) and the terminal (UE-b) exemplified in FIG. 15, frequency-axis density of the CSI-RS resource is reduced to half compared to a CSI-RS resource configuration of eight or four antenna ports to which the PRB bundling is not applied. Accordingly, a CSI-RS transmission overhead is reduced to half.

However, as can be known through the CSI-RS resource configuration on the terminal (UE-d) exemplified in FIG. 15, when the number of the CSI-RS antenna ports configured to the terminal 1 and the PRB bundling is used, the principle of the method Mb200 may not be applied. Regarding generalization of this, when the size of the PRB bundle is greater than the number of CSI-RS antenna ports configured to the terminal, the principle of the method Mb200 may not be applied. In this case, exceptionally, in a like manner of the method Mb100, the CSI-RS RE set may be mapped on one PRB pair in the PRB bundle. In this instance, the PRB pair on which the CSI-RS RE set is mapped may be predetermined. For example, in FIG. 15, the RE(5, 3) and RE(6, 3) of the slot0 in the PRB pair of the number 0 are configured as the CSI-RS RE (e.g., CSI-RS antenna port of the number 15) for the terminal (UE-d).

Further, as can be known through the CSI-RS resource configuration on the terminal (UE-c), when the number of CSI-RS antenna ports configured to the terminal is 2, there is no reduction of the CSI-RS transmission overhead when the PRB bundling is used. That is, when the size of the PRB bundle is identical with the number of CSI-RS antenna ports, the method Mb200 may be used but there is no overhead reduction effect. In consideration of this, a method for limiting the size (N^bundle_RB) of the PRB bundle to be configured as a value that is less than the number of CSI-RS antenna ports to be configured to the terminal or a submultiple may be used.

When the size (N^bundle_RB) of the PRB bundle is not the submultiple of the number of CSI-RS antenna ports in the method Mb200, the entire antenna ports are mostly uniformly mapped in the PRB bundle, and then in a certain PRB pair, antenna ports may be mapped on the REs that is less than the number of the other PRB pair(s). In this instance, in order for the antenna ports to be mapped on the same number of REs in the entire PRB pairs, a method for again sequentially mapping the CSI-RS antenna ports starting from the number 15 on the residual RE(s) of the PRB pair(s) on which the lesser number of REs are mapped may be considered. In another way, a method for not mapping the CSI-RS on the residual RE(s) may be considered. However, these methods have a difficulty in solving problems such as an imbalance of resource allocation between the CSI-RS antenna ports or degradation of channel estimation performance caused by inefficient resource allocation. Therefore, when the method Mb200 is used, it is desirable for the size (N^bundle_RB) of the PRB bundle to be a submultiple of the number of CSI-RS antenna ports. When the size (N^bundle_RB) of the PRB bundle may be limited to be configured with the exponentiation of 2, it is possible in most cases to configure the size (N^bundle_RB) of the PRB bundle to be a submultiple of the number of CSI-RS antenna ports.

According to the method Mb200, different CSI-RS antenna ports are mapped on the same RE for the respective PRB pairs included in the PRB bundle so it is difficult for the new terminal to which PRB bundling is applicable and the legacy terminal to share the NZP CSI-RS transmission resource. On the contrary, according to the method Mb200, the number and position of CSI-RS REs are identically configured to the entire PRB pairs so the method Mb200 is more advantageous than the method Mb100 in that the legacy terminal is configured with corresponding REs as the ZP CSI-RS and performs PDSCH rate matching.

In the method Mb200, a maximum value of the size (N^bundle_RB) of the PRB bundle may be configured. The size (N^bundle_RB) of the PRB bundle may be limited to not be greater than the number of RBs possessed by one subband. In another way, the size of the PRB bundle may be limited to only be the submultiple of the size of the subband. In another way, the size (N^bundle_RB) of the PRB bundle may be limited to only be 1 and 2.

A method Mb201 is a modified method of the method Mb200 and represents a method for not defining the PRB bundle, but mapping the CSI-RS antenna ports on the entire PRB pairs in the entire system frequency range by a uniform number (or mostly uniform number).

The method Mb201 may be analyzed to be a special case of the method Mb200. That is, the method Mb201 is equivalent to the case (N^bundle_RB=N^DL_RB) in which the size of the PRB bundle is configured to be identical with the system bandwidth in the method Mb200. However, in this case, the REs of a greater number than the number of CSI-RS antenna ports generally configured to the terminal exist throughout the whole frequency band, so a rule for mapping the respective CSI-RS antenna ports on a plurality of REs may be newly defined. A method for repeating sequential mapping of the entire CSI-RS antenna ports starting from the number of 15 may be used. In this instance, a method for following the pattern of the existing 1, 2, 4, or 8 CSI-RS antenna ports may be used (FIG. 16A) or a new method (FIG. 16B) may be used for the rule for mapping antenna ports in one PRB pair. This will be described with reference to FIG. 16A and FIG. 16B.

Figure 16A:
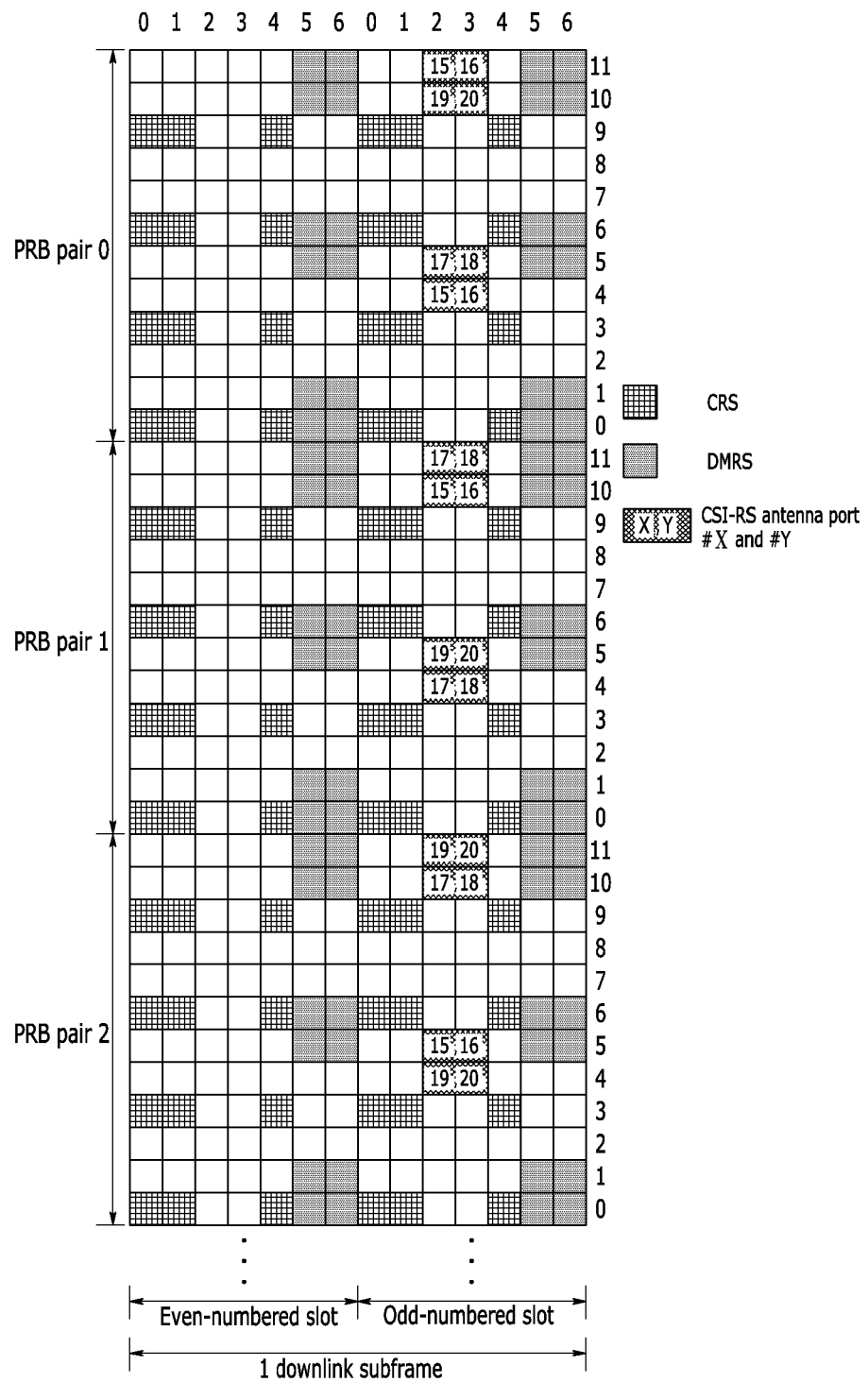
FIG. 16A and FIG. 16B show a method for configuring a resource for six CSI-RS antenna ports by using a method Mb201 according to an exemplary embodiment of the present invention.
Figure 16B:
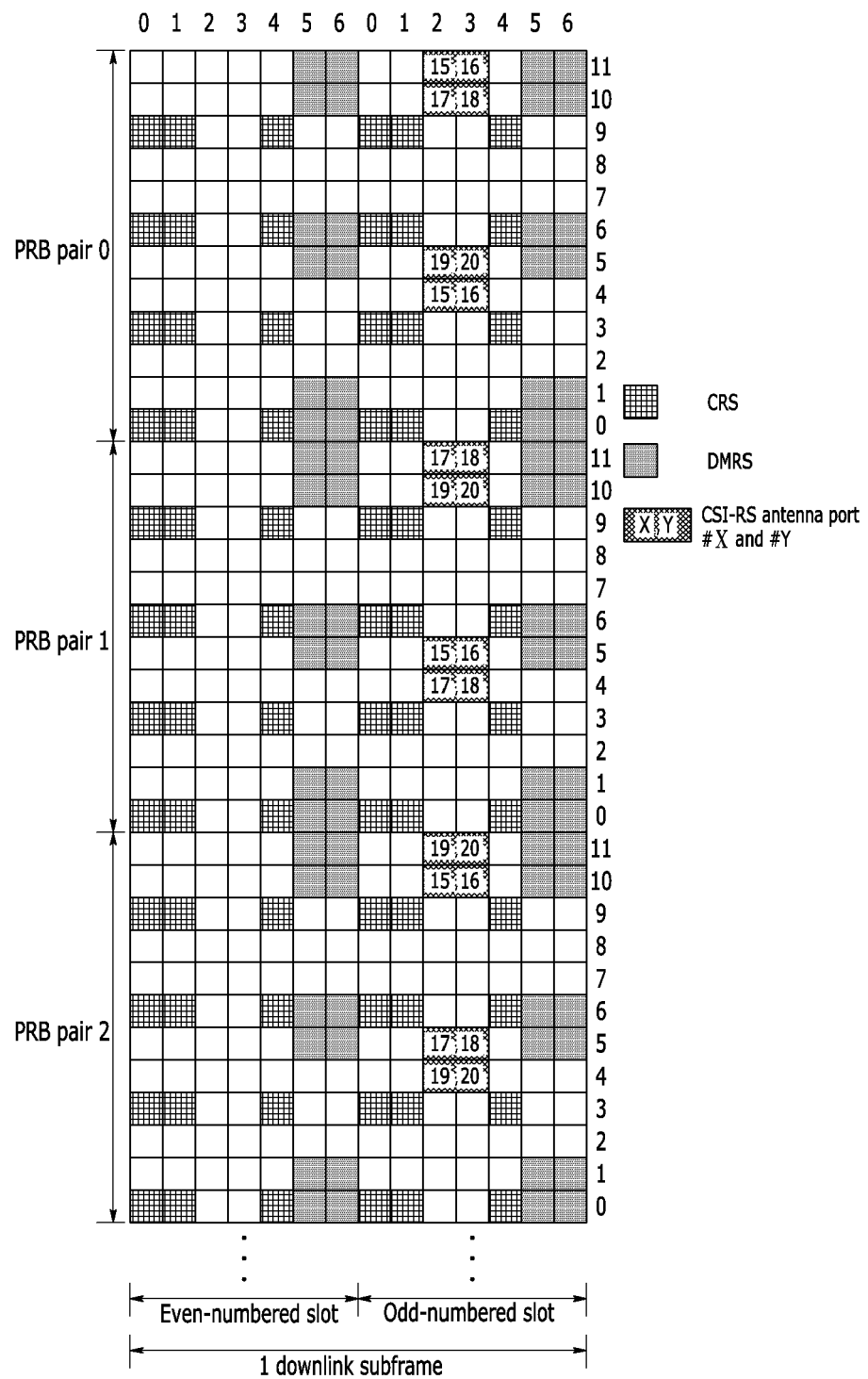

FIG. 16A and FIG. 16B show a method for configuring a resource for six CSI-RS antenna ports by using a method Mb201 according to an exemplary embodiment of the present invention. In an exemplary embodiment exemplified in FIG. 16A and FIG. 16B, differing from the above-described exemplary embodiments, the PRB pair with a higher frequency has a lower PRB pair index.

In detail, FIG. 16A exemplifies the case in which a method for following the pattern of the existing 1, 2, 4, or 8 CSI-RS antenna ports is used. A mapping order of the CSI-RS pattern on eight antenna ports is used in each PRB pair. For example, the RE(2, 11), RE(3, 11), RE(2, 10), RE(3, 10), RE(2, 5), RE(3, 5), RE(2, 4), and RE(3, 4) of the slot1 in the PRB pair of the number 0 are configured as the CSI-RS RE (e.g., CSI-RS antenna ports of the number 15 to the number 20, and CSI-RS antenna ports of the number 15 and the number 16). The RE(2, 11), RE(3, 11), RE(2, 10), RE(3, 10), RE(2, 5), RE(3, 5), RE(2, 4), and RE(3, 4) of the slot1 in the PRB pair of the number 1 are configured as the CSI-RS RE (e.g., CSI-RS antenna ports of the number 17 to the number 20, and CSI-RS antenna ports of the number 15 to the number 18). The RE(2, 11), RE(3, 11), RE(2, 10), RE(3, 10), RE(2, 5), RE(3, 5), RE(2, 4), and RE(3, 4) of the slot1 in the PRB pair 2 are configured as the CSI-RS RE (e.g., CSI-RS antenna ports of the number 19 and the number 20, and CSI-RS antenna ports of the number 15 to the number 20).

FIG. 16B exemplifies a new method ignoring the existing mapping rule. For example, the RE(2, 10) and RE(3, 10) of the slot1 in the PRB pair of the number 0 are configured as the CSI-RS antenna ports of the number 17 and the number 18, and the RE(2, 5) and RE(3, 5) of the slot1 of the PRB pair of the number 0 are configured as the CSI-RS antenna ports of the number 19 and the number 20.

As described, when the number of CSI-RS antenna ports is not an exponentiation of 2, as exemplified in FIG. 16A and FIG. 16B, a case in which the REs mapped on the CSI-RS antenna port number are not disposed on the frequency axis at regular intervals may be generated. By this, degradation of channel estimation performance or a complexity increase may be generated.

In a like manner of the method Mb200, regarding the method Mb201, the new CSI-RS configuration resource extended by the PRB bundling is difficult to be shared by the NZP CSI-RS resource configuration of the legacy terminal, and it is advantageous for the legacy terminal to be configured with the new configuration resource as the ZP CSI-RS and perform a PDSCH rate matching.

The methods for extending or changing the CSI-RS pattern on the frequency axis by use of PRB bundling have been described. A method for identically applying the methods to the configuration of the ZP CSI-RS and extending the same to enable PRB bundling for the ZP CSI-RS resource configuration may be considered. For example, when the method Mb100 is applied to the configuration of the ZP CSI-RS, the base station may notify the terminal of on which PRB pair the ZP CSI-RS RE set indicated by a bitmap is mapped in the PRB bundle, that is, a PRB shift. In another way, one ZP CSI-RS configuration may include a plurality of bitmaps. In this instance, the number of bitmaps may be identical with the size (N^bundle_RB) of the PRB bundle, and the bitmaps and the PRB pairs may be mapped on each other one by one. For another example, when the method Mb200 is applied to the configuration of the ZP CSI-RS, the size of the PRB bundle may be 2. In this instance, a length of the bitmap may become twice the existing length, and respective bits of the bitmap may correspond to the RE set pointed at by the respective CSI-RS configurations in the case of two CSI-RS antenna port in Table 2, in common with the PRB pairs of the number 0 and the number 1. That is, the respective bits of the bitmap may correspond to two REs of the PRB pair of the number 0 and two REs of the PRB pair of the number 1.

When the PRB bundling is applied to the ZP CSI-RS configuration as described above, inter-cell interference control or interference measurement may be easy. For example, when an adjacent cell transmits a PRB-bundled NZP CSI-RS, a serving cell may configure a corresponding resource as the ZP CSI-RS to which same PRB bundling is applied to the terminal, thereby enabling accurate interference measurement or PDSCH resource allocation without wasting a resource.

When the PRB bundling is applied to the CSI-RS, the frequency-axis RE density of the respective CSI-RS antenna ports is reduced so the number of CSI-RS symbols to be transmitted for the respective CSI-RS antenna ports is reduced. In this instance, two kinds of methods may be considered for a CSI-RS sequence generation and a symbol mapping. A first method is to generate a CSI-RS sequence according to the density of the CSI-RS RE reduced for each antenna port, and sequentially map the symbols composing a sequence on the configured REs on the frequency axis. A second method is to generate a CSI-RS sequence with a same length as the existing one for each antenna port, and map the symbols composing a sequence on the configured REs in a like manner of the existing mapping between symbols and PRB pairs (i.e., sparsely). The latter method has a merit in that a new terminal to which PRB bundling is applicable and a legacy terminal may share the CSI-RS sequence so the CSI-RS may be transmitted from the same resource.

In the method Mb100 and the method Mb200, the size of the last PRB bundle may be less than N^bundle_RB. For example, in the case of a system with a bandwidth of 50 RB, when the PRB bundle size of the CSI-RS is configured as 3, the size of the last PRB bundle becomes 2. The same CSI-RS pattern is applied to the last PRB bundle, and a method for omitting mapping from the CSI-RS antenna port having no resource to be mapped because of a lack of PRB pairs may be considered. In another way, a method for not transmitting the CSI-RS at the last PRB bundle may be considered.

The entire above-described methods for bundling a plurality of PRB pairs to configure the CSI-RS resource may be applied for the second CSI-RS configuration. The second CSI-RS configuration may include one or a plurality of CSI-RS configurations, and in this instance, the above-described methods may be applied for the respective CSI-RS configurations. That is, a PRB bundling applied state, a size of the PRB bundle, and a PRB shift may be defined for the respective CSI-RS configurations. In another way, one or a plurality of the PRB bundling applied state, the size of the PRB bundle, and the PRB shift may be defined in common to the entire CSI-RS configuration composing the second CSI-RS configuration. In another way, one or a plurality of the PRB bundling applied state, the size of the PRB bundle, and the PRB shift may be defined in common to the set of part of CSI-RS configuration(s) from among the CSI-RS configurations composing the second CSI-RS configuration.

A method for applying PRB bundling and aggregating a plurality of component CSI-RS configurations to configure a CSI-RS resource to a terminal will now be described.

A method for aggregating a CSI-RS resource for the method Mb100 will now be described. An aggregation method with the highest freedom is a method for independently configuring the size of the PRB bundle for respective component CSI-RS configurations, however, below, the case in which the entire aggregated component CSI-RS configurations have a same PRB bundle size will be considered. In the case of a CSI-RS resource aggregation, the size of the PRB bundle may be signaled to the terminal or may follow a predetermined value. In this instance, it may be divided into a method Mb110 to a method Mb130 depending on whether signaling of the PRB shift is provided.

The method Mb110 represents a method for configuring the PRB shift for respective component CSI-RS configurations.

The method Mb110 is a method with high freedom of CSI-RS resource aggregation compared to the method Mb120 and the method Mb130. In this instance, a parameter for CSI-RS resource aggregation may include PRB shifts for respective component CSI-RS configurations in addition to CSI-RS configuration information on the respective component CSI-RS configurations, and may additionally include a size (N^bundle_RB) of the PRB bundle that is common to the entire component CSI-RS configurations.

The numbers of CSI-RS antenna ports configurable for the respective component CSI-RS configurations may include port number 4 or 8 of the Release 13 standard, or may further include the number(s) of ports other than 4 or 8 while including the described new number of ports.

In the case in which the number of antenna ports is 1, 2, 4, or 8, the component CSI-RS configuration may be a CSI-RS configuration according to the existing standard, and in the case of other numbers of ports, the component CSI-RS configuration may be a newly defined CSI-RS configuration.

The PRB shift may be expressed to be an integer that is equal to or greater than 0 and less than N^bundle_RB as described in the method Mb100.

Figure 17:
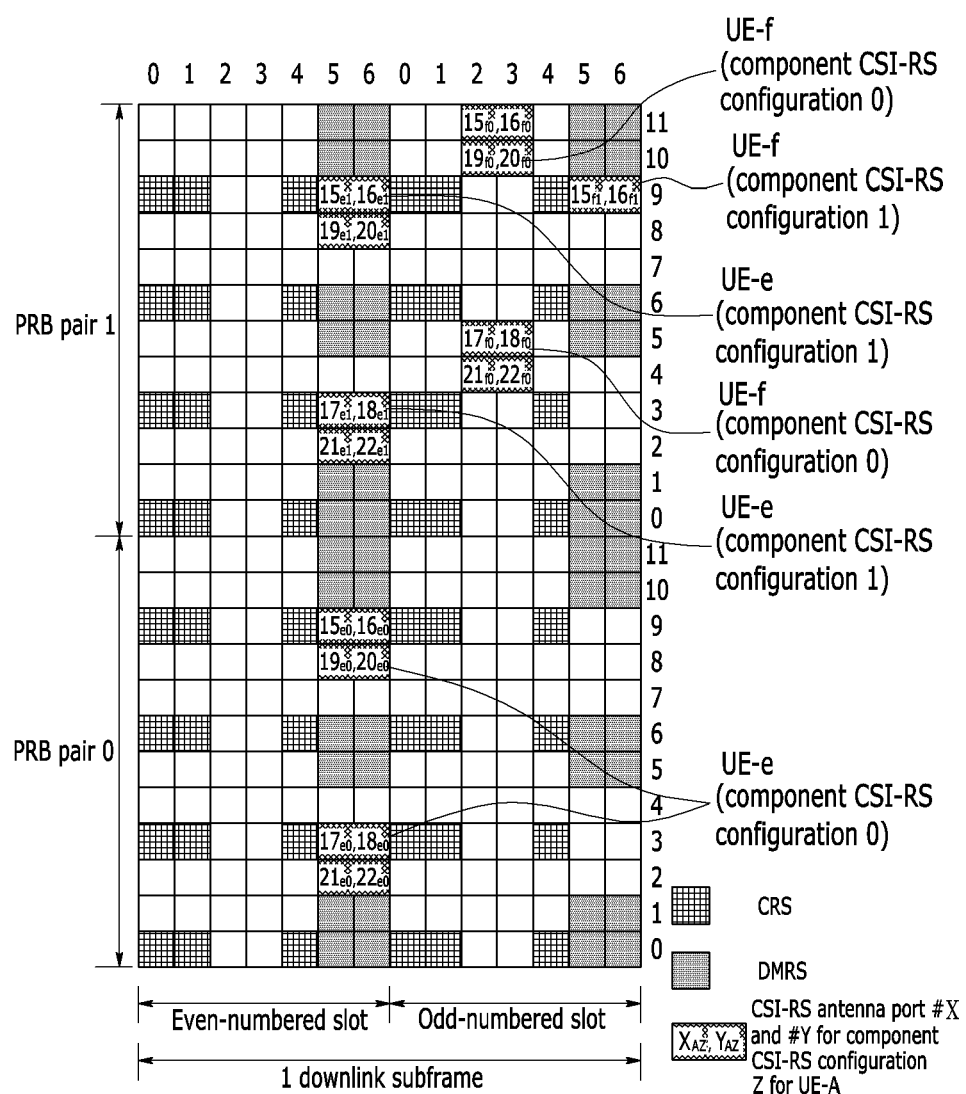
FIG. 17 shows a method for aggregating component CSI-RS configurations by using a method Mb110 according to an exemplary embodiment of the present invention.

FIG. 17 shows a method for aggregating a plurality of component CSI-RS configurations by using a method Mb110 according to an exemplary embodiment of the present invention.

Two component CSI-RS configurations including eight CSI-RS antenna ports are aggregated to the terminal (UE-e) to totally configure sixteen CSI-RS antenna ports. For example, the RE(5, 9), RE(6, 9), RE(5, 8), RE(6, 8), RE(5, 3), RE(6, 3), RE(5, 2), and RE(6, 2) of the slot0 in the PRB pair of the number 0 are configured, for the terminal (UE-e), as the CSI-RS RE (e.g., CSI-RS antenna ports of the number 15 to the number 22) of the component CSI-RS configuration of the number 0. The RE(5, 8), RE(6, 8), RE(5, 3), RE(6, 3), RE(5, 2), and RE(6, 2) of the slot0 in the PRB pair of the number 1 are configured, for the terminal (UE-e) as the CSI-RS RE (e.g., CSI-RS antenna ports of the number 15 to the number 22) of the component CSI-RS configuration of the number 1.

According to the described example on the parameter, the parameter transmitted to the terminal (UE-e) may include PRB shifts for the respective component CSI-RS configurations in addition to CSI-RS configuration information on the respective component CSI-RS configurations, and may additionally include a size (N^bundle_RB) of a PRB bundle that is 2. The PRB shift for the component CSI-RS configuration of the number 0 is 0, and the PRB shift for the component CSI-RS configuration of the number 1 is 1.

In this instance, the two component CSI-RS configurations (the number 0 and the number 1) are allocated on the same OFDM symbol so the FDM may be used for an inter-antenna port multiplexing method of the component CSI-RS configurations of the number 0 and the number 1 for the terminal (UE-e).

In an exemplary embodiment exemplified in FIG. 17, two component CSI-RS configurations are aggregated so a total of ten CSI-RS antenna ports are configured to the terminal (UE-f). For example, the RE(2, 11), RE(3, 11), RE(2, 10), RE(3, 10), RE(2, 5), RE(3, 5), RE(2, 4), and RE(3, 4) of the slot1 in the PRB pair of the number 1 are configured, for the terminal (UE-f), as the CSI-RS RE (e.g., CSI-RS antenna ports of the number 15 to the number 22) of the component CSI-RS configuration of the number 0. The RE(5, 9) and RE(6, 9) of the slot1 in the PRB pair of the number 1 are configured, for the terminal (UE-f), as the CSI-RS RE (e.g., CSI-RS antenna ports of the number 15 and the number 16) of the component CSI-RS configuration of the number 1.

The parameter transmitted to the terminal (UE-f) may include PRB shifts for the respective component CSI-RS configurations in addition to CSI-RS configuration information of the respective component CSI-RS configurations, and may additionally include a size (N^bundle_RB) of the PRB bundle that is 2. The PRB shifts for the component CSI-RS configuration of the number 0 and the component CSI-RS configuration of the number 1 are all 1.

In this instance, two component CSI-RS configurations of the number 0 and the number 1 for the terminal (UE-f) are allocated to the different OFDM symbols, so the TDM, not the FDM, may be used for the inter-antenna port multiplexing method of the component CSI-RS configurations of the number 0 and the number 1.

Figure 18:
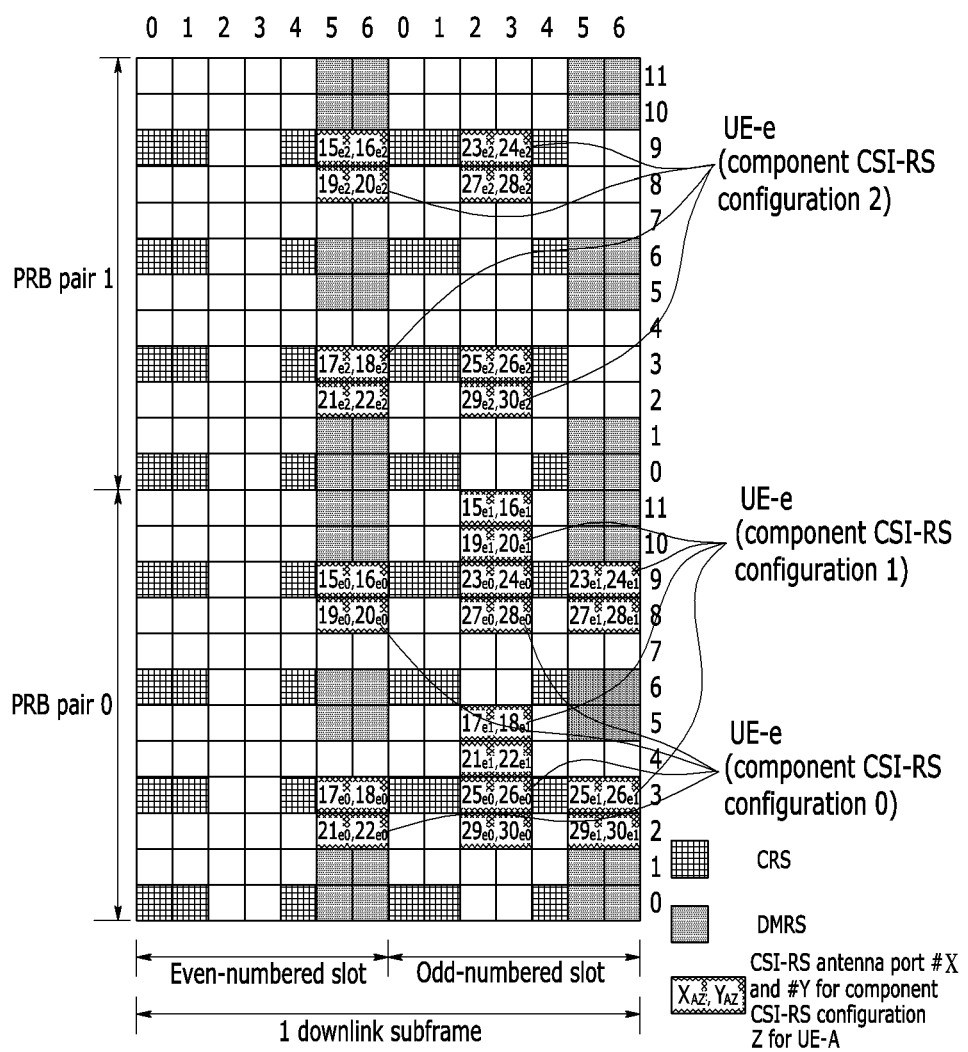
FIG. 18 shows a method for aggregating a plurality of component CSI-RS configurations by using a method Mb110 according to another exemplary embodiment of the present invention.

FIG. 18 shows a method for aggregating a plurality of component CSI-RS configurations by using a method Mb110 according to another exemplary embodiment of the present invention.

In detail, FIG. 18 exemplifies the case in which three component CSI-RS configurations (the number 0, the number 1, and the number 2) are aggregated to totally configure forty-eight CSI-RS antenna ports to one terminal (UE-e).

The PRB bundle size (N^bundle_RB) is 2, and the number of antenna ports of the respective component CSI-RS configurations (the number 0 to the number 2) is 16. For example, the RE(5, 9), RE(6, 9), RE(5, 8), RE(6, 8), RE(5, 3), RE(6, 3), RE(5, 2), and RE(6, 2) of the slot0 in the PRB pair of the number 0 and the RE(2, 9), RE(3, 9), RE(2, 8), RE(3, 8), RE(2, 3), RE(3, 3), RE(2, 2), and RE(3, 2) of the slot1 in the PRB pair of the number 0 are configured, for the terminal (UE-e), as the CSI-RS RE (e.g., CSI-RS antenna ports of the number 15 to the number 30) of the component CSI-RS configuration of the number 0. The RE(2, 11), RE(3, 11), RE(2, 10), RE(3, 10), RE(2, 5), RE(3, 5), RE(2, 4), and RE(3, 4) of the slot1 in the PRB pair of the number 0 and the RE(5, 9), RE(6, 9), RE(5, 8), RE(6, 8), RE(5, 3), RE(6, 3), RE(5, 2), and RE(6, 2) of the slot1 in the PRB pair of the number 0 are configured, for the terminal (UE-e), as the CSI-RS RE (e.g., CSI-RS antenna ports of the number 15 to the number 30) of the component CSI-RS configuration of the number 1. The RE(5, 9), RE(6, 9), RE(5, 8), RE(6, 8), RE(5, 3), RE(6, 3), RE(5, 2), and RE(6, 2) of the slot0 in the PRB pair of the number 1 and the RE(2, 9), RE(3, 9), RE(2, 8), RE(3, 8), RE(2, 3), RE(3, 3), RE(2, 2), and RE(3, 2) of the slot1 in the PRB pair of the number 1 are configured, for the terminal (UE-e), as the CSI-RS RE (e.g., CSI-RS antenna ports of the number 15 to the number 30) of the component CSI-RS configuration of the number 2.

A method Mb120 represents a method for configuring an identical value of the PRB shift to the entire component CSI-RS configurations.

A method Mb120 represents a method for limiting the configuration to a certain degree and reducing signaling overhead, compared to the method Mb110. According to the method Mb120, the CSI-RS REs of the entire component CSI-RS configurations are mapped on the same PRB pair so it may be difficult to aggregate a plurality of CSI-RS antenna ports.

The method Mb130 represents a method for the PRB shift to not be signaled to the terminal but follow a predetermined rule.

The method Mb130 represents a method for limiting the configuration to a certain degree and reducing a signaling overhead, compared to the method Mb110 and the method Mb120. As a method for a predetermined aggregation rule, a method for determining the PRB shift to be a function of an index of each component CSI-RS configuration may be considered. For example, the PRB shift for each component CSI-RS configuration may be established by a resulting value generated by taking a modulo operation on the corresponding component CSI-RS configuration index with the size (N^bundle_RB) of the PRB bundle (hereinafter, 'method Mb130-1'). In another way, the size (N^bundle_RB) of the PRB bundle may be established as the number of the component CSI-RS configurations, and the PRB shift for each component CSI-RS configuration may be established as the index of the corresponding component CSI-RS configuration (hereinafter, 'method Mb130-2').

In this instance, the parameter for CSI-RS resource aggregation may include CSI-RS configuration information on the respective component CSI-RS configurations, or may additionally include the size (N^bundle_RB) of the PRB bundle that is common to the entire component CSI-RS configurations.

Figure 19:
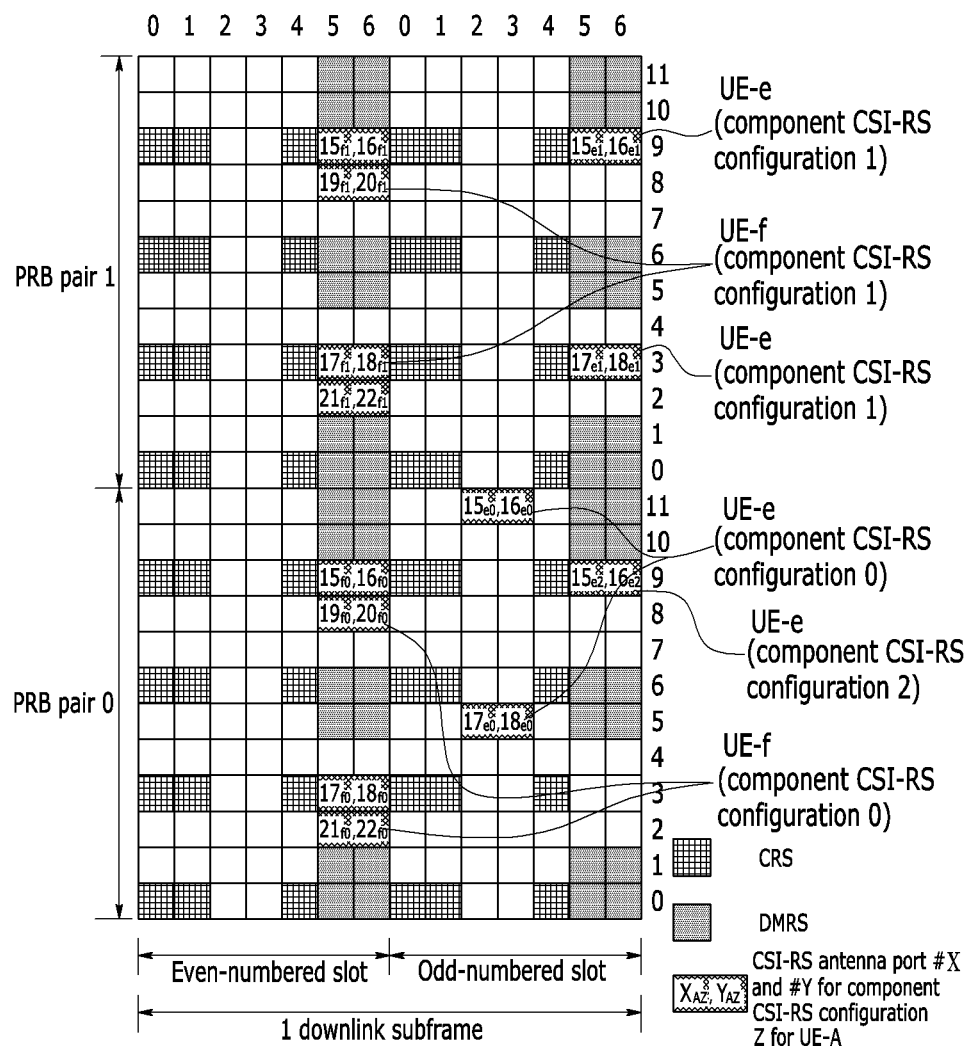
FIG. 19 shows a method for aggregating a plurality of component CSI-RS configurations by using a method Mb130 according to an exemplary embodiment of the present invention.

FIG. 19 shows a method for aggregating a plurality of component CSI-RS configurations by using a method Mb130 according to an exemplary embodiment of the present invention.

Three component CSI-RS configurations are aggregated and a total of ten CSI-RS antenna ports are configured to the terminal (UE-e) by the method Mb130-1. For example, the RE(2, 11), RE(3, 11), RE(2, 5), and RE(3, 5) of the slot1 in the PRB pair of the number 0 are configured, for the terminal (UE-e), as the CSI-RS RE (e.g., CSI-RS antenna ports of the number 15 to the number 18) of the component CSI-RS configuration of the number 0. The RE(5, 9), RE(6, 9), RE(5, 3), and RE(6, 3) of the slot1 in the PRB pair of the number 1 are configured, for the terminal (UE-e), as the CSI-RS RE (e.g., CSI-RS antenna ports of the number 15 to the number 18) of the component CSI-RS configuration of the number 1. The RE(5, 9) and RE(6, 9) of the slot1 in the PRB pair of the number 0 are configured, for the terminal (UE-e), as the CSI-RS RE (e.g., CSI-RS antenna ports of the number 15 and the number 16) of the component CSI-RS configuration of the number 2.

In this case, the size (N^bundle_RB) of the PRB bundles for the component CSI-RS configuration of the number 0 to the component CSI-RS configuration of the number 2 is 2. Further, the PRB shifts for the component CSI-RS configuration of the number 0 to the component CSI-RS configuration of the number 2 are established as resulting values generated by taking a modulo operation on the corresponding component CSI-RS configuration index with the size (N^bundle_RB) of the PRB bundle, that is, 0, 1, and 0. Two component CSI-RS configurations including eight CSI-RS antenna ports are aggregated so a total of sixteen CSI-RS antenna ports are configured to the terminal (UE-f) by the method Mb130-2. For example, the RE(5, 9), RE(6, 9), RE(5, 8), RE(6, 8), RE(5, 3), RE(6, 3), RE(5, 2), and RE(6, 2) of the slot0 in the PRB pair of the number 0 are configured, for the terminal (UE-f), as the CSI-RS RE (e.g., CSI-RS antenna ports of the number 15 to the number 22) of the component CSI-RS configuration of the number 0. The RE(5, 9), RE(6, 9), RE(5, 8), RE(6, 8), RE(5, 3), RE(6, 3), RE(5, 2), and RE(6, 2) of the slot0 in the PRB pair of the number 1 are configured, for the terminal (UE-f), as the CSI-RS RE (e.g., CSI-RS antenna ports of the number 15 to the number 22) of the component CSI-RS configuration of the number 1.

In this case, the size (N^bundle_RB) of PRB bundle is established as 2, which is the number of the component CSI-RS configurations. Further, the PRB shifts for the component CSI-RS configuration of the number 0 and the component CSI-RS configuration of the number 1 are established as the corresponding component CSI-RS configuration indexes, that is, 0 and 1.

A method for aggregating a CSI-RS resource for a method Mb200 will now be described.

In a like manner of the above descriptions, assuming that the entire aggregated component CSI-RS configurations have an identical PRB bundle size, a parameter for CSI-RS resource aggregation may only include CSI-RS configuration information on the respective component CSI-RS configurations, or may additionally include a size (N^bundle_RB) of the PRB bundle that is common to the entire component CSI-RS configurations.

Figure 20:
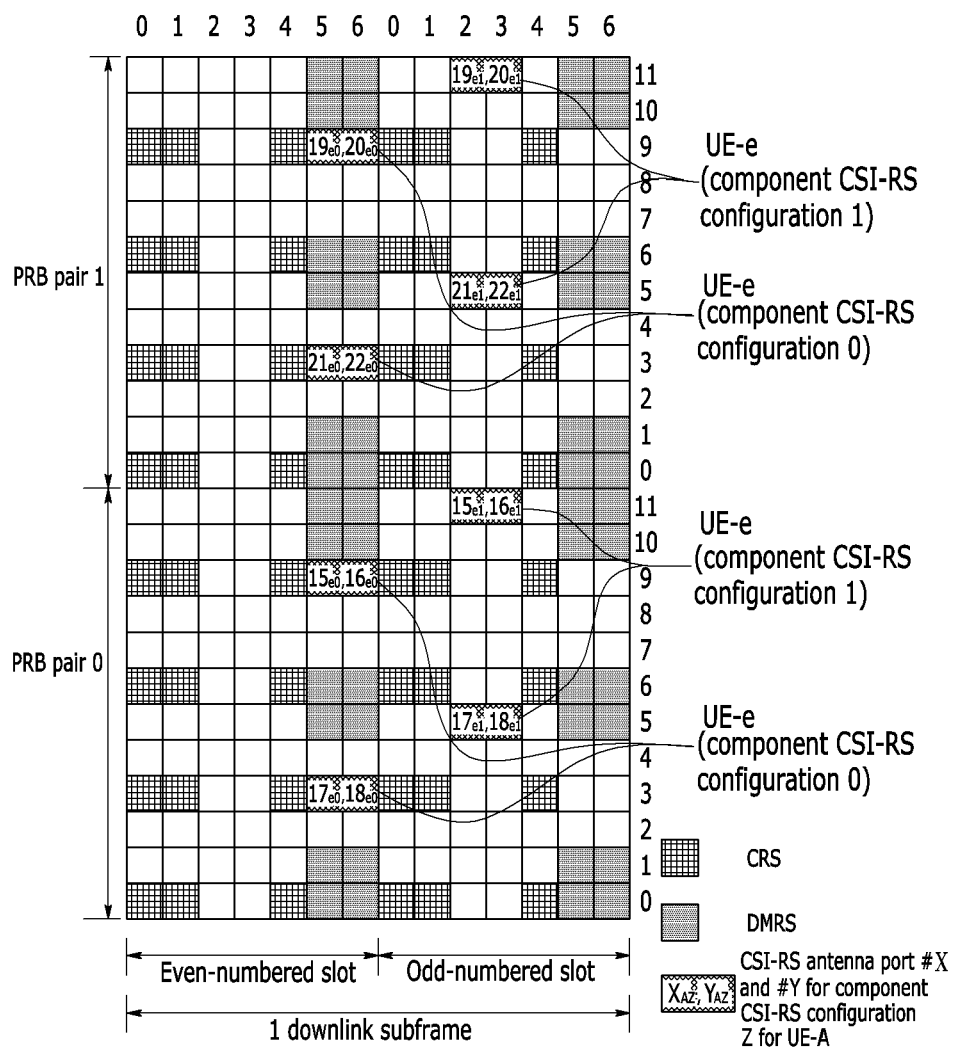
FIG. 20 shows a method for aggregating a plurality of component CSI-RS configurations when PRB bundling of a method Mb200 is used according to an exemplary embodiment of the present invention.

FIG. 20 shows a method for aggregating a plurality of component CSI-RS configurations when PRB bundling of a method Mb200 is used according to an exemplary embodiment of the present invention.

In detail, FIG. 20 exemplifies the case in which the PRB bundle size (N^bundle_RB) is 2 and the number of aggregated component CSI-RS configurations is 2.

A CSI-RS pattern extended by PRB bundling of the method Mb200 is applied to the component CSI-RS configurations of the number 0 and the number 1, and the component CSI-RS configurations of the number 0 and the number 1 have eight CSI-RS antenna ports. For example, the RE(5, 9), RE(6, 9), RE(5, 3), and RE(6, 3) of the slot0 in the PRB pair of the number 0 and the RE(5, 9), RE(6, 9), RE(5, 3), and RE(6, 3) of the slot0 in the PRB pair of the number 1 are configured, for the terminal (UE-e), as the CSI-RS RE (e.g., CSI-RS antenna ports of the number 15 to the number 22) of the component CSI-RS configuration of the number 0. The RE(2, 11), RE(3, 11), RE(2, 5), and RE(3, 5) of the slot1 in the PRB pair of the number 0 and the RE(2, 11), RE(3, 11), RE(2, 5), and RE(3, 5) of the slot1 in the PRB pair of the number 1 are configured, for the terminal (UE-e), as the CSI-RS RE (e.g., CSI-RS antenna ports of the number 15 to the number 22) of the component CSI-RS configuration of the number 1.

Regarding all the above-described methods for configuring a CSI-RS resource by bundling a plurality of PRB pairs, a method for periodically crossing indices of a PRB pair and transmitting a CSI-RS over different subframes may be applied.

Figure 21:
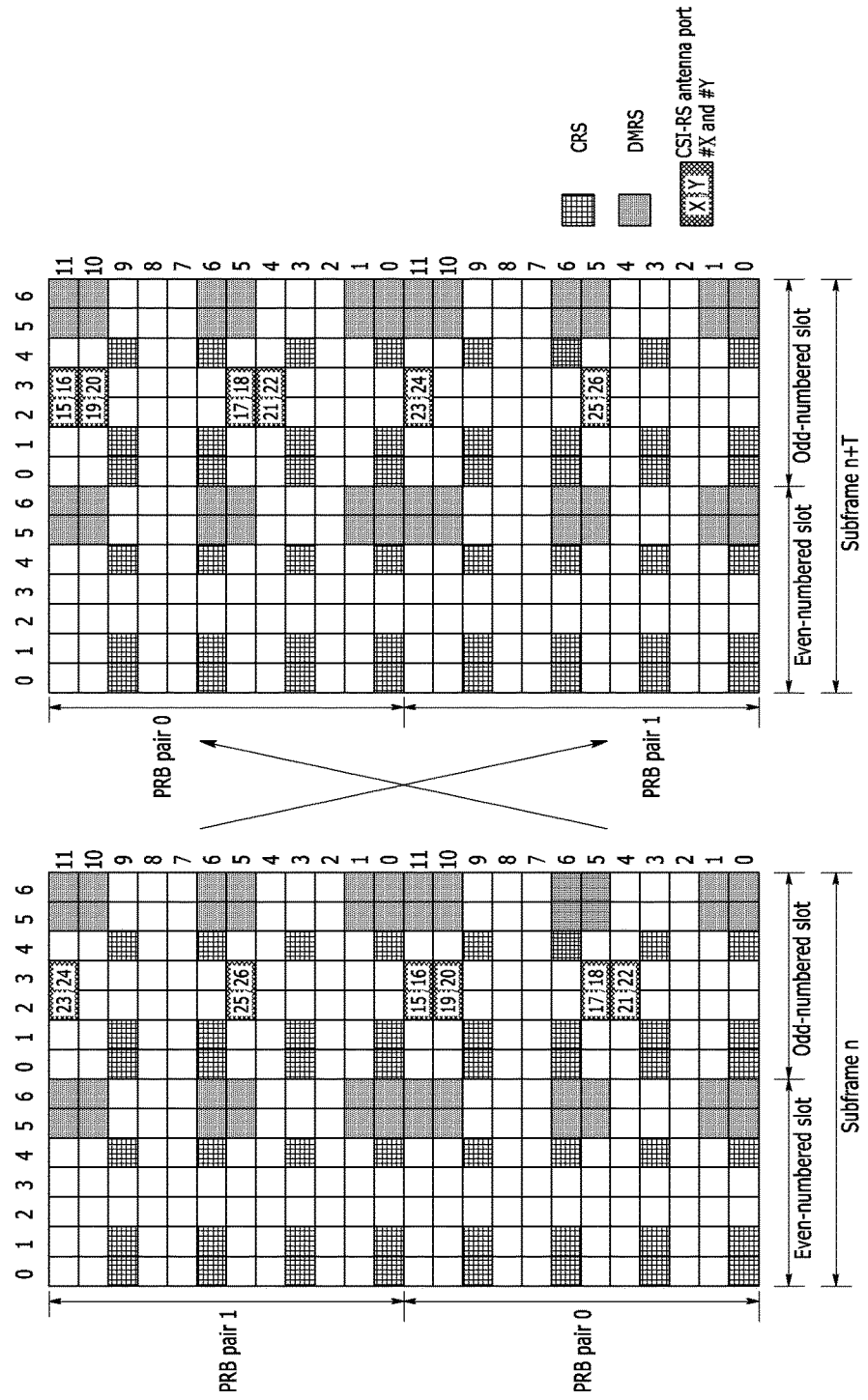
FIG. 21 shows a method for transmitting a CSI-RS by transposing indices of bundled PRB pairs with respect to time according to an exemplary embodiment of the present invention.

FIG. 21 shows a method for transmitting a CSI-RS by transposing indices of bundled PRB pairs with respect to time according to an exemplary embodiment of the present invention.

As exemplified in FIG. 13A and FIG. 13B, when the base station bundles two PRB pairs according to the method Mb200 to configure twelve CSI-RS antenna ports to the terminal, the base station may alternately exchange positions of the PRB pairs for respective CSI-RS transmission subframes to transmit the CSI-RS as exemplified in FIG. 21.

In detail, assuming the CSI-RS transmission periodicity as T, the CSI-RS may be transmitted in a form in which positions of the PRB pair of the number 0 and the number 1 in a CSI-RS transmission subframe n+T are exchanged with positions of the PRB pairs of the number 1 and the number 0 in a CSI-RS transmission subframe n.

Through this, the terminal may perform channel estimation for a frequency domain of the entire PRB pairs in the system frequency range for the respective CSI-RS antenna ports so CSI measurement accuracy may be improved.

The above-described methods for aggregating a CSI-RS resource by bundling a plurality of PRB pairs may be applied to the first CSI-RS configuration. Further, as described above, the described methods for aggregating a CSI-RS resource may be identically or similarly applied to a configuration of a new number of CSI-RS antenna ports.

As a method for applying CDM-4 to the method Mb100 and detailed methods of the method Mb100, in a like manner of the existing standard case in which the PRB bundling is not applied, a method for applying CDM-4 in each component CSI-RS configuration may be used. In this case, when the number of antenna ports of the component CSI-RS configuration is 4 or 8, a CDM-4 pattern of the existing standard may be applied in a same way. On the contrary, when the CDM-4 is applied in each the component CSI-RS configuration so as to apply the CDM-4 to the method Mb200 and the detailed methods of the method Mb200, a distance between the REs composing the CDM-4 pattern in the frequency axis becomes distant and channel estimation performance may be degraded. In this case, a method for defining one CDM-4 pattern throughout a plurality of (e.g., 2) component CSI-RS configurations may be used.

2.3.2. A Method for Configuring a CSI-RS Resource Only Applicable to the TDD when a Normal CP is Configured In Table 2, a CSI-RS pattern and resource mapping on the CSI-RS configurations of the number 20 to the number 31 are designed to avoid overlapping of the antenna port of the number 5 with a DMRS transmission resource. In this instance, a CSI-RS resource pool in one PRB pair to which the PRB bundling is not applied includes twenty-four REs. In this case, the above-described PRB bundling methods and principles may be identically or similarly applied. However, it is impossible to define the patterns of more than twenty-four CSI-RS antenna ports or aggregate more than twenty-four CSI-RS antenna ports in one PRB pair.

2.3.3. A Method for Configuring a CSI-RS Resource Applicable in Common to an FDD and a TDD when an Extended CP is Configured When an extended CP is configured, the CSI-RS configurations applied in common to the FDD and the TDD are a total of 16 from the number 0 to the number 15 according to the existing standard. The CSI-RS resource pool in one PRB pair includes thirty-two REs. In this case, the above-described PRB bundling methods and principles may be identically or similarly applied.

2.3.4. A Method for Configuring a CSI-RS Resource Only Applicable to a TDD when an Extended CP is Configured When an extended CP is configured, the CSI-RS resource configurations of the CSI-RS configurations of the number 16 to the number 27 according to the existing standard are designed to mostly avoid the overlapping of the antenna port of the number 5 with a DMRS transmission resource. In this case, the CSI-RS resource pool in one PRB pair includes twenty-four REs. In this case, the above-described PRB bundling methods and principles may be identically or similarly applied. However, it is impossible to define the patterns of more than twenty-four CSI-RS antenna ports or aggregate more than twenty-four CSI-RS antenna ports in one PRB pair.

An exemplary embodiment of the present invention has been described with the case in which the downlink RS is a CSI-RS as an example, which is however an exemplar. An exemplary embodiment of the present invention is also applicable to the case in which the downlink RS is not the CSI-RS but another RS.

3. A Method for Configuring a Resource Considering a CSI-RS Antenna Port Array

The terminal performs channel estimation (e.g., channel information acquisition) on the respective configured CSI-RS antenna ports based on the CSI-RS configuration information (e.g., a number of CSI-RS antenna ports and RE mapping information) signaled by the base station. The terminal performs a CSI measurement and report based on the channel information acquired for the CSI-RS antenna ports. Here, the CSI measurement signifies a series of processes for determining a precoding matrix indicator (PMI), a rank indicator (RI), and/or a channel quality indicator (CQI) by using downlink channel information acquired by the terminal through channel estimation. According to the present standard, the terminal assumes that when measuring the CSI, the respective rows of a precoding matrix corresponding to the PMI reported to the base station by the terminal sequentially correspond to the CSI-RS antenna ports starting from the number 15. For example, when the terminal is configured with four CSI-RS antenna ports, the terminal assumes that the first row to the fourth row of the precoding matrix used by the base station are precoding weight values for the channel of the CSI-RS antenna ports of the number 15 to the number 18, and the terminal then measures CSI. In this instance, the terminal knows the total number of CSI-RS antenna ports, and does not explicitly know what disposal the CSI-RS antenna ports actually have.

As described above, in order for the base station to perform three-dimension beamforming in the FD-MIMO (or three-dimensional MIMO) system, the terminal needs to perform a CSI measurement and report on a vertical axis as well as the CSI on the existing horizontal axis.

Hereinafter, the CSI-RS antenna port number will be divided into a cell-specific CSI-RS antenna port number and a user equipment-specific CSI-RS antenna port number and will then be described. The cell-specific CSI-RS antenna port number will be assumed to signify a number to be provided to the entire CSI-RS antenna ports transmitted by the base station from the viewpoint of the base station, and the cell-specific CSI-RS antenna port number will be assumed to be sequentially numbered from the number 0. The user equipment-specific CSI-RS antenna port will be assumed to signify the number provided to the CSI-RS antenna port configured to each terminal from the viewpoint of each terminal. The LTE standard defines that the CSI-RS antenna port number of the terminal is sequentially numbered from the number 15, and for better comprehension and ease of description, it will be assumed to be sequentially numbered from the number 0. In the present specification, when the CSI-RS antenna port number is not specified as cell-specific or user equipment-specific, it will be assumed to be a user equipment-specific CSI-RS antenna port number.

3.1. A Method for Configuring Two-Dimensional CSI-RS Antenna Port Array Information A first dimension and a second dimension may be defined for the two-dimensional CSI-RS antenna port array. In general, the first dimension and the second dimension for the two-dimensional CSI-RS antenna port array may indicate two different arbitrary directions in a two-dimensional space. For example, the first dimension and the second dimension may include a horizontal dimension and a vertical dimension. The horizontal dimension and the vertical dimension may indicate two orthogonal arbitrary dimensions or directions in the two-dimensional space. For example, the two-dimensional space may be a two-dimensional antenna array plane composed with physical antenna elements on which the CSI-RS antenna ports are mapped. The horizontal dimension and the vertical dimension may be used to convey the same meaning as a horizontal axis and a vertical axis, or a horizontal direction and a vertical direction. Hereinafter, for ease of description, the first dimension and the second dimension for the CSI-RS antenna port array will be referred to as the horizontal axis and the vertical axis.

The CSI-RS antenna port array may have single polarization and may have multi-polarization. Here, polarization of the CSI-RS antenna port signifies a polarization possessed by the physical antenna element(s) to which the CSI-RS antenna port is mapped. In this instance, for the CSI-RS antenna port array, a polarization dimension may be defined, separately from the above-described space dimension. In the present specification, the polarization dimension for the CSI-RS antenna port array signifies a dimension in which the CSI-RS antenna ports are composed with a polarization (e.g., 0 degree to 180 degrees) of the mapped physical antenna elements. Hereinafter, the polarization dimension for the CSI-RS antenna port array will be referred to as a polarization axis.

Figure 22:
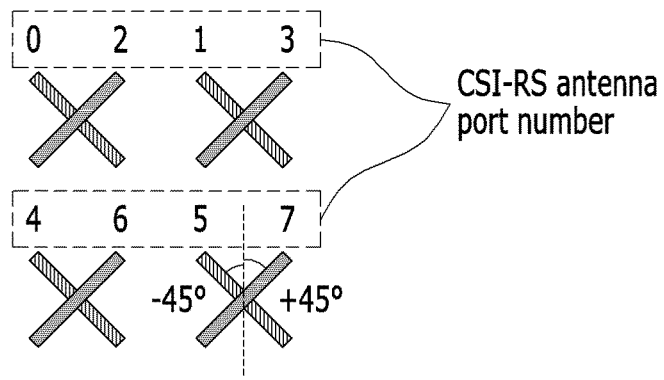
FIG. 22 shows an example of two-dimensional CSI-RS antenna port array.

FIG. 22 shows an example for showing two-dimensional CSI-RS antenna port array.

In detail, FIG. 22 exemplifies the case in which the numbers of CSI-RS antenna ports on the horizontal axis, the vertical axis, and the polarization axis are all 2, and the CSI-RS antenna port numbers starts from the number 0 and are numbered in the order of the horizontal axis, the polarization axis, and the vertical axis. Here, different CSI-RS antenna ports on the polarization axis signify CSI-RS antenna ports mapped on the physical antenna element(s) with different polarizations.

Further, when the two CSI-RS antenna ports existing on the polarization axis are expressed with bars of +45 degrees and −45 degrees respectively in FIG. 22, it means that two CSI-RS antenna ports are mapped on antenna element(s) which is polarized by +45 degrees and antenna element(s) which is polarized by −45 degrees respectively in cross-polarization antenna array often used as dual polarization antenna array. However, in the drawings of the present specification, it is just an example that the polarization directions of the CSI-RS antenna port array with dual polarization are +45 degrees and −45 degrees, and the range of the present invention is not restricted by these examples.

As described above, the mapping between the CSI-RS antenna port and the physical antenna element(s) is referred to as antenna virtualization. The principle of the technique to be described below is not limited by a specific antenna virtualization method so no antenna virtualization method will be described in detail.

The terminal may assume single polarization or dual polarization on the CSI-RS antenna port array according to a codebook used for a CSI measurement and report. According to the present standard, the terminal may assume that the CSI-RS antenna port array has single polarization when using the codebook for two or four transmitting antenna ports introduced in Release 8 to the CSI report. On the contrary, the terminal may assume that the CSI-RS antenna port array has dual polarization when using a codebook for eight transmission antenna ports introduced in Release 10 or a codebook for four transmission antenna ports additionally introduced in Release 12 to the CSI report. The codebooks are appropriate for reporting one-dimensional CSI acquired through the one-dimensional CSI-RS antenna port array, and such a codebook will be referred to as a one-dimensional codebook.

As described above, for the FD-MIMO system, the terminal may need to report two-dimensional CSI to the base station. A codebook appropriate for reporting the two-dimensional CSI will be referred to as a two-dimension codebook. The terminal may report one-dimensional CSI as well as two-dimensional CSI by using the two-dimension codebook. When using the two-dimension codebook for a CSI report, the terminal may need to know space information of the two-dimensional CSI-RS antenna port array. In another way, when configured to not report PMI to the base station, the terminal may need to know space information of the two-dimensional CSI-RS antenna port array so as to determine the CQI and/or the RI. Separately from this, the terminal may need to know polarization information of the two-dimensional CSI-RS antenna port array.

Hereinafter, the numbers of CSI-RS antenna ports on the horizontal axis and the vertical axis of the two-dimensional CSI-RS antenna port array will be referred to as $N_1$ and $N_2$, respectively. When the two-dimensional CSI-RS antenna port array has single polarization, the product of $N_1$ and $N_2$ is identical with the total number of CSI-RS antenna ports of the two-dimensional CSI-RS antenna port array, and when the two-dimensional CSI-RS antenna port array has dual polarization, the product of $N_1$ and $N_2$ is half the total number of CSI-RS antenna ports of the two-dimensional CSI-RS antenna port array.

As a method for the terminal to acquire polarization information of the CSI-RS antenna port array, a method for the base station to notify the terminal of whether the CSI-RS antenna port array has single polarization or dual polarization may be considered. For this, the base station may explicitly signal polarization information (e.g., 1 bit) to the terminal. In another way, the base station may implicitly notify the terminal of polarization information. For example, the base station may notify the terminal of the total number of CSI-RS antenna ports of the two-dimensional CSI-RS antenna port array, and may additionally notify of the product of $N_1$ and $N_2$. When the product of $N_1$ and $N_2$ is identical with the total number of CSI-RS antenna ports, the terminal may assume that the CSI-RS antenna port array has single polarization, and when the product of $N_1$ and $N_2$ is half the total number of CSI-RS antenna ports, it may assume that the CSI-RS antenna port array has dual polarization. Another method is to predefine the number of polarization-axis CSI-RS antenna ports assumed by the terminal to the standard by the respective codebooks. For example, when the terminal is configured to use the two-dimension codebook for the CSI report, it may be specified in the standard that the terminal assumes the CSI-RS antenna port array has dual polarization. The other method is to not define the number of polarization-axis CSI-RS antenna ports assumed by the terminal in the standard, but to allow the terminal to assume an appropriate value according to a form of the codebook. For example, when it is defined in the standard that the two-dimension codebook is appropriate for a CSI report on the dual polarization (or cross-polarization) antenna port array and the terminal is configured to use the two-dimension codebook for the CSI report, the terminal may assume the CSI-RS antenna port array has dual polarization.

As a method for the terminal to acquire space information of the two-dimensional CSI-RS antenna port array, a method for the base station to notify the terminal of space information of the two-dimensional CSI-RS antenna port array may be considered. For this, the base station may signal the space information of the two-dimensional CSI-RS antenna port array to the terminal. In detail, the base station may signal $N_1$ and $N_2$ to the terminal. In another way, the base station may signal the product of $N_1$ and $N_2$ to the terminal, and may additionally signal one of $N_1$ and $N_2$. In this instance, the above-noted methods may be used irrespective of whether the CSI-RS antenna port array is for single polarization or dual polarization. Here, the signaling may include explicit signaling and implicit signaling.

For example, when the base station attempts to configure the eight CSI-RS antenna ports exemplified in FIG. 22 to the terminal, the base station may signal $N_1=2$ and $N_2=2$ to the terminal, and may additionally notify that the CSI-RS antenna port array has dual polarization. For another example, it may be predefined by a given codebook whether the CSI-RS antenna port array has single polarization or dual polarization, and the base station may signal $N_1=2$ and $N_2=2$ to the terminal. For the other example, the base station may notify the terminal that the total number of CSI-RS antenna ports is 8, and may additionally signal $N_1=2$ and $N_2=2$. For the other example, the base station may notify the terminal that the number of the CSI-RS antenna ports is 8, and may additionally notify that the product of $N_1$ and $N_2$ is 4. For the other example, the base station may notify the terminal that the total number of CSI-RS antenna ports is 8, and may not notify of a disposal structure of the space axis or the polarization axis of the CSI-RS antenna port array.

As described above, in the present specification, the signaling for the base station to transmit information to the terminal may include physical layer signaling (e.g., a control field parameter of a physical layer control channel), MAC signaling (e.g., control information in a MAC PDU form, or control information in a MAC header form), and RRC signaling (e.g., an RRC control message or a control parameter in an IE form). Particularly, control signaling through a physical layer signaling or MAC signaling method may have a merit of dynamic resource use when composed with scheduling information for the corresponding terminal or through a simultaneously transmitted method.

Hereinafter, a method for mapping user equipment-specific CSI-RS antenna port numbers on CSI-RS antenna port array composed with the CSI-RS antenna ports configured to the terminal will now be described. For ease of description, the CSI-RS antenna port array will be generally assumed to be two-dimensional. However, in the present specification, without further utterance, the two-dimensional CSI-RS antenna port array may include the one-dimensional CSI-RS antenna port array, and methods applied to the two-dimensional CSI-RS antenna port array may be identically or similarly applied to the one-dimensional CSI-RS antenna port array.

A method (hereinafter, 'method Mc100') for establishing in advance in what order the user equipment-specific CSI-RS antenna port number is mapped on the horizontal axis, the vertical axis, and the polarization axis in the two-dimensional CSI-RS antenna port array may be used. The method Mc100 may be applied when the terminal knows the value of $N_1$ and $N_2$, and additionally knows whether the two-dimensional CSI-RS antenna port array has single polarization or dual polarization.

Figure 23A:
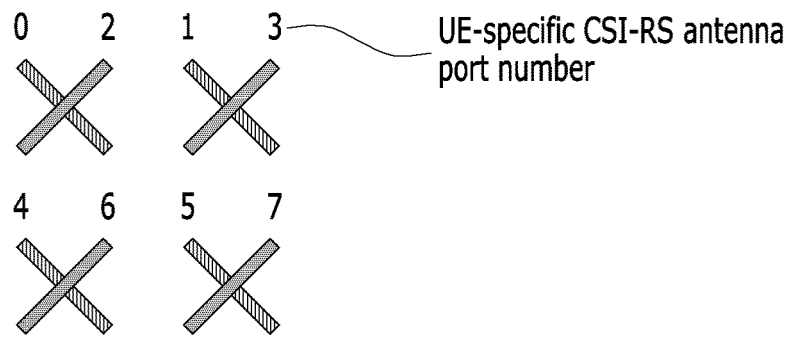
FIG. 23A and FIG. 23B show a method for mapping a user equipment-specific CSI-RS antenna port number on two-dimensional CSI-RS antenna port array according to an exemplary embodiment of the present invention.
Figure 23B:
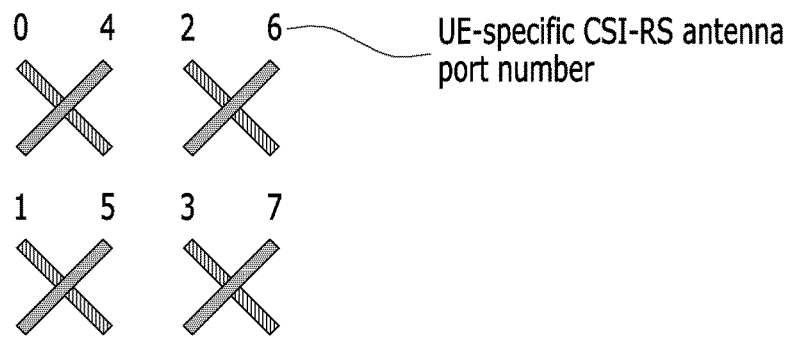

FIG. 23A and FIG. 23B show a method for mapping a user equipment-specific CSI-RS antenna port number on two-dimensional CSI-RS antenna port array according to an exemplary embodiment of the present invention.

FIG. 23A and FIG. 23B exemplify user equipment-specific CSI-RS antenna port numbers recognized by the corresponding terminal in the CSI-RS antenna port array when the base station configures the eight CSI-RS antenna ports exemplified in FIG. 22 to the terminal based on the method Mc100.

In detail, FIG. 23A exemplifies the case in which the user equipment-specific CSI-RS antenna port number is increased in the order of the horizontal axis, the polarization axis, and the vertical axis. FIG. 23B exemplifies the case in which the user equipment-specific CSI-RS antenna port number is increased in the order of the vertical axis, the horizontal axis, and the polarization axis.

A method (hereinafter, 'method Mc101') for establishing in advance in what order the user equipment-specific CSI-RS antenna port number is mapped on the horizontal axis and the vertical axis in the two-dimensional CSI-RS antenna port array may be used. The method Mc101 may be applied when the terminal does not know whether the two-dimensional CSI-RS antenna port array has single polarization or dual polarization. In this instance, irrespective of whether the two-dimensional CSI-RS antenna port array has single polarization or dual polarization, the product of $N_1$ and $N_2$ may be identical with the total number of CSI-RS antenna ports of the two-dimensional CSI-RS antenna port array. For example, the user equipment-specific CSI-RS antenna port number may start from the number 0, it may be sequentially mapped on the horizontal axis, and it may then be mapped on the vertical axis.

A CSI-RS antenna port number mapping rule of the method Mc100 and the method Mc101 may be explicitly defined as described above. In another way, when the terminal attempts to report the horizontal axis PMI and the vertical axis PMI separately or when the terminal attempts to report the horizontal axis PMI, the vertical axis PMI, and the polarization axis PMI separately, the CSI-RS antenna port number mapping rule of the method Mc100 and the method Mc101 may be implicitly defined through a definition on base station precoding assumed by the terminal when CSI is measured. That is, when the terminal performs a CSI measurement, the terminal may assume that the base station applies precoding of Equation 1.

$$\begin{bmatrix} y^{(0)}(i) \\ \vdots \\ y^{(P-1)}(i) \end{bmatrix} = W(i) \cdot \begin{bmatrix} x^{(0)}(i) \\ \vdots \\ x^{(V-1)}(i) \end{bmatrix} \quad \text{[Equation 1]}$$

In Equation 1, $x^{(m)}(i)$ (here, m=0, . . . , V−1) signifies a data symbol transmitted through an m-th data layer at an i-th time, $y^{(n)}(i)$ (here, n=0, . . . , P−1) signifies a precoded data symbol transmitted through an n-th CSI-RS antenna port at an i-th time, and W(i) signifies a precoding matrix at an i-th time, composed with P-numbered rows and V-numbered columns. Here, P is a number of CSI-RS antenna ports, and V is a number of data layers. In this instance, respective precoding matrices corresponding to the horizontal axis PMI, the vertical axis PMI, and the polarization axis PMI reported by the terminal will be defined to be $W_1(i)$, $W_2(i)$, and $W_P(i)$. Here, the matrix of the horizontal axis PMI and $W_1(i)$ has $N_1$-numbered rows, and columns with the same number as horizontal-axis ranks reported by the terminal. The matrix of the vertical axis PMI and $W_2(i)$ has $N_2$-numbered rows, and columns with the same number as vertical-axis ranks reported by the terminal. The matrix of the polarization axis PMI and $W_P(i)$ has one or two rows (e.g., the same has one row when the CSI-RS antenna array has single polarization, and the same has two rows when the CSI-RS antenna array has dual polarization), and columns with the same number as polarization-axis ranks reported by the terminal.

Based upon the definition, W(i) may be expressed with a Kronecker product of $W_1(i)$, $W_2(i)$, and $W_P(i)$, or W(i) may be expressed with a Kronecker product of $W_1(i)$ and $W_2(i)$. For example, in the method Mc100, a method for mapping the user equipment-specific CSI-RS antenna port number on the horizontal axis, the polarization axis, and the vertical axis in order in the CSI-RS antenna port array may define W(i) of Equation 1 so as to have the order of a Kronecker product expressed in Equation 2.

$$W(i)=W_2(i) \otimes W_P(i) \otimes W_1(i) \quad \text{[Equation 2]}$$

For another example, in the method Mc101, a method for mapping the user equipment-specific CSI-RS antenna port number on the horizontal axis and then on the vertical axis in the CSI-RS antenna port array may define W(i) of Equation 1 as expressed in Equation 3.

$$W(i)=W_2(i) \otimes W_1(i) \quad \text{[Equation 3]}$$

For the other example, in the method Mc101, a method for mapping the user equipment-specific CSI-RS antenna port number on the vertical axis and then on the horizontal axis in the CSI-RS antenna port array may define W(i) of Equation 1 as expressed in Equation 4.

$$W(i)=W_1(j) \otimes W_2(i) \quad \text{[Equation 4]}$$

When the terminal does not divide the horizontal-axis PMI and vertical-axis PMI and report the same but reports a joint PMI, it may not be established to divide the precoder of the base station into a horizontal-axis precoder and a vertical-axis precoder as in Equation 2 to Equation 4. In this case, a method (Equation 5 and Equation 6) for defining a relationship among a row index p (here, p=0, 1, . . . , P−1) of W(i) and a horizontal-axis CSI-RS port index $p_1$ (here, $p_1$=0, 1, . . . , $N_1$−1), a vertical-axis CSI-RS port index $p_2$ (here, $p_2$=0, 1, . . . , $N_2$−1), and/or a polarization-axis CSI-RS port index $p_P$ (here, $p_P$=0 in the case of single polarization, and $p_P$=0, 1 in the case of dual polarization) may be considered. For example, for the method Mc100, the terminal may assume Equation 5.

$$p=N_2N_1p_P+N_2p_1+p_2 \quad \text{[Equation 5]}$$

According to Equation 5, the terminal may assume that the user equipment-specific CSI-RS antenna port number is mapped in order of the vertical axis, the horizontal axis, and the polarization axis in the CSI-RS antenna port array.

For the other example, for the method Mc101, the terminal may assume Equation 6.

$$p=N_2p_1+p_2 \quad \text{[Equation 6]}$$

According to Equation 6, the terminal may assume that the user equipment-specific CSI-RS antenna port number is mapped in order of the vertical axis and the horizontal axis in the CSI-RS antenna port array.

As a method that is different from the method Mc100 and the method Mc101, a method (hereinafter, 'method Mc110') for presetting a plurality of CSI-RS antenna port number mapping rules, and signaling which one of a plurality of CSI-RS antenna port number mapping rules the base station will apply to the terminal, may be considered.

For example, the base station may indicate which one to follow between the predefined mapping rule 1 and the mapping rule 2 to the terminal through 1-bit signaling. In detail, the mapping rule 1 may be a rule in which the CSI-RS antenna port number increases in order of the horizontal axis, the polarization axis, and the vertical axis in the CSI-RS antenna port array, and the mapping rule 2 may be a rule in which the CSI-RS antenna port number increases in order of the vertical axis, the horizontal axis, and the polarization axis in the CSI-RS antenna port array.

3.2. A Method for Reordering a CSI-RS Antenna Port Number

Figure 24:
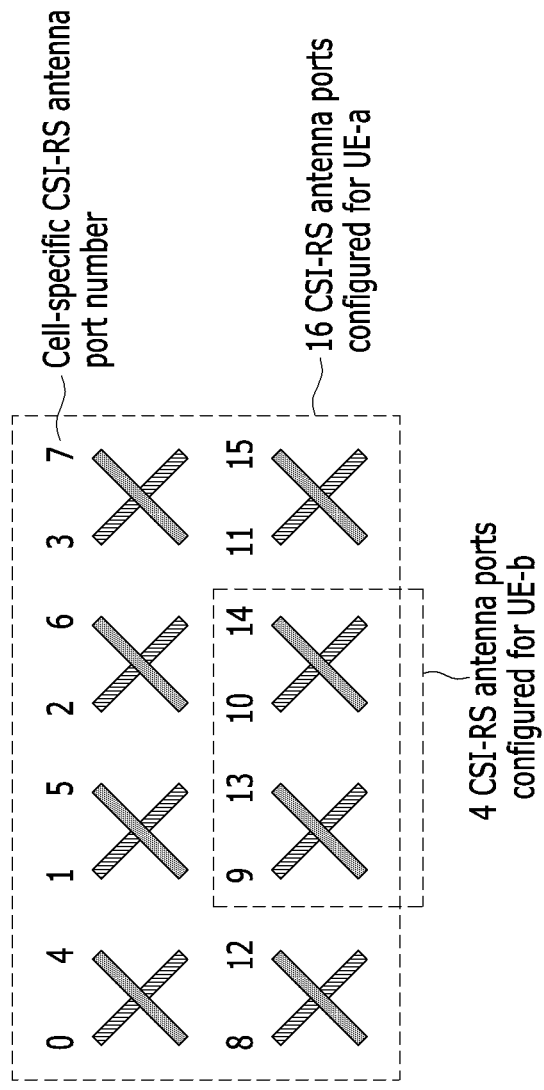
FIG. 24 shows a method for configuring different CSI-RS antenna port sets to a plurality of terminals.

FIG. 24 shows a method for configuring different CSI-RS antenna port sets to a plurality of terminals.

In the FD-MIMO system, when the size of the transmitting antenna array increases, the base station may configure different numbers of CSI-RS antenna ports to a plurality of terminals, or may transmit data to a plurality of terminals by using different portions of the antenna array. For example, in order to acquire a sufficient performance gain using a multi-antenna, it is advantageous to transmit sixteen CSI-RS antenna ports to the terminal when the base station has sixteen transceiver units (TXRUs). However, it may be impossible for a certain terminal to be configured with sixteen CSI-RS antenna ports. The terminal in which it is impossible to be configured with sixteen CSI-RS antenna ports may be a low-cost terminal and an existing (legacy) terminal from before the LTE Release 13. In this instance, for example, the base station may, as exemplified in FIG. 24, configure different CSI-RS antenna port arrays or sets to a plurality of terminals. That is, the base station may configure sixteen CSI-RS antenna ports (cell-specific CSI-RS antenna ports of the number 0 to the number 15) to the terminal (UE-a), and may configure four CSI-RS antenna ports (cell-specific CSI-RS antenna ports of the number 9, the number 10, the number 13, and the number 14) to the terminal (UE-b).

Figure 25A:
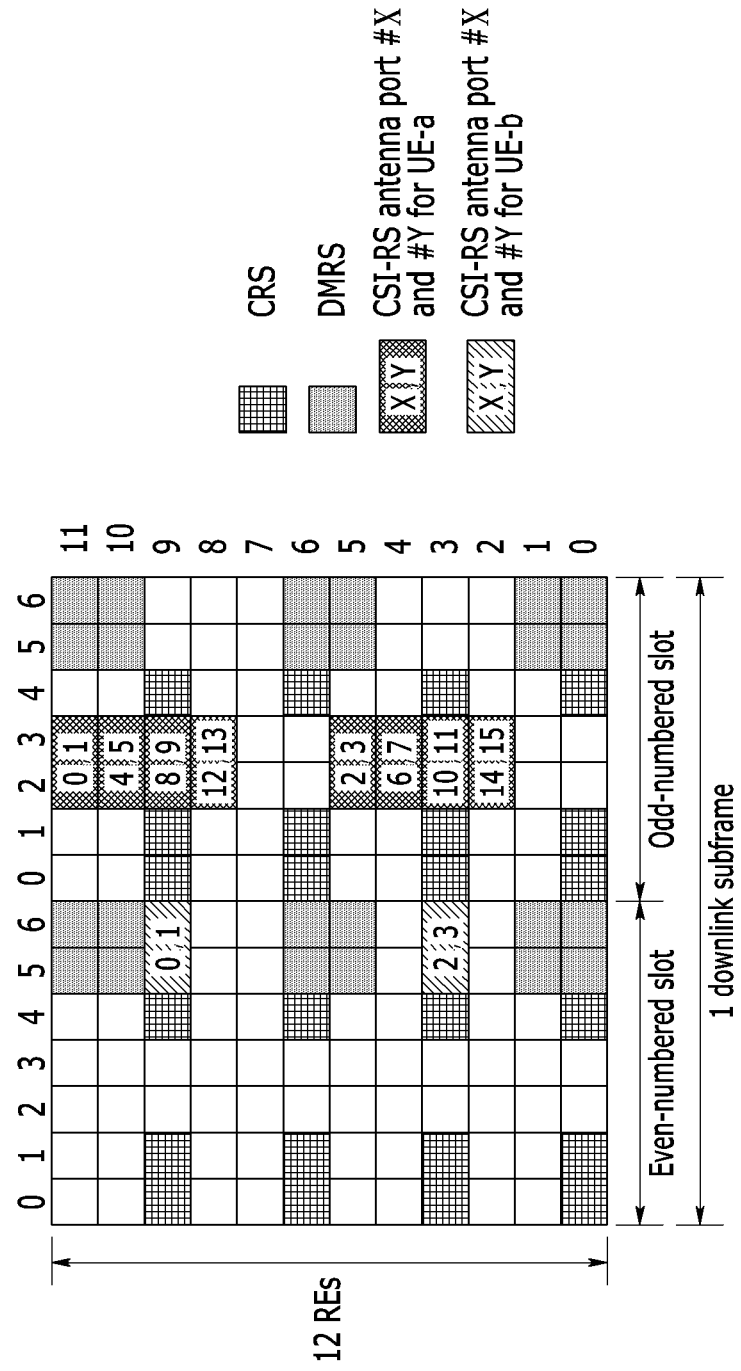
FIG. 25A shows an example of configuring a CSI-RS resource to a plurality of terminals.

FIG. 25A shows an example of configuring a CSI-RS resource to a plurality of terminals.

In the example shown in FIG. 24, the terminal (UE-a) and the terminal (UE-b) respectively need a resource configuration on the sixteen and four CSI-RS antenna ports. In this instance, in a like manner of the resource allocation exemplified in FIG. 25A, the base station may allocate different RE sets to the CSI-RS resource configurations for the terminal (UE-a) and the terminal (UE-b). For example, the base station may configure the RE(2, 11), RE(3, 11), RE(2, 10), RE(3, 10), RE(2, 9), RE(3, 9), RE(2, 8), RE(3, 8), RE(2, 5), RE(3, 5), RE(2, 4), RE(3, 4), RE(2, 3), RE(3, 3), RE(2, 2), and RE(3, 2) of the slot1 as the CSI-RS RE (e.g., user equipment-specific CSI-RS antenna ports of the number 0 to the number 15) for the terminal (UE-a). The base station may configure the RE(5, 9), RE(6, 9), RE(5, 3), and RE(6, 3) of the slot0 as the CSI-RS RE (e.g., user equipment-specific CSI-RS antenna ports of the number 0 to the number 3) for the terminal (UE-b).

The method exemplified in FIG. 24 and FIG. 25A has a merit of applying different kinds of virtualization to the CSI-RS for each terminal, and has a drawback of increasing the number of REs used for the CSI-RS transmission. The base station may consider a CSI-RS transmission overhead, and may configure the CSI-RS RE set for the terminal (UE-b) to which a smaller number of antenna ports is allocated to be included in the CSI-RS RE set for the terminal (UE-a). In other words, the base station may configure a plurality of terminals configured with different CSI-RS antenna port sets to share the CSI-RS transmission resource at a maximum. However, according to the present standard, except for some cases, it is difficult for the base station to configure a plurality of terminals to share the CSI-RS transmission resource.

As a method for solving the problem (e.g., the CSI-RS transmission overhead and the CSI-RS transmission resource sharing), a method (hereinafter, method 'Mc200') for reordering port numbers of the CSI-RS antenna ports configured to the terminal will now be described.

In the method Mc200, reordering of port numbers of CSI-RS antenna ports signifies substitution of new port numbers for existing port numbers when user equipment-specific port numbers of CSI-RS antenna ports configured to the terminal according to a CSI-RS configuration signaling are named the existing port numbers. For example, when the terminal is configured with four CSI-RS antenna ports, the reordering of the port numbers as the number 1, the number 3, the number 0, and the number 2 signifies a substitution of the existing port numbers 0 to 3 of the CSI-RS antenna ports with the numbers 1, 3, 0, and 2. For another example, when two component CSI-RS configuration with eight ports are aggregated and the total of sixteen CSI-RS antenna ports are configured to the terminal, the reordering of port numbers signifies a substitution of the existing port numbers 0 to 7 of the CSI-RS antenna port composing the component CSI-RS configuration of the number 0 and the existing port numbers 0 to 7 of the CSI-RS antenna port composing the component CSI-RS configuration of the number 1 with new port numbers (0 to 15).

In the existing standard, a mapping relationship between the port numbers of the CSI-RS antenna ports configured to the terminal and the REs composing the corresponding CSI-RS RE set is shown in FIG. 1 to FIG. 3. For example, when the terminal is configured with four CSI-RS antenna ports by the CSI-RS configuration of the number 0 according to Table 2, the CSI-RS antenna ports of the number 0 and the number 1 (the number 15 and the number 16 in FIG. 2) are mapped on the RE(5, 9) and RE(6, 9) of the slot0, and the CSI-RS antenna ports of the number 2 and the number 3 (the number 17 and the number 18 in FIG. 2) are mapped on the RE(5, 3) and RE(6, 3) of the slot0. For another example, when the terminal is configured with eight CSI-RS antenna ports by the CSI-RS configuration of the number 1 according to Table 2, the CSI-RS antenna ports of the number 0 and the number 1 (the number 15 and the number 16 in FIG. 3) are mapped on the RE(2, 11) and RE(3, 11) of the slot1, the CSI-RS antenna ports of the number 2 and the number 3 (the number 17 and the number 18 in FIG. 3) are mapped on the RE(2, 5) and RE(3, 5) of the slot1, the CSI-RS antenna ports of the number 4 and the number 5 (the number 19 and the number 20 in FIG. 3) are mapped on the RE(2, 10) and RE(3, 10) of the slot1, and the CSI-RS antenna ports of the number 6 and the number 7 (the number 21 and the number 22 in FIG. 3) are mapped on the RE(2, 4) and RE(3, 4) of the slot1.

Figure 25B:
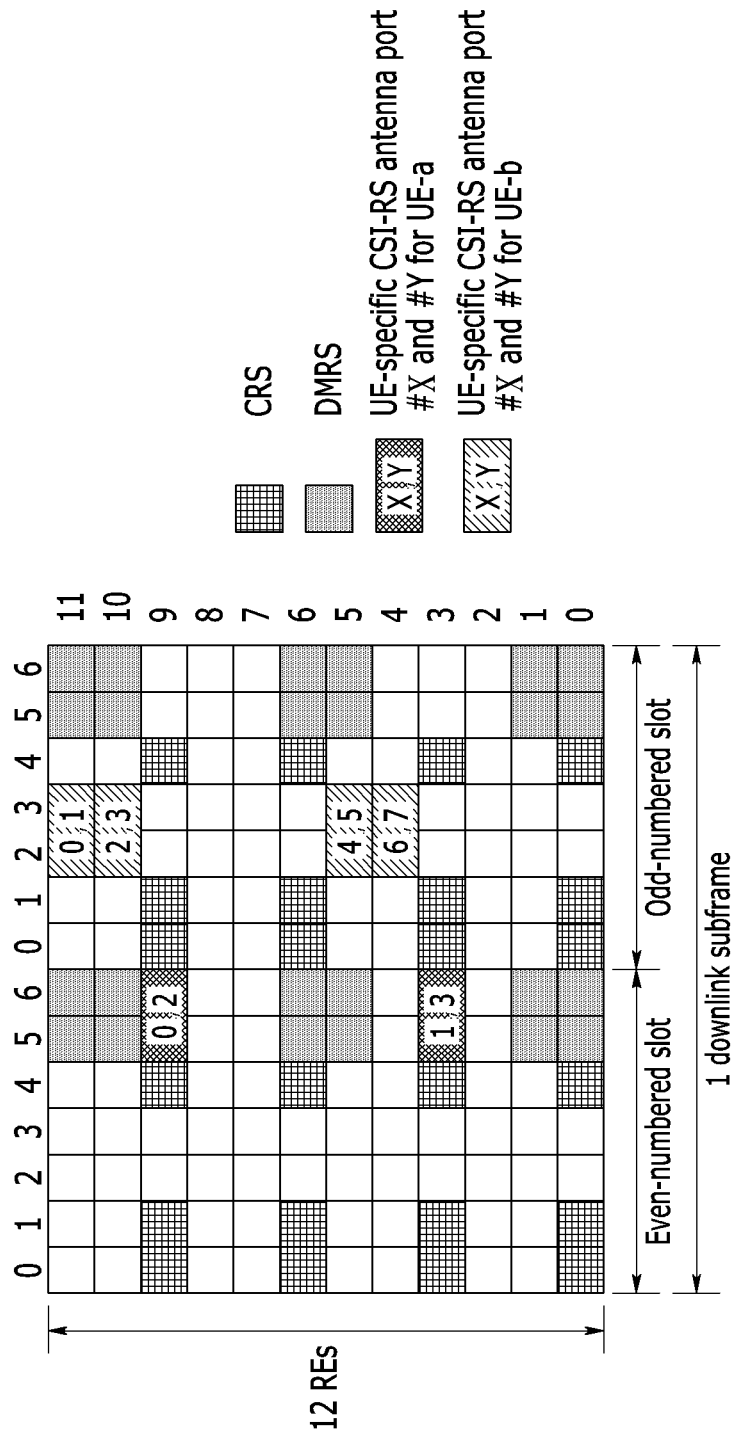
FIG. 25B shows a case in which port numbers of CSI-RS antenna ports configured to a terminal are re-ordered by a method Mc200 so a mapping relationship between the port numbers and the REs becomes different from a prior art according to an exemplary embodiment of the present invention.

FIG. 25B shows a case in which port numbers of CSI-RS antenna ports configured to a terminal are re-ordered by a method Mc200, so a mapping relationship between the port numbers and the REs becomes different from prior art according to an exemplary embodiment of the present invention.

In detail, FIG. 25B exemplifies the case in which four CSI-RS antenna ports are configured to the terminal (UE-a), and the port numbers of the CSI-RS antenna ports are reordered to the numbers 0, 2, 1, and 3 by the method Mc200.

The existing port numbers 0 to 3 are substituted with the new port numbers 0, 2, 1, and 3, so the CSI-RS antenna ports of the number 0, the number 2, the number 1, and the number 3 are mapped on the REs on which the CSI-RS antenna ports of the number 0 to the number 3 were mapped in the existing mapping relationship. That is, the CSI-RS antenna ports of the number 0 and the number 2 are mapped on the RE(5, 9) and RE(6, 9) of the slot0, and the CSI-RS antenna ports of the number 1 and the number 3 are mapped on the RE(5, 3) and RE(6, 3) of the slot0.

FIG. 25B exemplifies the case in which eight CSI-RS antenna ports are configured to the terminal (UE-b), and the port numbers of the CSI-RS antenna ports are reordered as the numbers 0, 1, 4, 5, 2, 3, 6, and 7 by the method Mc200.

The existing port numbers 0 to 7 are substituted with the new port numbers 0, 1, 4, 5, 2, 3, 6, and 7, so the CSI-RS antenna ports of the number 0, the number 1, the number 4, the number 5, the number 2, the number 3, the number 6, and the number 7 are mapped on the REs on which the CSI-RS antenna port of the number 0 to the number 7 were mapped in the existing mapping relationship. That is, the CSI-RS antenna ports of the number 0 and the number 1 are mapped on the RE(2, 11) and RE(3, 11) of the slot1, the CSI-RS antenna ports of the number 2 and the number 3 are mapped on the RE(2,10) and RE(3,10) of the slot1, the CSI-RS antenna ports of the number 4 and the number 5 are mapped on the RE(2, 5) and RE(3, 5) of the slot1, and the CSI-RS antenna ports of the number 6 and the number 7 are mapped on the RE(2, 4) and RE(3, 4) of the slot1.

In the method Mc200, as a method for a terminal to acquire port number reordering information of CSI-RS antenna ports, a method for the base station to notify the terminal of port number reordering information may be considered. For example, the base station may explicitly notify the terminal of new port numbers as substitutes for the existing port numbers. For another example, the base station may notify the terminal of a reordering rule for the terminal to know new port numbers as substitutes for the existing port numbers.

In the example of FIG. 25B, the base station may notify the terminal (UE-a) of a sequence (0, 2, 1, 3) of the new port numbers as reordering information of the CSI-RS antenna port number. In another way, the base station may notify the terminal (UE-a) of a reordering rule for allowing the terminal (UE-a) to know that the new port number sequence is (0, 2, 1, 3). Further, the base station may notify the terminal (UE-b) of a sequence (0, 1, 4, 5, 2, 3, 6, 7) of new port numbers as reordering information of the CSI-RS antenna port numbers. In another way, the base station may notify the terminal (UE-b) of a reordering rule for allowing the terminal (UE-b) to know that the new port number sequence is (0, 1, 4, 5, 2, 3, 6, 7).

A method Mc210 represents a method for defining numbers of all cases that are available as a sequence of new port numbers applicable to the CSI-RS antenna ports configured to the terminal, and signaling one of them to the terminal.

In the method Mc210, the sequence of new port numbers may include a sequence of existing port numbers. The method Mc210 has a merit of ordering port numbers of CSI-RS antenna ports configured to the terminal in an arbitrary order, but has a drawback that the signaling overhead is large. When the number of CSI-RS antenna ports configured to the terminal is N, the number of methods for N port numbers in consideration of an order are a total of N!, so the number of bits used for the signaling following the method Mc200 follows ceil ($\log_2$(N!)). Here, the operation mark '!' represents a factorial operation, and 'ceil( )' signifies a ceiling operation. In another way, when a CDM-2 is applied to the CSI-RS configuration, and when a pair of CSI-RS antenna ports are mapped on the same resource by the CDM, the number of bits used for the signaling according to the method Mc210 may be saved by 1 bit.

A method Mc220 is to predefine one or a plurality of sequences (or a rule or information for generating a sequence of new port numbers) of new port numbers applied to CSI-RS antenna ports configured to the terminal, and signal one of them to the terminal.

In the method Mc220, the sequence of new port numbers may include a sequence of existing port numbers. The method Mc210 and the method Mc220 may include a method for signaling the sequence of new port numbers to the terminal according to an implicit method. In the case of the implicit signaling, the base station may signal not a new port number sequence to the terminal, but a rule or information for notifying of a new port number sequence to the terminal.

A method Mc220 represents a method having less signaling overhead compared to the method Mc210. In the method Mc220, when establishing at least one port number sequence or port number sequence generating rule, a form of the CSI-RS antenna port array and a port number mapping rule in the CSI-RS antenna port array may be considered.

Figure 26A:
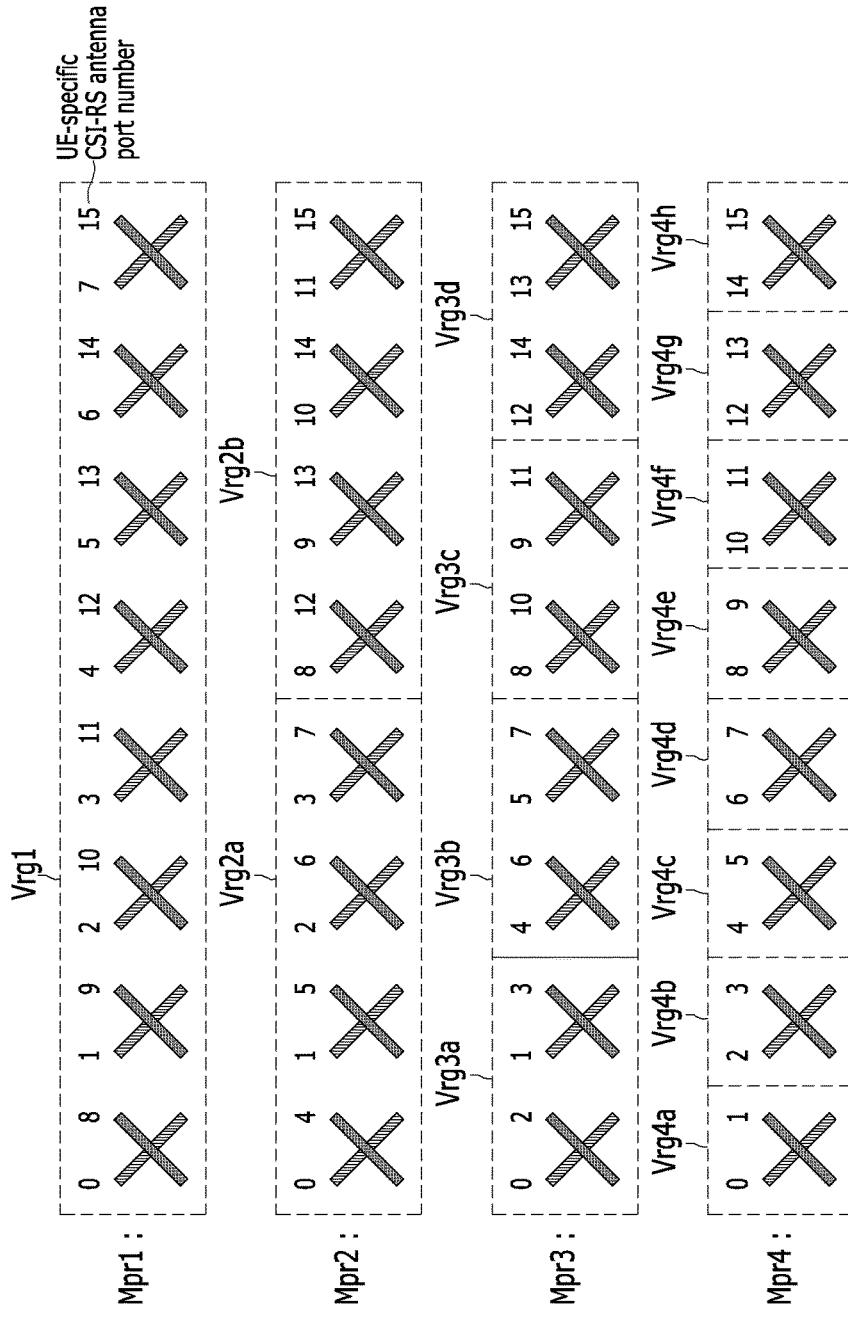
FIG. 26A and FIG. 26B show a case in which a base station notifies a terminal of a rule (or information) for informing of a new port number sequence through implicit signaling when a method Mc220 is used according to an exemplary embodiment of the present invention.
Figure 26B:
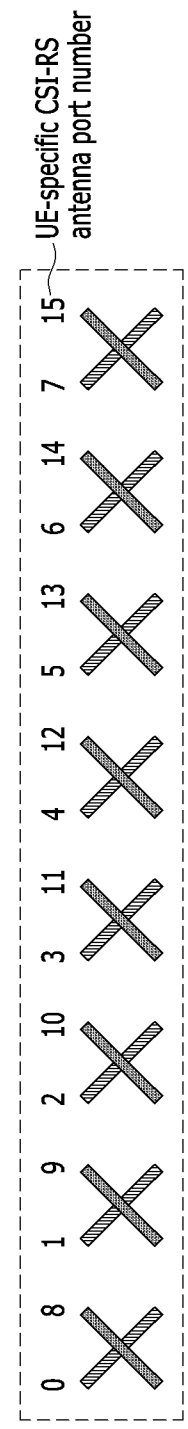

FIG. 26A and FIG. 26B show a case in which a base station notifies a terminal of a rule (or information) for informing of a new port number sequence through implicit signaling when a method Mc220 is used according to an exemplary embodiment of the present invention.

In detail, FIG. 26A and FIG. 26B exemplify the case in which sixteen CSI-RS antenna ports configured to the terminal compose CSI-RS antenna port array (a number of horizontal-axis ports=8, a number of vertical-axis ports=1, and cross-polarization).

FIG. 26A exemplifies port number mapping (Mpr1, Mpr2, Mpr3, and Mpr4) in the CSI-RS antenna port array to be configured to the terminal by the base station. FIG. 26B exemplifies port number mapping assumed by the terminal when performing a CSI measurement and report. In detail, the rule applied to the mapping exemplified in FIG. 26B represents a rule for mapping port numbers on the CSI-RS antenna port array in order of the space axes (or horizontal axis) and the polarization axis. In this instance, the port number mapping rule assumed by the terminal when performing a CSI measurement and report may be predefined in the standard by applying the above-described methods.

A rule for dividing the entire CSI-RS antenna ports (sixteen CSI-RS antenna ports) into one or a plurality of CSI-RS antenna port groups, and mapping the CSI-RS antenna port numbers in a specific order (e.g., in order of the space axes and the polarization axis) in each CSI-RS antenna port group, is applied to the port number mapping (Mpr1, Mpr2, Mpr3, and Mpr4) exemplified in FIG. 26A. In this instance, the order of axes for mapping port numbers in each CSI-RS antenna port group may be identical with the order of port number mapping axes assumed by the terminal when performing a CSI measurement and report. In detail, in the case of the port number mapping (Mpr1), sixteen CSI-RS antenna ports are divided into one CSI-RS antenna port group Vrg1. In the case of the port number mapping Mpr2, sixteen CSI-RS antenna ports are divided into two CSI-RS antenna port groups (Vrg2a and Vrg2b). In the case of the port number mapping Mpr3, sixteen CSI-RS antenna ports are divided into four CSI-RS antenna port groups (Vrg3a, Vrg3b, Vrg3c, and Vrg3d). In the case of the port number mapping Mpr4, sixteen CSI-RS antenna ports are divided into eight CSI-RS antenna port groups (Vrg4a, Vrg4b, Vrg4c, Vrg4d, Vrg4e, Vrg4f, Vrg4g, and Vrg4h). In this instance, the number of CSI-RS antenna port groups may be submultiples of 8 that is a number of CSI-RS antenna ports in the space axes.

As an example of an implicit signaling for the method Mc220, a method (hereinafter, 'method Mc221') for the base station to notify the terminal of one of at least one port number mapping may be considered. For example, the base station may notify the terminal of one of port number mappings (Mpr1, Mpr2, Mpr3, and Mpr4) exemplified in FIG. 26A. When the method Mc221 is used, the terminal controls the port numbers of mapping configured by the base station to match the port numbers of mapping assumed when the CSI measurement and report is performed. For this, the terminal may consider the port number of mapping configured by the base station as an existing port number, and may consider the port number of mapping assumed when the CSI measurement and report is performed as a new port number to reorder the existing port numbers as new port numbers.

In the example of FIG. 26A, when the base station notifies the terminal of the port number mapping Mpr1 based on the method Mc221, the existing port number of the mapping Mpr1 matches the new port number so the terminal does not need to reorder the CSI-RS antenna port number. When the base station notifies the terminal of the port number mapping Mpr2, the terminal may substitute the existing CSI-RS antenna port numbers 0 to 15 with the numbers 0, 1, 2, 3, 8, 9, 10, 11, 4, 5, 6, 7, 12, 13, 14, and 15 according to the relationship between the mapping Mpr2 and the mapping of FIG. 26B. In another way, when the base station notifies the terminal of the port number mapping Mpr3, the terminal may substitute the existing CSI-RS antenna port numbers 0 to 15 with the numbers 0, 1, 8, 9, 2, 3, 10, 11, 4, 5, 12, 13, 6, 7, 14, and 15 according to the relationship between the mapping Mpr3 and the mapping of FIG. 26B. In another way, when the base station notifies the terminal of the port number mapping Mpr4, the terminal may substitute the existing CSI-RS antenna port numbers 0 to 15 with the numbers 0, 8, 1, 9, 2, 10, 3, 11, 4, 12, 5, 13, 6, 14, 7, and 15 according to the relationship between the mapping Mpr4 and the mapping of FIG. 26B.

FIG. 26C, FIG. 26D, FIG. 26E, and FIG. 26F show a case in which a terminal maps CSI-RS antenna port numbers on REs composing a CSI-RS RE set when a base station notifies the terminal of one of port number mappings (Mpr1-Mpr4) shown in FIG. 26A by a method Mc221 according to an exemplary embodiment of the present invention.

In detail, FIG. 26C to FIG. 26F exemplify the case in which two component CSI-RS configurations (the number 0 and the number 1) with eight ports are aggregated so the total of sixteen CSI-RS antenna ports are configured to the terminal. In this instance, the CSI-RS pattern for the eight ports according to the existing standard is identically applied to the respective component CSI-RS configurations. That is, the component CSI-RS configuration of the number 0 includes RE(5, 9), RE(6, 9), RE(5, 8), RE(6, 8), RE(5, 3), RE(6, 3), RE(5, 2), and RE(6, 2) of the slot0 as the REs composing the CSI-RS RE set. The component CSI-RS configuration of the number 1 includes RE(2, 9), RE(3, 9), RE(2, 8), RE(3, 8), RE(2, 3), RE(3, 3), RE(2, 2), and RE(3, 2) of the slot1 as the REs composing the CSI-RS RE set. In FIG. 26C to FIG. 26F, it will be assumed that the CSI-RS antenna port numbers corresponding to the component CSI-RS configuration of the number 0 are 0 to 7, and the CSI-RS antenna port numbers corresponding to the component CSI-RS configuration of the number 1 are 8 to 15.

Figure 26C:
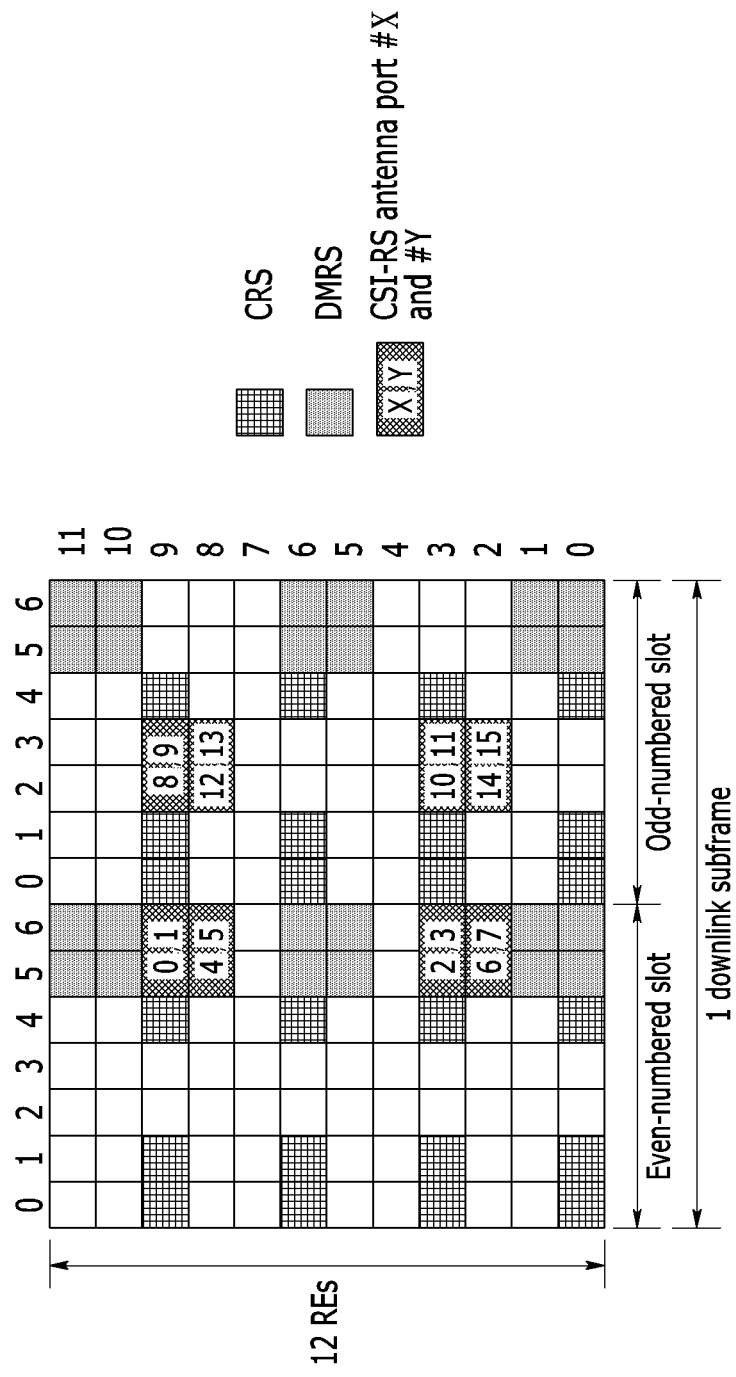
Figure 26D:
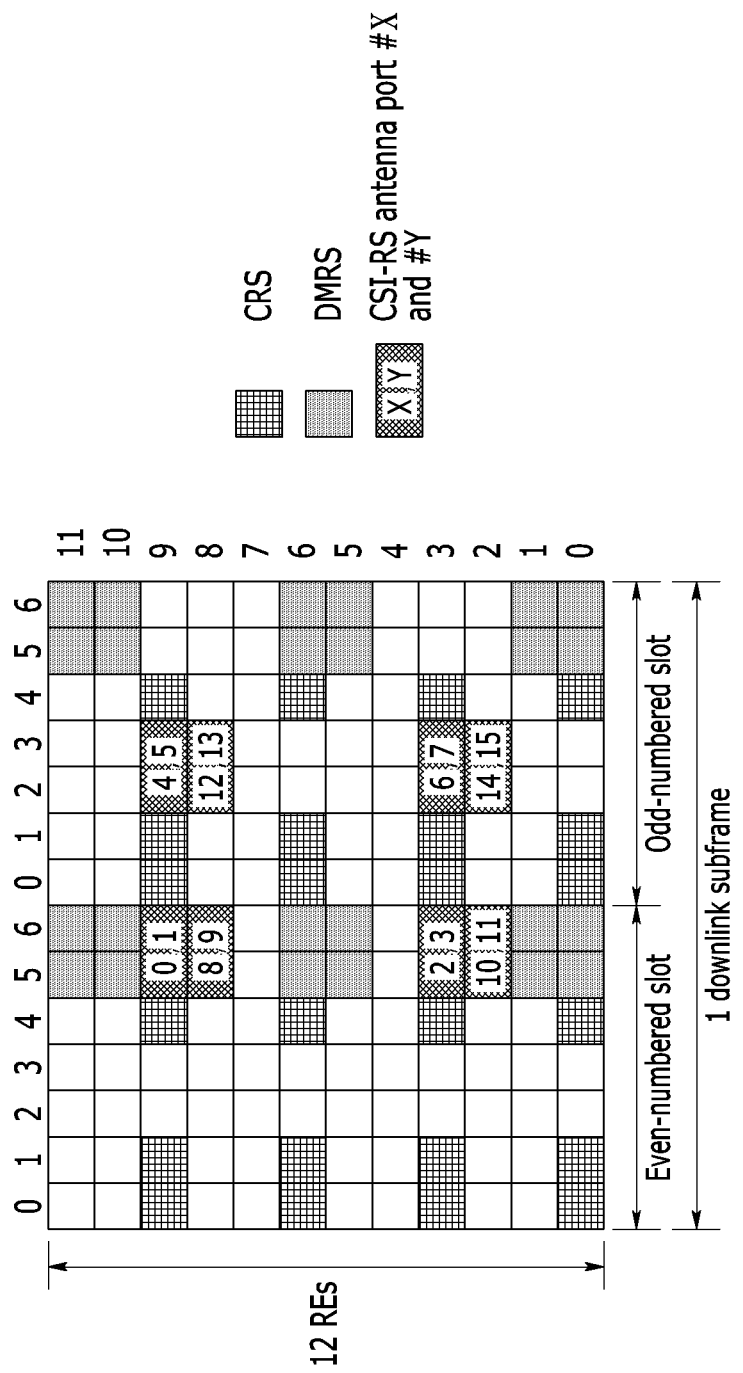
Figure 26F:
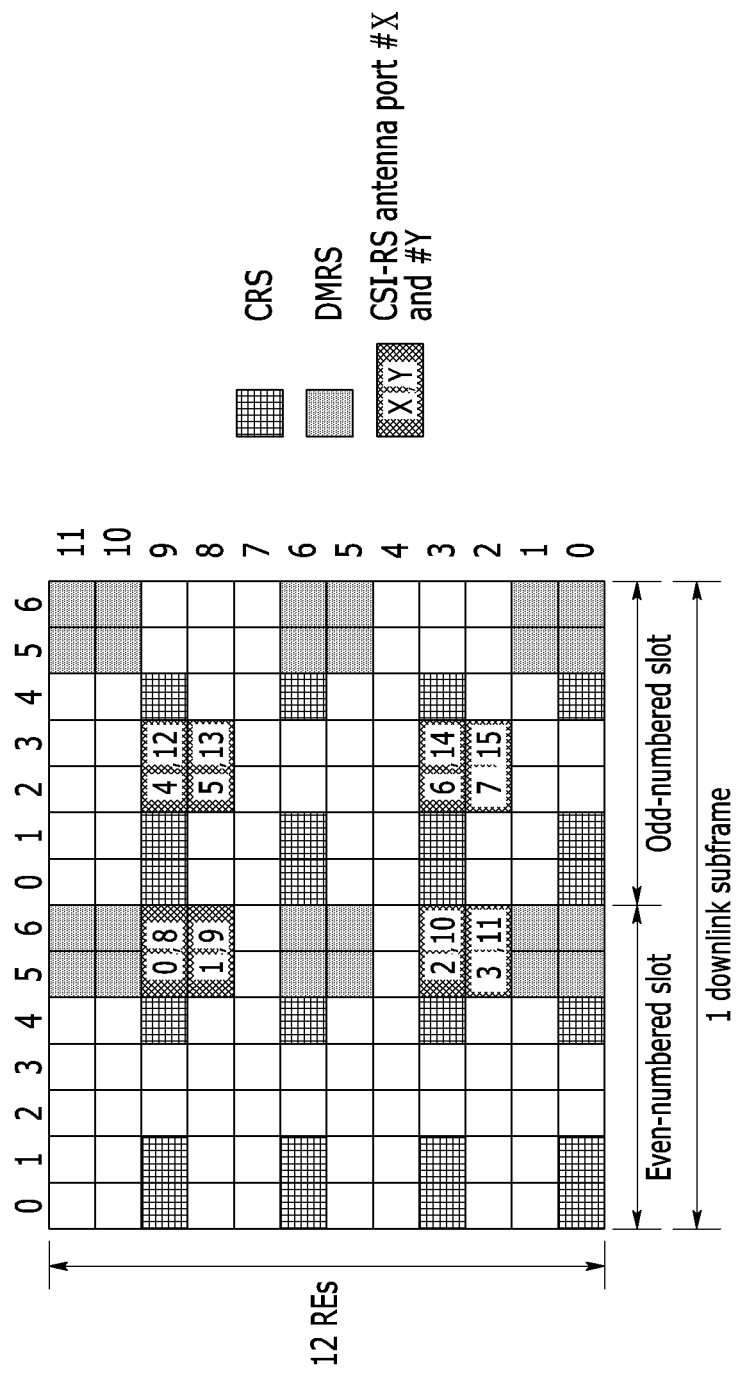

The port-RE mapping exemplified in FIG. 26C corresponds to the case in which the terminal is configured with the port number mapping Mpr1, the port-RE mapping exemplified in FIG. 26D corresponds to the case in which the terminal is configured with the port number mapping Mpr2, the port-RE mapping exemplified in FIG. 26E corresponds to the case in which the terminal is configured with the port number mapping Mpr3, and the port-RE mapping exemplified in FIG. 26F corresponds to the case in which the terminal is configured with the port number mapping Mpr4.

For example, when the terminal is configured with the port number mapping Mpr1 by the method Mc221, it may follow the port-RE mapping exemplified in FIG. 26C. That is, when configured with the mapping Mpr1, the terminal does not need to reorder the CSI-RS antenna port number so it may follow the port-RE mapping according to the existing standard for the respective component CSI-RS configurations.

For another example, when the terminal is configured with the port number mapping Mpr2 by the method Mc221, it may follow the port-RE mapping exemplified in FIG. 26D. That is, the terminal may assume that the port numbers 8 and 9 are mapped on the RE(5, 8) and RE(6, 8) of the slot0 on which the existing port numbers 4 and 5 were mapped, the port numbers 10 and 11 are mapped on the RE(5, 2) and RE(6, 2) of the slot0 on which the existing port numbers 6 and 7 were mapped, the port numbers 4 and 5 are mapped on the RE(2, 9) and RE(3, 9) of the slot1 on which the existing port numbers 8 and 9 were mapped, and the port numbers 6 and 7 are mapped on the RE(2, 3) and RE(3, 3) of the slot1 on which the existing port numbers 10 and 11 were mapped according to the relationship between the mapping Mpr2 and the mapping of FIG. 26B.

For the other example, when the terminal is configured with the port number mapping Mpr3 by the method Mc221, it may follow the port-RE mapping exemplified in FIG. 26E. That is, the terminal may assume that the port numbers 8 and 9 are mapped on the RE(5, 3) and RE(6, 3) of the slot0 on which the existing port numbers 2 and 3 were mapped, the port numbers 2 and 3 are mapped on the RE(5, 8) and RE(6, 8) of the slot0 on which the existing port numbers 4 and 5 were mapped, the port numbers 10 and 11 are mapped on the RE(5, 2) and RE(6, 2) of the slot0 on which the existing port numbers 6 and 7 were mapped, the port numbers 4 and 5 are mapped on the RE(2, 9) and RE(3, 9) of the slot1 on which the existing port numbers 8 and 9 were mapped, the port numbers 12 and 13 are mapped on the RE(2, 3) and RE(3, 3) of the slot1 on which the existing port numbers 10 and 11 were mapped, and the port numbers 6 and 7 are mapped on the RE(2, 8) and RE(3, 8) of the slot1 on which the existing port numbers 12 and 13 were mapped according to the relationship between the mapping Mpr3 and the mapping of FIG. 26B.

For the other example, when the terminal is configured with the port number mapping Mpr4 by the method Mc221, it may follow the port-RE mapping exemplified in FIG. 26F. That is, the terminal may assume that the port numbers 0 and 8 are mapped on the RE(5, 9) and RE(6, 9) of the slot0 on which the existing port numbers 0 and 1 were mapped, the port numbers 2 and 10 are mapped on the RE(5, 3) and RE(6, 3) of the slot0 on which the existing port numbers 2 and 3 were mapped, the port numbers 1 and 9 are mapped on the RE(5, 8) and RE(6, 8) of the slot0 on which the existing port numbers 4 and 5 were mapped, the port numbers 3 and 11 are mapped on the RE(5, 2) and RE(6, 2) of the slot0 on which the existing port numbers 6 and 7 were mapped, the port numbers 4 and 12 are mapped on the RE(2, 9) and RE(3, 9) of the slot1 on which the existing port numbers 8 and 9 were mapped, the port numbers 6 and 14 are mapped on the RE(2, 3) and RE(3, 3) of the slot1 on which the existing port numbers 10 and 11 were mapped, the port numbers 5 and 13 are mapped on the RE(2, 8) and RE(3, 8) of the slot1 on which the existing port numbers 12 and 13 were mapped, and the port numbers 7 and 15 are mapped on the RE(2, 2) and RE(3, 2) of the slot1 on which the existing port numbers 14 and 15 were mapped according to the relationship between the mapping Mpr4 and the mapping of FIG. 26B.

As exemplified in FIG. 26A, when a rule for dividing the total number of CSI-RS antenna ports configured to the terminal into one or a plurality of CSI-RS antenna port groups and mapping port numbers in the respective groups, a method (hereinafter, 'method Mc222') for the base station to notify the terminal not of the port number mapping but of the number of CSI-RS antenna port groups (hereinafter, '$N_{group}$') may be considered. In another way, in order to acquire the equivalent effect, a method (hereinafter, 'method Mc223') for the base station to notify the terminal of the size (i.e., numbers of CSI-RS antenna ports for respective CSI-RS antenna port group, hereinafter '$N_{ports}^{group}$') of the CSI-RS antenna port group may be considered.

For example, when the mappings (Mpr1, Mpr2, Mpr3, and Mpr4) exemplified in FIG. 26A are used, the base station may notify the terminal of one of 1, 2, 4, and 8 as the $N_{group}$ value based on the method Mc222. In another way, the base station may notify the terminal of one of 16, 8, 4, and 2 as the $N_{ports}^{group}$ value based on the method Mc223.

In the method Mc221, when the number of the port number mappings of which the base station may notify the terminal is one, the base station may notify the terminal of the port number mapping. For example, for the method Mc221, the port number mapping Mpr2 may only be used from among the port number mappings (Mpr1, Mpr2, Mpr3, and Mpr4) exemplified in FIG. 26A. In this case, the base station may signal port number mapping Mpr2 information to the terminal. In another way, the base station may notify the terminal of 2 as the $N_{group}$ value based on the method Mc222. In another way, the base station may notify the terminal of 8 as the $N_{ports}^{group}$ value based on the method Mc223.

In the method Mc221, when the number of the port number mappings of which the base station may notify the terminal is one, the port number mapping or its rule may be different depending on the respective numbers of CSI-RS antenna ports configured to the terminal. For example, when the mapping rule exemplified in FIG. 26A is used, the $N_{ports}^{group}$ value may be 8 when the number of CSI-RS antenna ports configured to the terminal is 16, and the value $N_{ports}^{group}$ may be 4 when the number of CSI-RS antenna ports configured to the terminal is 12. In this instance, the base station may notify the terminal of 8 as the $N_{ports}^{group}$ value when the number of CSI-RS antenna ports configured to the terminal is 16, and it may notify the terminal of 4 as the $N_{ports}^{group}$ value when the number of CSI-RS antenna ports configured to the terminal is 12 based on the method Mc223.

When the mapping rule exemplified in FIG. 26A is applied, the number ($N_{group}$) of the CSI-RS antenna port groups may be established with the number of component CSI-RS configurations used for the CSI-RS resource aggregation. For example, as exemplified in FIG. 26C to FIG. 26F, when two component CSI-RS configurations with eight ports are aggregated to configure sixteen CSI-RS antenna ports to the terminal, the number ($N_{group}$) of the CSI-RS antenna port groups may be 2. For another example, when three component CSI-RS configurations with four ports are aggregated to configure twelve CSI-RS antenna ports to the terminal, the number ($N_{group}$) of the CSI-RS antenna port groups may be 3.

When the method Mc220 to the method Mc223 are used, the port-RE mapping assumed by the terminal may be expressed in Equation 7. In Equation 7, p' signifies a CSI-RS antenna port number for each CSI-RS antenna port group, p signifies a new port number on the entire CSI-RS antenna ports configured to the terminal, and i signifies an index of the CSI-RS antenna port group. In Equation 7, p' has an integer value from 0 to ($N_{ports}^{group}-1$) for each CSI-RS antenna port group, p has an integer value from 0 to ($N_{group} \cdot N_{ports}^{group}-1$), and i has an integer value from 0 to ($N_{group}-1$).

For example, when $N_{group}$ component CSI-RS configurations with $N_{ports}^{group}$ ports are aggregated to configure the total of ($N_{group} \cdot N_{ports}^{group}$) CSI-RS antenna ports to the terminal, p' may be a CSI-RS antenna port number for each component CSI-RS configuration, and p may be a new port number on the aggregated CSI-RS antenna ports.

configuration of the number 0 as new port numbers 15 to 18, may substitute the existing port numbers 19 to 22 of the component CSI-RS configuration of the number 0 with new port numbers 23 to 26, may substitute the existing port numbers 15 to 18 of the component CSI-RS configuration of the number 1 with new port numbers 19 to 22, and may substitute the existing port numbers 19 to 22 of the component CSI-RS configuration of the number 1 with new port numbers 27 to 30. For example, when configured with a CSI-RS resource as exemplified in FIG. 26C, the terminal may assume the port-RE mapping exemplified in FIG. 26D according to Equation 7.

When the method Mc222 and the method Mc223 are used, the terminal may substitute the existing port numbers with new port numbers according to Equation 7. For example, as a method for notifying the terminal of the port number mapping Mpr2, the base station may notify the terminal of 2 as the $N_{group}$ value based on the method Mc222. In another way, as a method for notifying the terminal of the port number mapping Mpr2, the base station may notify the terminal of 8 as the $N_{ports}^{group}$ value based on the method Mc223. In the above-noted case, as described above, the terminal may substitute the existing port numbers for the respective CSI-RS antenna port groups (or the respective component CSI-RS configurations) with new port numbers according to Equation 7.

Figure 27:
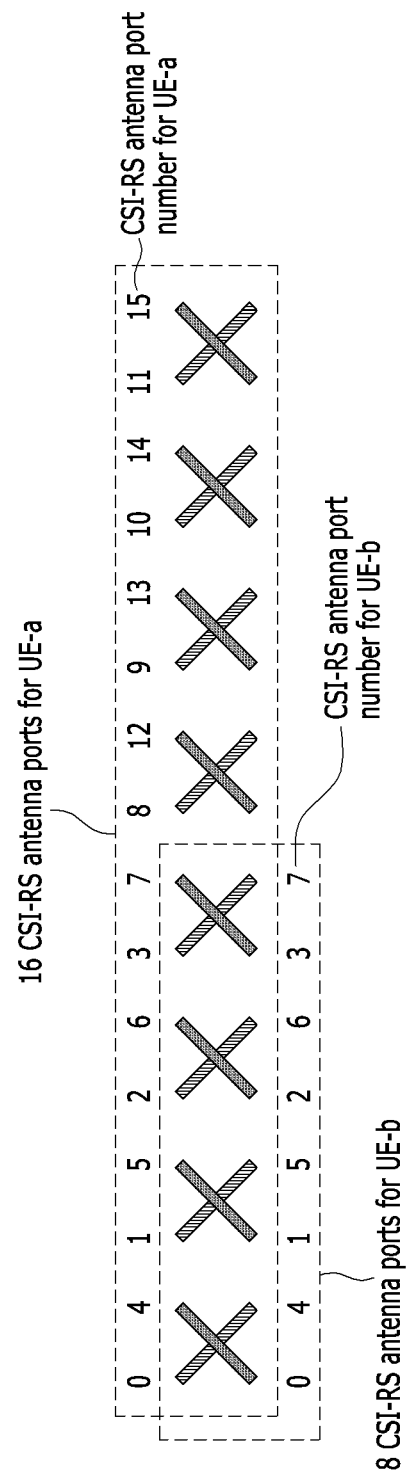
FIG. 27 shows mapping of CSI-RS antenna port number on a plurality of terminals when a method Mc220 is used according to an exemplary embodiment of the present invention.

FIG. 27 shows mapping of a CSI-RS antenna port number on a plurality of terminals when a method Mc220 is used according to an exemplary embodiment of the present invention.

According to the method Mc220, the base station may allow the CSI-RS resource configuration for the terminal to be configured with sixteen CSI-RS antenna ports and the CSI-RS resource configuration for the terminal to be configured with eight CSI-RS antenna ports to share part of the REs. For example, as exemplified in FIG. 27, when the base station attempts to configure sixteen CSI-RS antenna ports to the terminal (UE-a) and configure eight CSI-RS antenna $$p = \begin{cases} p' + \dfrac{N_{ports}^{group}}{2} i, & \text{for } p' \in \left\{ 0, \ldots, \dfrac{N_{ports}^{group}}{2} - 1 \right\} \\ p' + \dfrac{N_{ports}^{group}}{2} (i + N_{group} - 1), & \text{for } p' \in \left\{ \dfrac{N_{ports}^{group}}{2}, \ldots, N_{ports}^{group} - 1 \right\} \end{cases}$$

[Equation 7]

In detail, when the base station notifies the terminal of the port number mappings (Mpr2, Mpr3, and Mpr4) exemplified in FIG. 26A based on the method Mc221, the terminal may substitute the existing port numbers with new port numbers according to Equation 7. In the case of the port number mapping Mpr2, $N_{group}$ is 2, and $N_{ports}^{group}$ is 8. In the case of the port number mapping Mpr3, $N_{group}$ is 4, and $N_{ports}^{group}$ is 4. In the case of the port number mapping Mpr4, $N_{group}$ is 8, and $N_{ports}^{group}$ is 2.

For example, when the terminal is configured with the port number mapping Mpr2 by the base station, the sixteen CSI-RS antenna ports configured to the terminal are assumed to be an aggregation of two component CSI-RS configurations each of which has eight ports. In this instance, as described above, each CSI-RS antenna port group may correspond to the component CSI-RS configuration. According to Equation 7, the terminal may maintain the existing port numbers 15 to 18 of the component CSI-RS ports that correspond to four left columns from among the sixteen CSI-RS antenna ports to the terminal (UE-b), the base station may indicate the terminal (UE-a) to follow the CSI-RS antenna port number mapping (Mpr2) exemplified in FIG. 26B according to an exemplary embodiment of the above-described method Mc221.

Through this, the eight CSI-RS antenna ports of the terminal (UE-a) configured with sixteen CSI-RS antenna ports and the eight CSI-RS antenna ports of the terminal (UE-b) configured with eight CSI-RS antenna ports may be mapped on the same RE.

Figure 28:
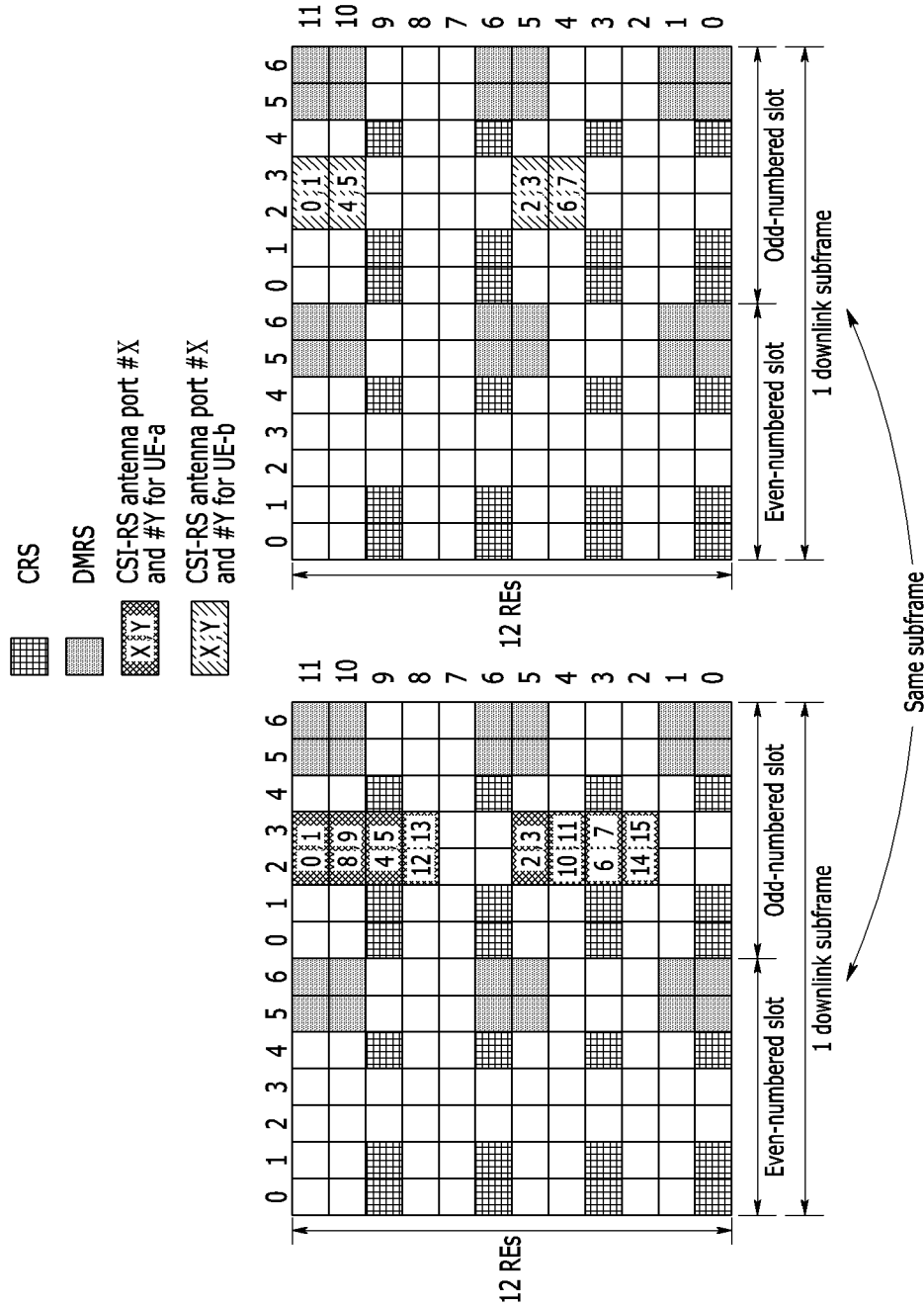
FIG. 28 shows a configuration of a CSI-RS resource to a plurality of terminals when a method Mc220 is used according to an exemplary embodiment of the present invention.

FIG. 28 shows a configuration of a CSI-RS resource for a plurality of terminals when a method Mc220 is used according to an exemplary embodiment of the present invention.

In detail, FIG. 28 exemplifies CSI-RS RE mapping on the terminal (UE-a) and the terminal (UE-b) when the port number mapping in the CSI-RS antenna port array exemplified in FIG. 27 is used. In this instance, the case in which the two component CSI-RS configuration with eight ports that are aggregated to configure the total of sixteen CSI-RS antenna ports to the terminal (UE-a) is exemplified. For example, the RE(2, 11), RE(3, 11), RE(2, 10), RE(3, 10), RE(2, 9), RE(3, 9), RE(2, 8), RE(3, 8), RE(2, 5), RE(3, 5), RE(2, 4), RE(3, 4), RE(2, 3), RE(3, 3), RE(2, 2), and RE(3, 2) of the slot1 in a subframe are configured as the CSI-RS REs (e.g., CSI-RS antenna ports of the number 0 to the number 15) for the terminal (UE-a). The RE(2, 11), RE(3, 11), RE(2, 10), RE(3, 10), RE(2, 5), RE(3, 5), RE(2, 4), and RE(3, 4) of the slot1 in a same subframe are configured as the CSI-RS REs (e.g., CSI-RS antenna ports of the number 0 to the number 7) for the terminal (UE-b).

The terminal (UE-a) may assume the port number mapping of FIG. 26B when performing a CSI measurement and report. In this case, the terminal (UE-a) may assume, according to the relationship between the mapping of FIG. 27 and the mapping of FIG. 26B, that the port numbers 8 and 9 are mapped on the RE(2, 10) and RE(3, 10) of the slot1 on which the existing port numbers 4 and 5 were mapped, the port numbers 10 and 11 are mapped on the RE(2, 4) and RE(3, 4) of the slot1 on which the existing port numbers 6 and 7 were mapped, the port numbers 4 and 5 are mapped on the RE(2, 9) and RE(3, 9) of the slot1 on which the existing port numbers 8 and 9 were mapped, and the port numbers 6 and 7 are mapped on the RE(2, 3) and RE(3, 3) of the slot1 on which the existing port numbers 10 and 11 were mapped. The CSI-RS antenna ports of the number 0 to the number 3 and of the number 8 to the number 11 from among the sixteen CSI-RS antenna ports (the number 0 to the number 15) configured to the terminal (UE-a) may share the same CSI-RS RE set as the CSI-RS antenna ports of the number 0 to the number 7 configured to the terminal (UE-b). That is, the RE(2, 11), RE(3, 11), RE(2, 10), RE(3, 10), RE(2, 5), RE(3, 5), RE(2, 4), and RE(3, 4) of the slot1 in the same subframe are shared by the CSI-RS antenna ports of the number 0 to the number 3 and of the number 8 to the number 11 of the terminal (UE-a) and the CSI-RS antenna ports of the number 0 to the number 7 of the terminal (UE-b).

This may reduce the CSI-RS transmission overhead by a third, compared to the CSI-RS resource configuring method exemplified in FIG. 25A. Similarly, when the base station attempts to configure sixteen CSI-RS antenna ports to the terminal (UE-a) and configure four or two CSI-RS antenna ports to the terminal (UE-b), the base station may indicate the terminal (UE-a) to follow the CSI-RS antenna port number mapping rule (Mpr3) or the CSI-RS antenna port number mapping rule (Mpr4) exemplified in FIG. 26A according to an exemplary embodiment of the above-described method Mc220. In this instance, the terminal (UE-b) may be a legacy terminal that may not be configured with sixteen CSI-RS antenna ports.

An exemplary embodiment exemplified in FIG. 26A and FIG. 26B is a method for the sixteen CSI-RS antenna ports, which is an example, and the principle of mapping the CSI-RS antenna port numbers applied thereto may be similarly applied to the case in which CSI-RS antenna ports with a different number are configured. In this instance, when the number of CSI-RS antenna ports is established to be N, a method for defining the CSI-RS antenna port number mapping or CSI-RS antenna port number mapping rule by the number of submultiples of N may be considered. When the terminal is configured with a number of CSI-RS antenna ports on the vertical axis that is greater than 1, the above-described method may only be applied to the horizontal axis and the polarization axis in a like manner of an exemplary embodiment exemplified in FIG. 26A and FIG. 26B.

FIG. 29A, FIG. 29B, FIG. 29C, FIG. 29D, and FIG. 29E show a plurality of rules for mapping antenna port numbers usable for a method Mc221 according to another exemplary embodiment of the present invention.

In detail, FIG. 29A to FIG. 29E show a method for mapping port numbers 0 to 15 on sixteen CSI-RS antenna ports composed with a horizontal axis, a vertical axis, and a polarization axis.

Similar to the principle applied to an exemplary embodiment exemplified in FIG. 26B, the CSI-RS antenna port group mapping rules exemplified in FIG. 29A to FIG. 29E divide the entire CSI-RS antenna ports into one or a plurality of CSI-RS antenna port groups, and sequentially apply CSI-RS antenna port numbers in a specific order (e.g., in order of the horizontal axis, the polarization axis, and the vertical axis) in each CSI-RS antenna port group.

Figure 29A:
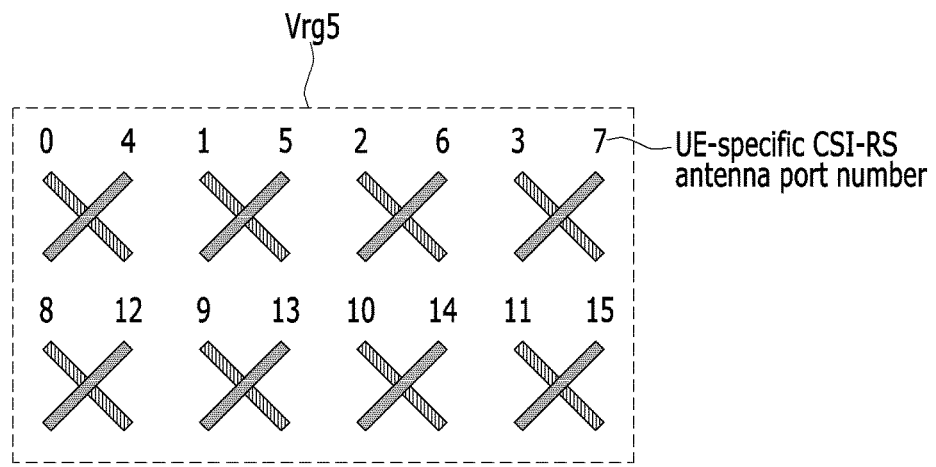
FIG. 29A, FIG. 29B, FIG. 29C, FIG. 29D, and FIG. 29E show a plurality of rules for mapping antenna port numbers usable for a method Mc221 according to another exemplary embodiment of the present invention.

In detail, in the case of the port number mapping exemplified in FIG. 29A, sixteen CSI-RS antenna ports are divided into one CSI-RS antenna port group Vrg5. In another way, in the case of the port number mapping exemplified in FIG. 29B, sixteen CSI-RS antenna ports are divided into two CSI-RS antenna port groups (Vrg6a and Vrg6b). In another way, in the case of the port number mapping exemplified in FIG. 29C, sixteen CSI-RS antenna ports are divided into four CSI-RS antenna port groups (Vrg7a, Vrg7b, Vrg7c, and Vrg7d). In another way, in the case of the port number mapping exemplified in FIG. 29D, sixteen CSI-RS antenna ports are divided into four CSI-RS antenna port groups (Vrg8a, Vrg8b, Vrg8c, and Vrg8d). In another way, in the case of the port number mapping exemplified in FIG. 29E, sixteen CSI-RS antenna ports are divided into eight CSI-RS antenna port groups (Vrg9a, Vrg9b, Vrg9c, Vrg9d, Vrg9e, Vrg9f, Vrg9g, and Vrg9h). In this instance, the numbers of CSI-RS antenna ports included in the CSI-RS antenna port group exemplified in FIG. 29A to FIG. 29E are 16, 8, 4, 4, or 2, and may be submultiples of 16 that is the total number of the CSI-RS antenna ports.

When the method Mc221 is used, the base station may notify the terminal configured with sixteen CSI-RS antenna ports of one of CSI-RS antenna port number mappings exemplified in FIG. 29A to FIG. 29E. As described above, the terminal may reorder the CSI-RS antenna port numbers by considering the relationship between the CSI-RS antenna port number mapping (one of the CSI-RS antenna port number mappings exemplified in FIG. 29A to FIG. 29E) configured by the base station and the port number mapping assumed when a CSI measurement and report is performed.

Figure 29B:
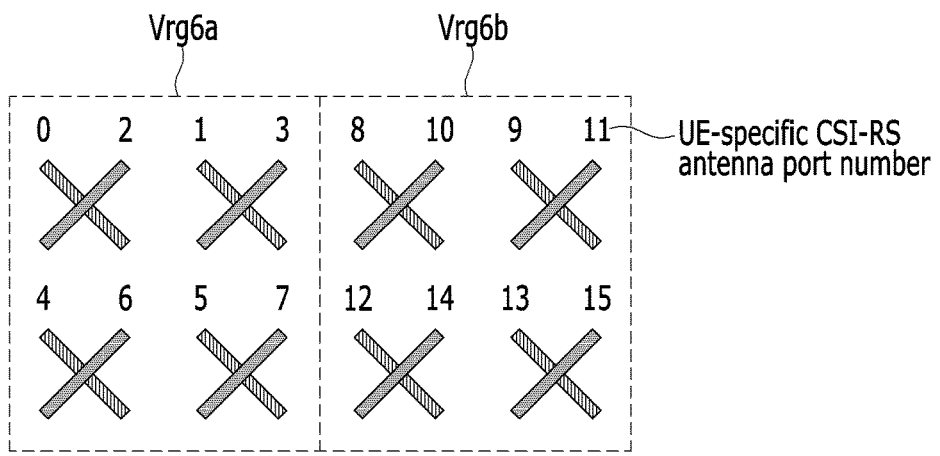
Figure 29C:
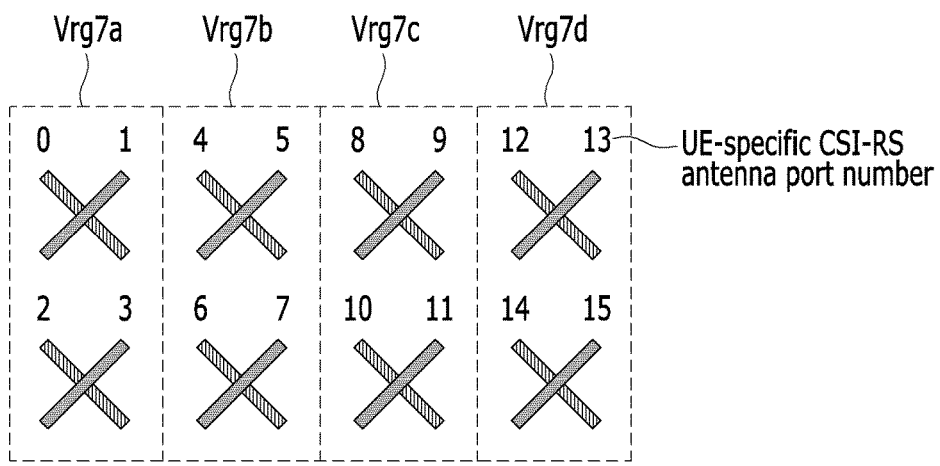
Figure 29D:
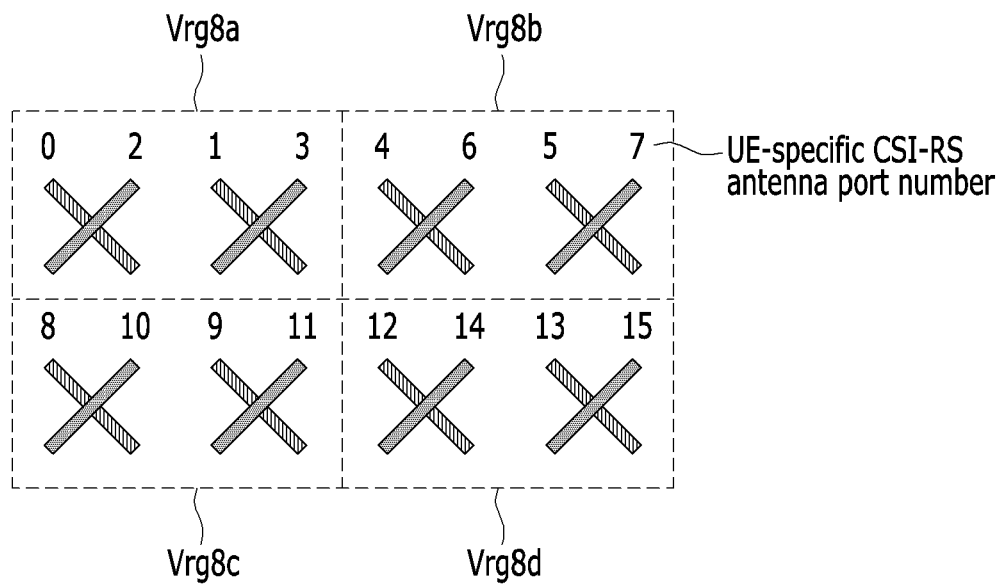
Figure 29E:
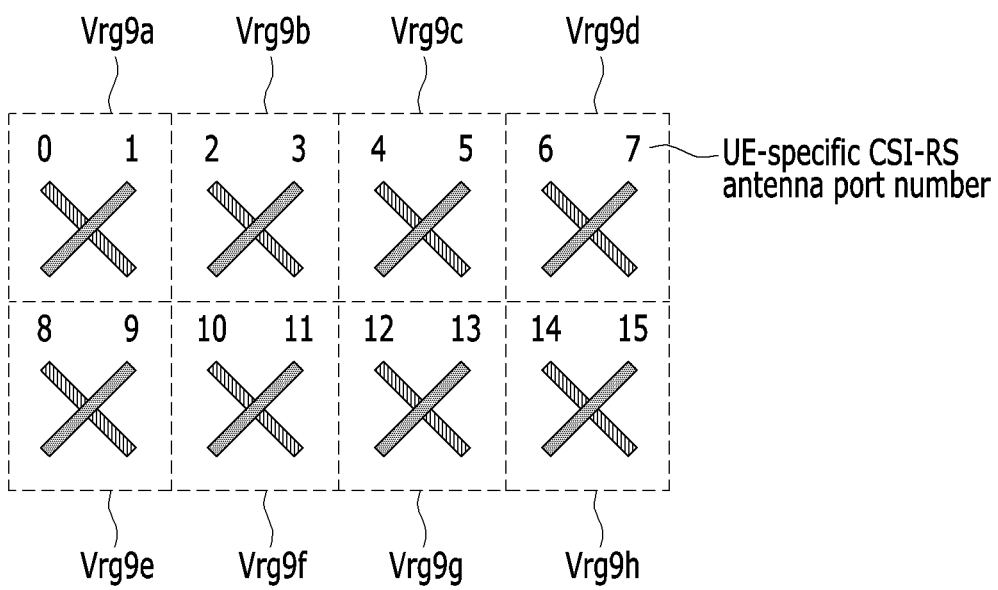

For example, assuming that the port number mapping exemplified in FIG. 29A when the terminal performs a CSI measurement and report, and assuming that the terminal is configured with the CSI-RS antenna port number mapping exemplified in FIG. 29C by the base station from among the CSI-RS antenna port number mappings exemplified in FIG. 29A to FIG. 29E, the terminal may consider the CSI-RS antenna port numbers of the mapping exemplified in FIG. 29C configured by the base station as existing port numbers, may consider the CSI-RS antenna port numbers of the mapping exemplified in FIG. 29A assumed when performing a CSI measurement and report as new port numbers, and may substitute the existing port numbers with new port numbers. That is, the terminal may substitute the existing CSI-RS antenna port numbers 0 to 15 with the numbers 0, 4, 8, 12, 1, 5, 9, 13, 2, 6, 10, 14, 3, 7, 11, and 15 according to the relationship between the mapping of FIG. 29C and the mapping of FIG. 29A.

For another example, when the method Mc221 is used, the base station may notify the terminal configured with sixteen CSI-RS antenna ports of one of the CSI-RS antenna port number mappings exemplified in FIG. 29A to FIG. 29C.

In the example of FIG. 29A to FIG. 29E, the base station may notify the terminal of one of 1, 2, 4, and 8 as the number of the CSI-RS antenna port group based on the method Mc222. In another way, the base station may notify the terminal of one of 16, 8, 4, and 2 as the size of the CSI-RS antenna port group based on the method Mc223. The number and size of the CSI-RS antenna port group for the mapping exemplified in FIG. 29C are the same as the number and size of the CSI-RS antenna port groups for the mapping exemplified in FIG. 29D, so when the method Mc222 or the method Mc223 is used, the mapping exemplified in FIG. 29C may not be distinguished from the mapping exemplified in FIG. 29D. Therefore, when the method Mc222 or the method Mc223 is used, it is needed to define different mappings to not have the same number and size of the CSI-RS antenna port groups. For example, for the method Mc222 or the method Mc223, one of the mapping exemplified in FIG. 29C and the mapping exemplified in FIG. 29D may be used.

As exemplified in FIG. 29A to FIG. 29E, when the CSI-RS antenna ports are disposed on the vertical axis as well as the horizontal axis and the polarization axis, the method for grouping the CSI-RS antenna ports may be further diversified, differing from an exemplary embodiment exemplified in FIG. 26B.

The method Mc220 may be implemented in a simple form without a concept of the CSI-RS antenna port group. For example, the base station may notify the terminal of what mapping order from among the mapping orders for the method Mc100 to apply to the CSI-RS antenna port number mapping. That is, a mapping order for the method Mc100 for counting the CSI-RS antenna port numbers in order of the horizontal axis, the polarization axis, and the vertical axis, and a mapping order for the method Mc100 for counting the CSI-RS antenna port numbers in order of the vertical axis, the horizontal axis, and the polarization axis may be predefined, and the base station may indicate the terminal to use one of the two mapping orders through 1-bit signaling.

According to the method Mc220, when the number of the CSI-RS antenna port number mapping is less, the signaling overhead is small, but the signaling overhead increases in proportion to the logarithmic function with a base of 2 according to the number of CSI-RS antenna port number mappings. Therefore, when the number of the CSI-RS antenna port number mappings is very large, the method Mc220 may be inefficient.

3.3. A Method for Configuring Various Numbers of CSI-RS Antenna Ports

The base station may have various one-dimensional or two-dimensional antenna shapes and antenna array sizes. Regarding various sizes of transmitting antenna shapes, in order for the terminal to perform efficient CSI measurement, it is important for the terminal to be configured with various numbers of CSI-RS antenna ports. For example, a method for configuring 3, 5, 6, or 7 CSI-RS antenna ports to the terminal in addition to the 1, 2, 4, or 8 CSI-RS antenna ports according to the existing standard can be considered. When the number of CSI-RS antenna ports is extended, for example, there may be a method for configuring the number of CSI-RS antenna ports of the exponentiation of 2 (e.g., 16, 32, or 64) to the terminal, and a method for configuring further various numbers of CSI-RS antenna ports such as an arbitrary natural number or an arbitrary even number to the terminal may also be considered. To make it possible for the terminal to be configured with various numbers of CSI-RS antenna ports, the existing CSI-RS configuring method may need to be extended or improved.

In the case of the above-described methods, the terminal uses the entire CSI-RS antenna ports configured to the terminal to perform a CSI measurement and report. A method (hereinafter, 'method Mc300') for a terminal to perform a CSI measurement and report by using part of CSI-RS antenna ports configured to the terminal will now be described.

In method Mc300, the base station may notify the terminal of CSI-RS antenna ports to be used by the terminal to the actual CSI measurement and report from among the CSI-RS antenna ports configured to the terminal according to CSI-RS configuration signaling, through signaling. In the present specification, the CSI-RS antenna port selected by the method Mc300 and used for the CSI measurement and report by the terminal will be referred to as a valid CSI-RS antenna port. The terminal may newly provide port numbers to the valid CSI-RS antenna ports for the CSI measurement and report. In this instance, the port number provided to the valid CSI-RS antenna port will be referred to as a valid CSI-RS antenna port number.

In the method Mc300, the number of CSI-RS antenna ports configurable to the terminal by a CSI-RS configuration signaling may be restrictive. For example, the number of CSI-RS antenna ports configurable to the terminal by a CSI-RS configuration signaling may include 1, 2, 4, and 8. For another example, the number of CSI-RS antenna ports configurable to the terminal by CSI-RS configuration signaling may include 1, 2, 4, 8, 12, and 16. On the contrary, the number of valid CSI-RS antenna ports may have further various values. For example, the base station may configure eight CSI-RS antenna ports to the terminal by using a CSI-RS configuration signaling of the existing standard, and may use the method Mc300 to configure only five of the CSI-RS antenna ports as valid CSI-RS antenna ports.

In the method Mc300, a method for the base station to notify the terminal of valid CSI-RS antenna ports will now be described.

A method Mc310 represents a method for notifying the terminal of validity (or effectiveness) of the respective CSI-RS antenna ports configured to the terminal.

When the number of CSI-RS antenna ports configured to the terminal is N, a method for signaling a bitmap with a length of N to the terminal may be used for the method Mc310. The terminal may know the validity of the respective CSI-RS antenna ports through binary information of respective bits included in the bitmap. For example, when the terminal (UE-a) is configured with a CSI-RS as exemplified in FIG. 25A, the base station may signal the bitmap of 1111100010100111 to the corresponding terminal (UE-a) according to the method Mc310. In this instance, when the respective bits included in the bitmap are 1, it may signify that the corresponding CSI-RS antenna port is valid (i.e., used for the CSI measurement and report), and when they are 0, it may signify that the corresponding CSI-RS antenna port is not valid. It is assumed that a most significant bit (MSB) of the bitmap corresponds to a CSI-RS antenna port of the number 0 (e.g., the number 15 in the LTE standard) configured to the terminal before the method Mc300 is applied, and the CSI-RS antenna port number increases when approaching a least significant bit (LSB) of the bitmap. The terminal (UE-a) may recognize, through the receiving of the bitmap of 1111100010100111, that the total of ten CSI-RS antenna ports are valid from among the total of sixteen CSI-RS antenna ports originally configured by the CSI-RS configuration signaling. Here, the ten selected valid CSI-RS antenna ports correspond to the bits with the value of 1 from among the bits of the bitmap of 1111100010100111. In this instance, valid CSI-RS antenna port numbers from 0 to 9 may be provided to the ten valid CSI-RS antenna ports. In this case, the RE mapping on the CSI-RS antenna ports finally configured to the terminal (UE-a) may be like the example exemplified in FIG. 30.

Figure 30:
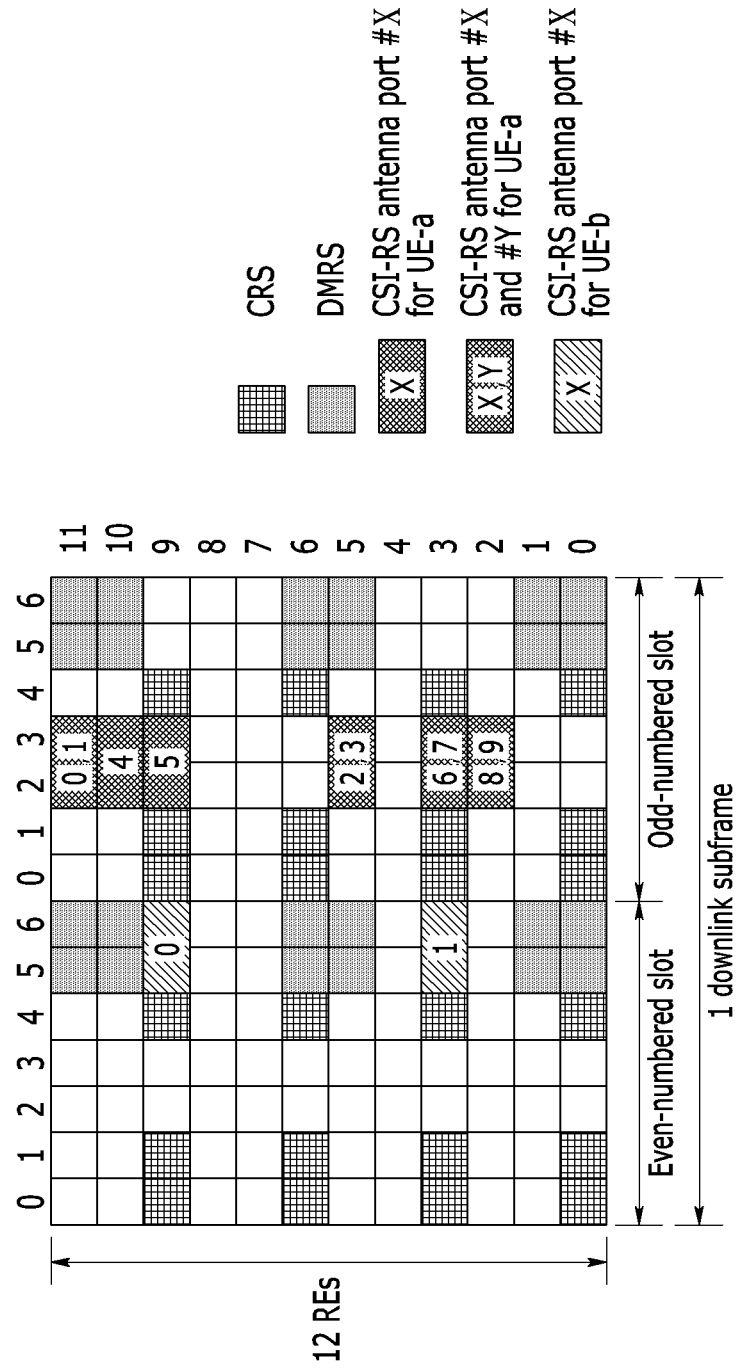
FIG. 30 shows a configuration of a CSI-RS resource when a method Mc310 is used according to an exemplary embodiment of the present invention.

FIG. 30 shows a configuration of a CSI-RS resource when a method Mc310 is used according to an exemplary embodiment of the present invention.

The RE(2, 11), RE(3, 11), RE(2, 10), RE(3, 10), RE(2, 9), RE(3, 9), RE(2, 5), RE(3, 5), RE(2, 3), RE(3, 3), RE(2, 2), and RE(3, 2) of the slot1 in the subframe are configured as the CSI-RS REs (e.g., valid CSI-RS antenna ports of the number 0 to the number 9) for the terminal (UE-a). Particularly, one valid CSI-RS antenna port (the number 4) for the terminal (UE-a) is mapped on the RE(2, 10) and RE(3, 10) of the slot1 in the subframe, and one valid CSI-RS antenna port (the number 5) for the terminal (UE-a) is mapped on the RE(2, 9) and RE(3, 9) of the slot1 in the subframe. The terminal (UE-a) may perform the CSI measurement and report by only using the ten selected valid CSI-RS antenna ports (the number 0 to the number 9).

For another example, when the terminal (UE-b) is configured with the CSI-RS as exemplified in FIG. 25A, the base station may signal the bitmap of 1010 to the terminal (UE-b) according to the method Mc310. The terminal (UE-b) may recognize, through the receiving of the bitmap of 1010, that the total of two CSI-RS antenna ports are valid from among the total of the four CSI-RS antenna ports originally configured by the CSI-RS configuration signaling. Here, the two selected valid CSI-RS antenna ports correspond to the bits with the value of 1 from among the bits of the bitmap of 1010.

In this instance, the terminal (UE-b) may sequentially provide the port numbers of 0 and 1 to the two selected valid CSI-RS antenna ports. In this case, the RE mapping on the valid CSI-RS antenna ports configured to the terminal (UE-b) may be like the example of FIG. 30. For example, one valid CSI-RS antenna port (the number 0) for the terminal (UE-b) is mapped on the RE(5, 9) and RE(6, 9) of the slot0 in the subframe, and one valid CSI-RS antenna port (the number 1) for the terminal (UE-b) is mapped on the RE(5, 3) and RE(6, 3) of the slot0 in the subframe. The terminal (UE-b) may perform the CSI measurement and report by only using the two selected valid CSI-RS antenna ports (the number 0 and the number 1).

Two CSI-RS antenna ports (one port pair) to which the CDM is applied from among the CSI-RS antenna ports configured to the terminal by the CSI-RS configuration share two REs. That is, the CSI-RS antenna ports of the number 2k and the number 2k+1 (here, k=0, 1, 2, . . . ) according to the CSI-RS configuration before the method Mc300 is applied form a port pair, and may be transmitted through the same resource. In consideration of this, a method for signaling a bitmap with a length of N/2 to the terminal for the method Mc310 may be used when the number of CSI-RS antenna ports configured to the terminal is N. In this instance, the respective bits of the bitmap may signify validity of each CSI-RS antenna port pair combined through the CDM. For example, a first bit of the bitmap may correspond to the CSI-RS antenna ports of the number 0 and the number 1 according to the CSI-RS configuration, and a second bit of the bitmap may correspond to the CSI-RS antenna ports of the number 2 and the number 3 according to the CSI-RS configuration.

A method Mc320 represents a method for notifying of validity on respective rows and respective columns of the CSI-RS antenna port array configured to the terminal.

In a like manner of the method Mc310, a method for signaling a bitmap to the terminal may be used for the method Mc320. When respective numbers of horizontal-axis CSI-RS antenna ports and vertical-axis CSI-RS antenna ports configured to the terminal are established to be $N_1$ and $N_2$, the length of the bitmap signaled to the terminal may be a sum of $N_1$ and $N_2$. For example, assuming that $N_2$-numbered most significant bits of the bitmap indicate validity on the $N_2$-numbered rows, and $N_1$-numbered least significant bits of the bitmap indicate validity on the $N_1$-numbered columns, when the base station configures $N_2=2$ and $N_1=8$ to the terminal and signals the bitmap of 1011110000 to the terminal, the terminal may recognize, through the bitmap of 1011110000, that the first row is selected from two rows belonging to a CSI-RS antenna port array (2×8) configured to the terminal, and the first column to the fourth column are selected from eight columns belonging to the corresponding CSI-RS antenna port array (2×8).

Therefore, when the CSI-RS antenna ports configured to the terminal are disposed in two-dimensional array, the method Mc320 has a merit of reducing the length of the bitmap transmitted to the terminal. On the contrary, when the CSI-RS antenna ports configured to the terminal are disposed in one-dimensional array, the signaling overhead caused by the method Mc320 may be identical with the signaling overhead caused by the method Mc310. When the CSI-RS antenna port array is cross-polarization array as exemplified in FIG. 24 to FIG. 29E in the method Mc320, the respective bits of the bitmap signaled to the terminal may correspond to CSI-RS antenna port pair(s) with different polarizations.

As described above, when the terminal knows valid CSI-RS antenna ports through the method Mc310 or the method Mc320 in the method Mc300, the terminal may provide new port numbers to the valid CSI-RS antenna ports. In this instance, other methods in addition to the above-noted methods (e.g., method Mc100, method Mc101, method Mc200, method Mc220, etc.) may be used as the rule for mapping port numbers on the CSI-RS antenna port array. That is, for the method Mc300, the signaling method of the method Mc310 or the method Mc320 and the method for mapping port numbers on the CSI-RS antenna port array of the method Mc100 to method Mc220 may be combined and used. This will now be described with reference to FIG. 31.

Figure 31:
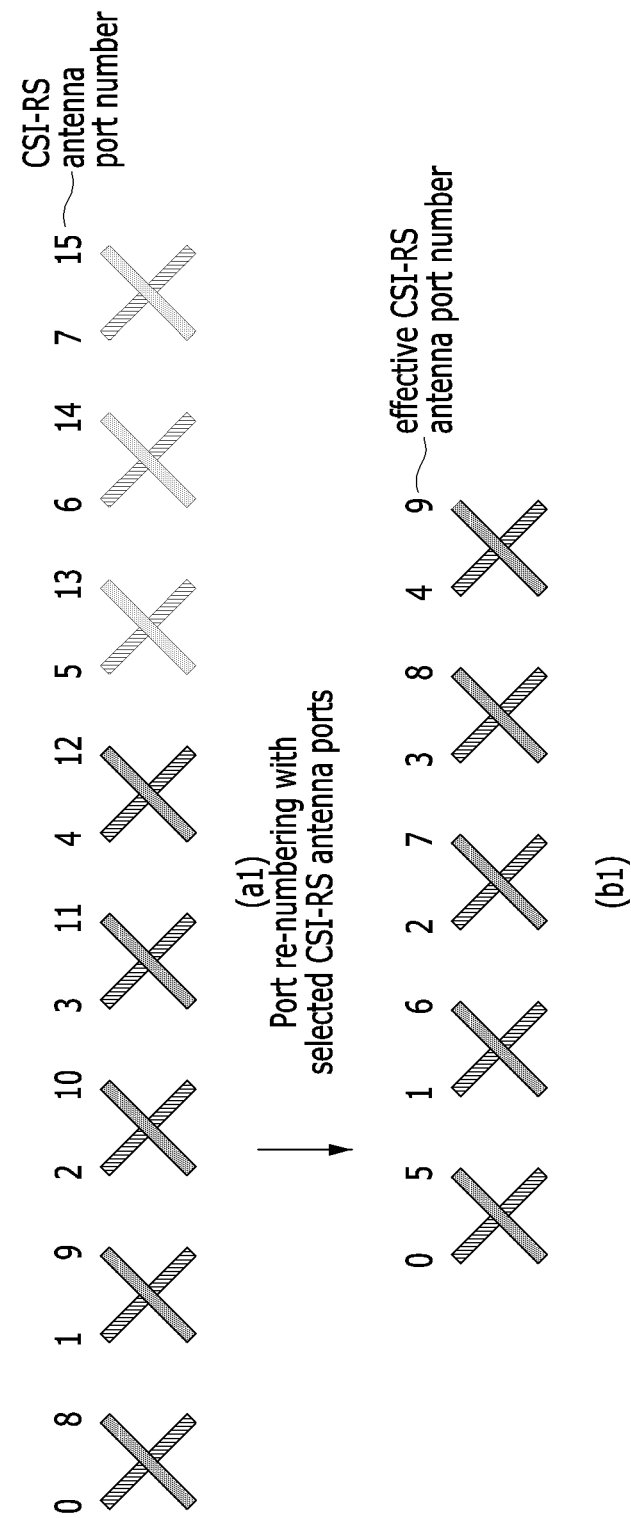
FIG. 31 shows mapping of a CSI-RS antenna port number when a method Mc310 is used according to an exemplary embodiment of the present invention.

FIG. 31 shows mapping of a CSI-RS antenna port number when a method Mc310 is used according to an exemplary embodiment of the present invention.

In detail, FIG. 31 exemplifies the case in which the base station configures sixteen CSI-RS antenna ports and $N_1=8$ and $N_2=1$ to the terminal (UE-a), and signals the bitmap of 1111100011111000 to the terminal (UE-a) based on the method Mc310. In this instance, as exemplified in (a1) of FIG. 31, the port numbers (the number 0 to the number 15) in the CSI-RS antenna port array may be provided in order of the horizontal axis and the polarization axis. The terminal (UE-a) may newly map valid (or effective) CSI-RS antenna port numbers of 0 to 9 on the total of ten valid CSI-RS antenna ports (port numbers 0 to 4 and port numbers 8 to 12) configured according to the method Mc310. For example, as exemplified in (b1) of FIG. 31, the terminal (UE-a) may provide valid CSI-RS antenna port numbers (0 to 9) to the ten selected valid CSI-RS antenna ports in order of the horizontal axis and the polarization axis. The terminal (UE-a) may perform a CSI measurement and report on the ten valid CSI-RS antenna ports (valid port numbers 0 to 9).

When the base station transmits a CSI-RS to the terminal in the method Mc300, a method (hereinafter, 'method Mc330') for the base station to transmit entire CSI-RS antenna ports (CSI-RS antenna ports before the method Mc300 is applied) to the terminal through CSI-RS configuration signaling may be used. In another way, when the base station transmits a CSI-RS to the terminal in the method Mc300, a method (hereinafter, 'method Mc331') for the base station to transmit only the valid CSI-RS antenna ports (e.g., CSI-RS antenna ports corresponding to the bits with the value of 1 from among the bits of the bitmap) to the terminal may be used.

When the method Mc331 is used, positions of REs on which the valid CSI-RS antenna ports are mapped may follow the RE mapping (before the CSI-RS antenna ports are selected by the method Mc300) according to the CSI-RS configuration signaling.

According to the existing standard, the terminal assumes, when performing PDSCH RE mapping and PDSCH rate matching, that the PDSCH is not mapped on the CSI-RS RE set configured by the CSI-RS configuration signaling. When the method Mc300 is used, it is needed to define whether the CSI-RS RE set on which the PDSCH is not mapped signifies an RE set (the CSI-RS RE set before the method Mc300 is used) of the CSI-RS antenna ports configured to the terminal by the CSI-RS configuration or a RE set of the valid CSI-RS antenna ports caused by the method Mc300. For example, assuming the terminal (UE-a) exemplified in FIG. 30, according to the definition on the former one for the CSI-RS RE set, the terminal (UE-a) may not receive the PDSCH from the RE(2, 4), RE(3, 4), RE(2, 8), and RE(3, 8) of the slot1. According to the definition on the latter one for the CSI-RS RE set, the terminal (UE-a) may receive the PDSCH from the RE(2, 4), RE(3, 4), RE(2, 8), and RE(3, 8) of the slot1. The method using the definition on the former one for the CSI-RS RE set may be considered for the case in which the method Mc330 or the method Mc331 is used for a CSI-RS transmission by the base station. The method using the definition on the former one for the CSI-RS RE set may be considered for the case in which the method Mc331 is applied to the CSI-RS transmission by the base station.

Other exemplary embodiments of the method Mc300 will now be described.

Figure 32A:
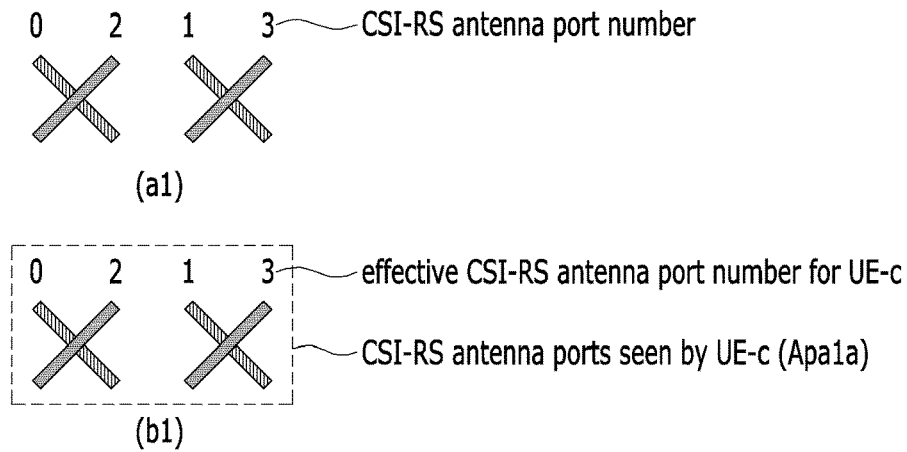
FIG. 32A, FIG. 32B, and FIG. 32C show another exemplary embodiment for a method Mc300.
Figure 32B:
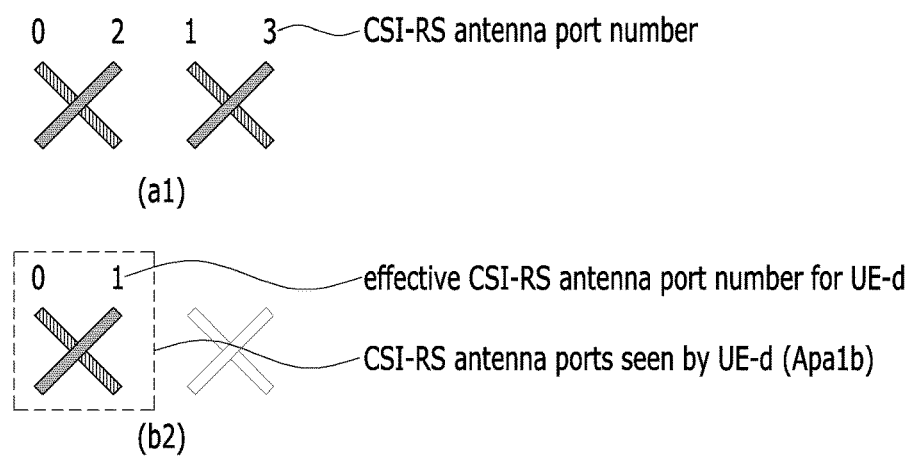
Figure 32C:
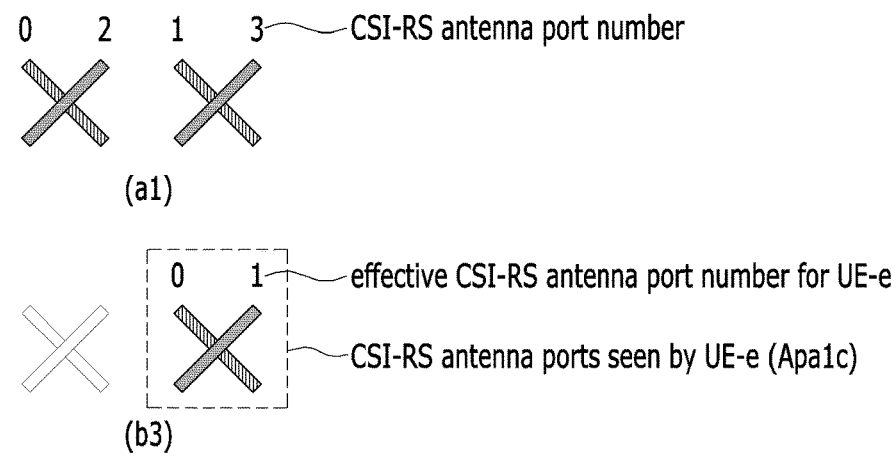

FIG. 32A, FIG. 32B, and FIG. 32C show another exemplary embodiment for a method Mc300.

In FIG. 32A to FIG. 32C, (a1) shows the case in which four CSI-RS antenna ports are disposed in one-dimensional cross-polarization array. Here, the cell-specific CSI-RS antenna port number is assumed to be mapped in order of the horizontal axis and the polarization axis.

In this instance, the base station may attempt to configure the terminal (UE-c), the terminal (UE-d), and the terminal (UE-e) to perform a CSI measurement and report on the cell-specific CSI-RS antenna ports of the number 0 to the number 3, the cell-specific CSI-RS antenna ports of the number 0 and the number 2, and the cell-specific CSI-RS antenna ports of the number 1 and the number 3.

A trivial method for this is to configure CSI-RSs of the respective terminals (UE-c, UE-d, and UE-e) to a different resource region not to be overlapped. In this instance, assuming that the CSI-RSs for the terminals (UE-c, UE-d, and UE-e) are configured to the same subframe, the total number of REs used for a CSI-RS transmission in one PRB pair is 8. On the contrary, when the method Mc300 and the method Mc310 are used, the base station may configure the CSI-RS transmission on three terminals (UE-c, UE-d, and UE-e) to occupy four REs in one PRB pair. In detail, the base station may configure four CSI-RS antenna ports to the terminal (UE-c), the terminal (UE-d), and the terminal (UE-e) through the same CSI-RS configuration signaling, and may additionally signal the bitmap of 1111 to the terminal (UE-c), the bitmap of 1010 to the terminal (UE-d), and the bitmap of 0101 to the terminal (UE-e) according to the method Mc310.

The terminal (UE-c) signaled with the bitmap of 1111 may provide valid port numbers (0 to 3) to the four CSI-RS antenna ports configured by the CSI-RS configuration signaling. Resultantly, as exemplified in (b1) of FIG. 32A, the terminal (UE-c) may perform a CSI measurement and report on the one-dimensional cross-polarization CSI-RS antenna port array (Apa1a) with the horizontal-axis length of 2.

The terminal (UE-d) signaled with the bitmap of 1010 may provide valid port numbers (the number 0 and the number 1) to the ports of the number 0 and the number 2 from among the four CSI-RS antenna ports configured by the CSI-RS configuration signaling. Resultantly, as exemplified in (b2) of FIG. 32B, the terminal (UE-d) may perform a CSI measurement and report on the cross-polarization CSI-RS antenna port array (Apa1b) with the horizontal-axis length of 1.

The terminal (UE-e) signaled with the bitmap of 0101 may provide valid port numbers (the number 0 and the number 1) to the ports of the number 1 and the number 3 from among the four CSI-RS antenna ports configured by the CSI-RS configuration signaling. Resultantly, as exemplified in (b3) of FIG. 32C, the terminal (UE-e) may perform a CSI measurement and report on the cross-polarization CSI-RS antenna port array (Apa1c) with the horizontal-axis length of 1.

As described, according to the method Mc300 and the method Mc310, the CSI-RS transmission overhead may be reduced to half, thereby acquiring an effect of increasing data transmission capacity.

Figure 33A:
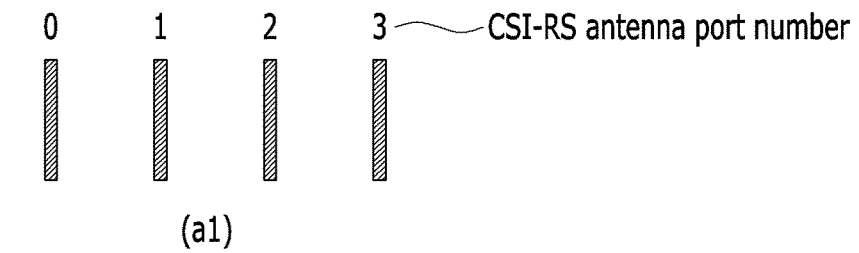
FIG. 33A, FIG. 33B, and FIG. 33C show the other exemplary embodiment for a method Mc300.
Figure 33A:
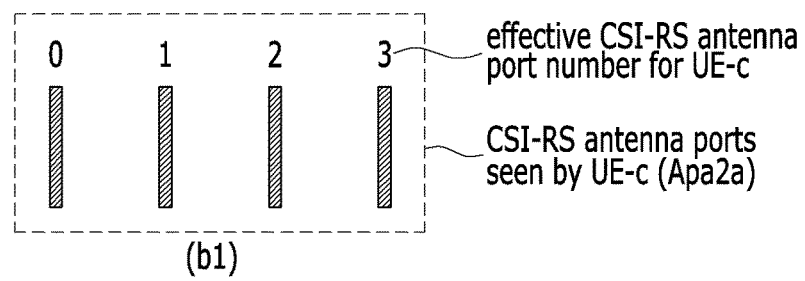
Figure 33B:
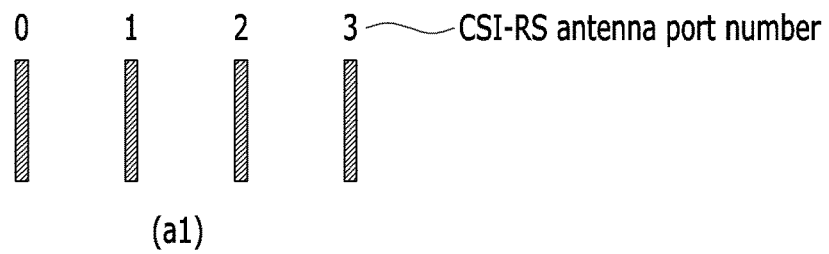
Figure 33B:
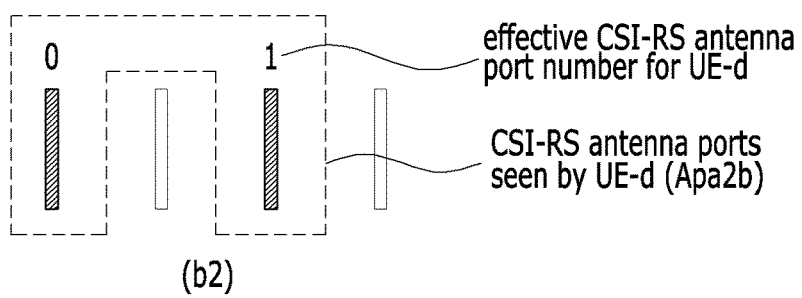
Figure 33C:
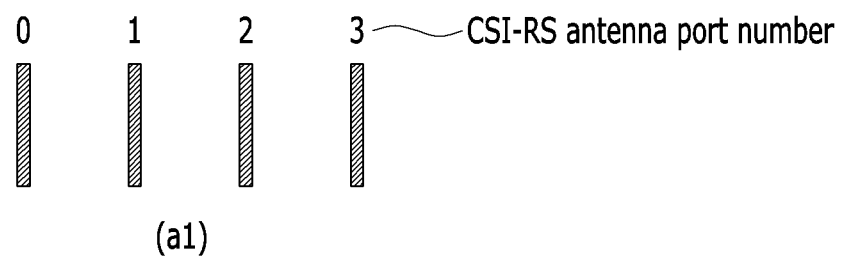
Figure 33C:
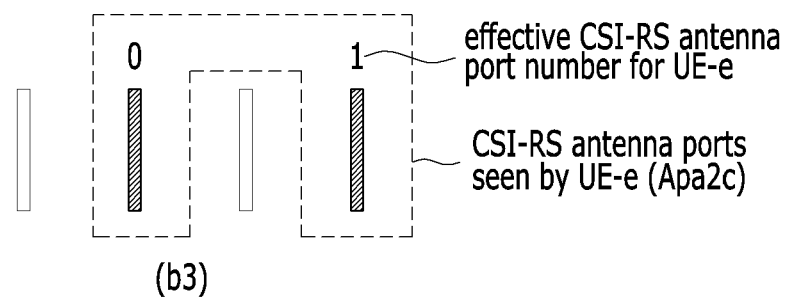

FIG. 33A, FIG. 33B, and FIG. 33C show the other exemplary embodiment for a method Mc300.

(a1) in FIG. 33A to FIG. 33C shows the case in which four CSI-RS antenna ports are disposed in the one-dimensional single polarization array.

In this instance, in a like manner of an exemplary embodiment exemplified in FIG. 32A to FIG. 32C, the base station may attempt to configure the terminal (UE-c), the terminal (UE-d), and the terminal (UE-e) to perform a CSI measurement and report on the cell-specific CSI-RS antenna ports of the number 0 to the number 3, the cell-specific CSI-RS antenna ports of the number 0 and the number 2, and the cell-specific CSI-RS antenna ports of the number 1 and the number 3.

For this, the base station may use the method Mc300 and the method Mc310, and may signal a CSI-RS resource configuration and a bitmap to the terminals (UE-c, UE-d, and UE-e) respectively in a like manner of an exemplary embodiment exemplified in FIG. 32A to FIG. 32C. In detail, the base station may configure four CSI-RS antenna ports to the terminals (UE-c, UE-d, and UE-e) through the same CSI-RS configuration signaling, and may additionally signal the bitmap of 1111 to the terminal (UE-c), the bitmap of 1010 to the terminal (UE-d), and the bitmap of 0101 to the terminal (UE-e).

The terminal (UE-c) signaled with the bitmap of 1111 may provide valid port numbers (0 to 3) to the four CSI-RS antenna ports configured by the CSI-RS configuration signaling. Resultantly, as exemplified in (b1) of FIG. 33A, the terminal (UE-c) may perform a CSI measurement and report on the one-dimensional single polarization CSI-RS antenna port array (Apa2a) with the length of 4.

The terminal (UE-d) signaled with the bitmap of 1010 may provide valid port numbers (the number 0 and the number 1) to the ports of the number 0 and the number 2 from among the four CSI-RS antenna ports configured by the CSI-RS configuration signaling. Resultantly, as exemplified in (b2) of FIG. 33B, the terminal (UE-d) may perform a CSI measurement and report on the one-dimensional single polarization CSI-RS antenna port array (Apa2b) with the length of 2.

The terminal (UE-e) signaled with the bitmap of 0101 may provide valid port numbers (the number 0 and the number 1) to the ports of the number 1 and the number 3 from among the four CSI-RS antenna ports configured by the CSI-RS configuration signaling. Resultantly, as exemplified in (b3) of FIG. 33C, the terminal (UE-e) may perform a CSI measurement and report on the one-dimensional single polarization CSI-RS antenna port array (Apa2c) with the length of 2.

In this instance, assuming one-to-one mapping between the CSI-RS antenna port and physical antenna element(s), a gap between physical antenna elements visible to the terminal (UE-d) and the terminal (UE-e) is twice a gap between physical antenna elements visible to the terminal (UE-c). That is, when following the method Mc300 and the method Mc310, a plurality of terminals may use a common CSI-RS transmission to perform a CSI measurement and report on antenna array with different antenna gaps. An effect of the resource configuration may be acquired with only four REs in a like manner of an exemplary embodiment exemplified in FIG. 32A to FIG. 32C.

Figure 34:
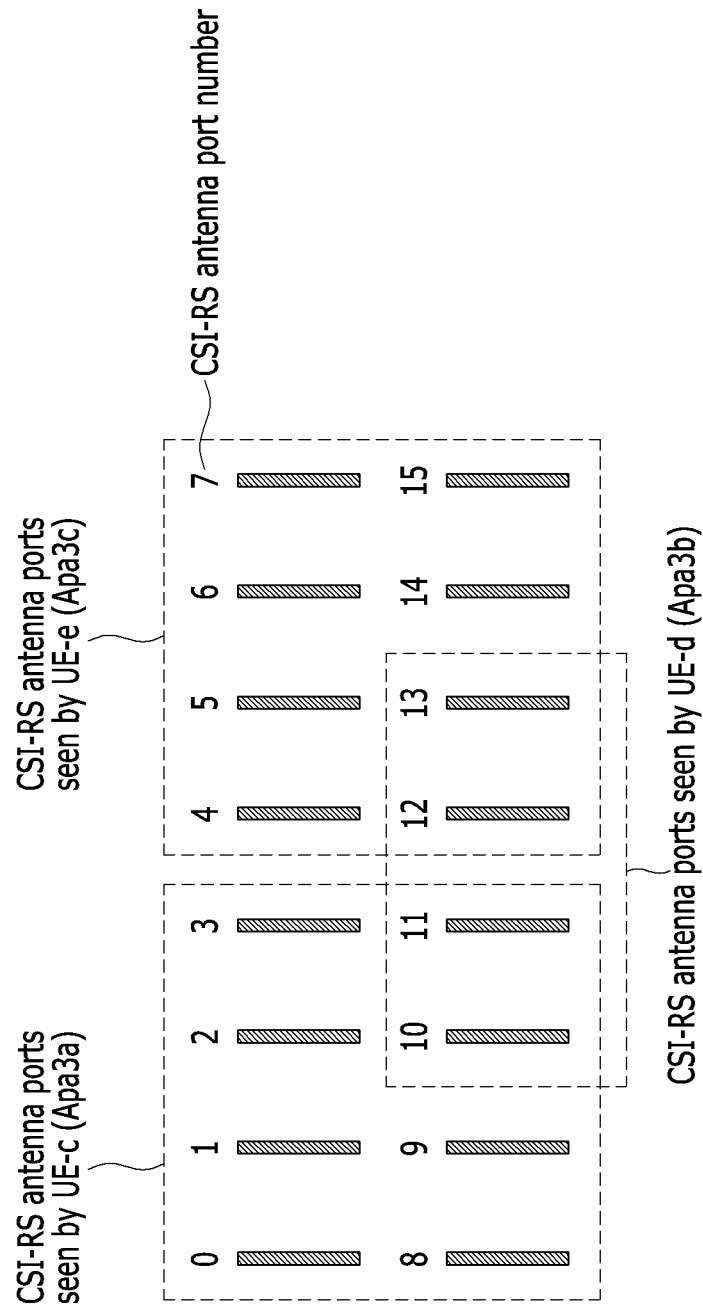
FIG. 34 shows the other exemplary embodiment for a method Mc300.

FIG. 34 shows the other exemplary embodiment for a method Mc300.

In detail, FIG. 34 exemplifies the case in which sixteen CSI-RS antenna ports are disposed in the two-dimensional single polarization array. In this instance, the number of CSI-RS antenna ports of the horizontal axis is 8 and the number of CSI-RS antenna ports of the vertical axis is 2. Here, the cell-specific CSI-RS antenna port number is assumed to be mapped in order of the horizontal axis and the vertical axis.

The base station may allow the terminal (UE-c) and the terminal (UE-e) to respectively perform a CSI measurement and report on four left columns and four right columns from among eight columns, and may allow the terminal (UE-d) to perform a CSI measurement and report on the cell-specific CSI-RS antenna ports of the number 10 and the number 13.

When the method Mc300 is used, the base station may allow the terminals (UE-c, UE-d, and UE-e) to perform the CSI-RS measurement and report operation by using the total of sixteen REs.

The base station may use the method Mc310 so as to notify the terminal of the selected CSI-RS antenna ports. In this case, the base station may configure sixteen CSI-RS antenna ports to the terminals (UE-c, UE-d, and UE-e) through the CSI-RS configuration signaling, and signal the bitmap of 1111000011110000 to the terminal (UE-c), the bitmap of 0000000000111100 to the terminal (UE-d), and the bitmap of 0000111100001111 to the terminal (UE-e).

The base station may also use the method Mc320 so as to notify the terminal of the selected CSI-RS antenna ports. In this case, the base station may configure sixteen CSI-RS antenna ports to the terminals (UE-c, UE-d, and UE-e) through the same CSI-RS configuration signaling, and may signal the bitmap of 1111110000 to the terminal (UE-c), the bitmap of 0100111100 to the terminal (UE-d), and the bitmap of 1100001111 to the terminal (UE-e). Here, it is assumed that $N_2$-numbered most significant bits (bits denoted to the left) indicate whether to use $N_2$-numbered rows (whether to provide a port number) in the bitmap according to the method Mc320, and $N_1$-numbered least significant bits (bits denoted to the right) indicate whether to use $N_1$-numbered columns (whether to provide a port number) in the bitmap according to the method Mc320.

The terminal (UE-c) signaled with the bitmap may provide valid port numbers (0 to 7) to the eight ports (port numbers 0 to 3 and 8 to 11) corresponding to first to fourth columns from among the sixteen CSI-RS antenna ports configured by the CSI-RS configuration signaling. Resultantly, the terminal (UE-c) may perform a CSI measurement and report on the two-dimensional single polarization CSI-RS antenna port array (Apa3a).

The terminal (UE-d) signaled with the bitmap may provide valid port numbers (0 to 3) to four ports (port numbers 10 to 13) from among the sixteen CSI-RS antenna ports configured by the CSI-RS configuration signaling. Resultantly, the terminal (UE-d) may perform a CSI measurement and report on the one-dimensional single polarization CSI-RS antenna port array (Apa3b).

The terminal (UE-e) signaled with the bitmap may provide valid port numbers (0 to 7) to eight ports (port numbers 4 to 7 and 12 to 15) corresponding to fifth to eight columns from among the sixteen CSI-RS antenna ports configured by the CSI-RS configuration signaling. Resultantly, the terminal (UE-e) may perform a CSI measurement and report on the two-dimensional single polarization CSI-RS antenna port array (Apa3c).

Detailed methods for the method Mc300 and the method Mc300 may be combined with detailed methods for the method Mc220 and the method Mc220 and then used.

3.4. A Two-Dimensional Crossed Array Composition of CSI-RS Antenna Ports

Figure 35:
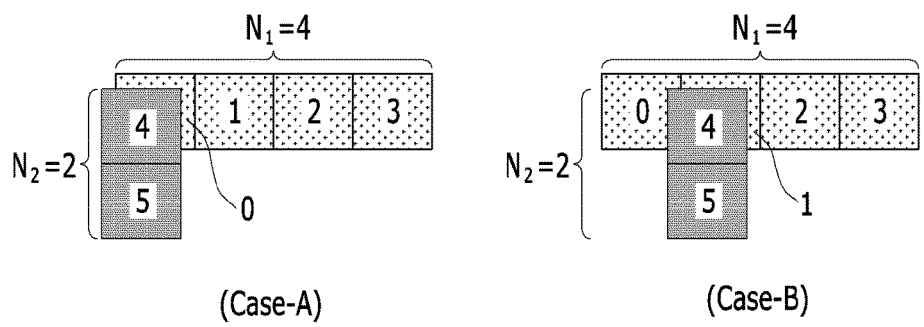
FIG. 35 shows a two-dimensional crossed array of CSI-RS antenna ports, indicating a two-dimensional crossed array in which CSI-RS antenna ports are duplicately allocated at an intersection of two one-dimensional arrays.
Figure 36:
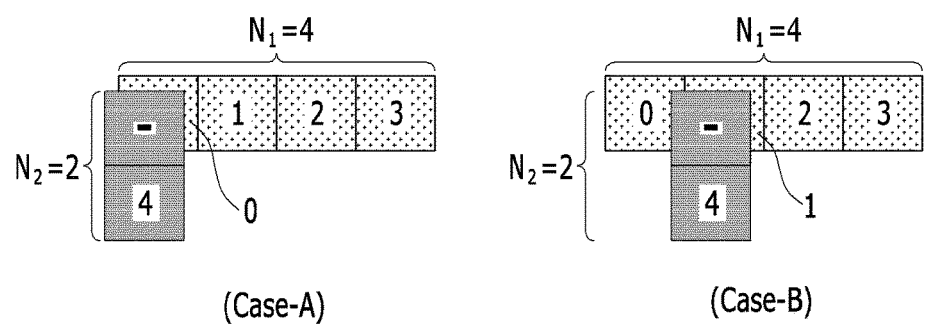
FIG. 36 shows a two-dimensional crossed array of CSI-RS antenna ports, indicating two-dimensional crossed array in which CSI-RS antenna ports are not duplicately allocated at an intersection of two one-dimensional arrays.

As exemplified in FIG. 35 and FIG. 36, a two-dimensional CSI-RS antenna port array with a structure in which two one-dimensional CSI-RS antenna port arrays are arranged on the horizontal axis and the vertical axis and cross each other may be considered.

FIG. 35 shows a two-dimensional crossed array of CSI-RS antenna ports, and in detail, it indicates a two-dimensional crossed array in which CSI-RS antenna ports are duplicately allocated at an intersection of two one-dimensional arrays.

(Case-A) exemplified in FIG. 35 represents the case in which an intersection of two one-dimensional arrays is a first element of horizontal array and a first element of vertical array. (Case-B) exemplified in FIG. 35 represents the case in which an intersection of two one-dimensional arrays is a second element of the horizontal array and the first element of the vertical array. (Case-A) and (Case-B) of FIG. 35 exemplify the case in which CSI-RS antenna ports (the number 0 to the number 3) are allocated in the horizontal array and CSI-RS antenna ports (the number 4 and the number 5) are allocated in the vertical array.

When the CSI-RS antenna port number is duplicately allocated to the intersection of two one-dimensional arrays, the total number of CSI-RS antenna ports configured to the terminal is a sum of $N_2$ and $N_1$. For example, in an exemplary embodiment exemplified in FIG. 35, the total number of CSI-RS antenna ports configured to the terminal is 6 (=2+4).

FIG. 36 shows a two-dimensional crossed array of CSI-RS antenna ports, and in detail, it indicates a two-dimensional crossed array in which CSI-RS antenna ports are not duplicately allocated at an intersection of two one-dimensional arrays. (Case-A) exemplified in FIG. 36 represents the case in which the intersection of two one-dimensional arrays is a first element of the horizontal array and a first element of the vertical array. (Case-B) exemplified in FIG. 36 represents the case in which the intersection of two one-dimensional arrays is a second element of the horizontal array and the first element of the vertical array. (Case-A) and (Case-B) of FIG. 36 exemplify the case in which CSI-RS antenna ports (the number 0 to the number 3) are allocated to the horizontal array and a CSI-RS antenna port of the number 4 is allocated to the vertical array.

When the CSI-RS antenna port number is not duplicately allocated to the intersection of the two one-dimensional arrays but one is allocated thereto, the total number of CSI-RS antenna ports configured to the terminal is $N_2+N_1-1$. For example, in an exemplary embodiment exemplified in FIG. 36, the total number of CSI-RS antenna ports configured to the terminal is 5 (=2+4-1).

The crossed array structure has a merit of a lesser amount of overhead used for the CSI-RS transmission compared to the structure of transmitting the CSI-RS to the entire elements of the two-dimensional or three-dimension array. However, it reduces channel information for the terminal to use for the CSI measurement so channel estimation accuracy may be degraded in the condition with a lesser correlation between rows (or columns) of the actual channel.

When the CSI-RS antenna ports are composed as the crossed array, it may be helpful in the CSI measurement and report that the terminal knows horizontal-axis and vertical-axis lengths of the two-dimensional CSI-RS antenna port array. Further, in this case, it may be helpful in the CSI measurement and report that the terminal knows the intersection position between the one-dimensional vertical array and the one-dimensional horizontal array or the CSI-RS antenna port number allocated to the corresponding intersection position. As a method for the terminal to acquire information on the intersection, two methods (Mc500 method and Mc501 method) may be considered.

The method Mc500 represents a method for a terminal to acquire an intersection of the vertical array and the horizontal array according to a predetermined rule. The method Mc501 represents a method for a base station to transmit information on the intersection of the vertical array and the horizontal array to a terminal.

In the method Mc500, the intersection may be variable with respect to time (e.g., for each subframe, periodically, etc.) according to a predetermined rule. Assuming expressing the entire two-dimensional array space on which horizontal-axis and vertical-axis CSI-RS antenna port arrays may be mapped as a two-dimensional matrix in which the number of columns is $N_1$ and the number of rows is $N_2$, the latter method (the intersection is fixed) may exemplarily establish the position of the intersection as an element point (1,1) of the two-dimensional matrix. For example, the former method (the intersection varies with respect to time) may establish the position of the intersection to be variable with respect to time on the vertical axis (i.e., the position of the intersection may sequentially become the element points (1,1), (2,1), . . . , ($N_2$,1) of the two-dimensional matrix).

As exemplified in FIG. 36, when one CSI-RS antenna port number is allocated to the intersection without duplication, one RE used for the CSI-RS transmission in one RB pair may be saved. For this, a method for configuring ($N_2+N_1-1$)-numbered CSI-RS antenna ports to the terminal may be needed. As one of the methods, when the base station independently configures the number of CSI-RS antenna ports in the horizontal-axis or vertical-axis to the terminal, the base station may apply the existing configuration to the terminal in the same way, and may allow the terminal to recognize that the number of CSI-RS antenna ports of one direction of the horizontal-axis and vertical-axis directions is less than the number of ports of the corresponding direction in the existing configuration by 1. In this instance, the terminal has to know the port numbers of the ($N_2+N_1-1$)-numbered CSI-RS antenna ports that is reduced by 1 compared to the existing configuration. A port number mapping rule may be predefined in the standard, or the base station may signal related information to the terminal.

Figure 37:
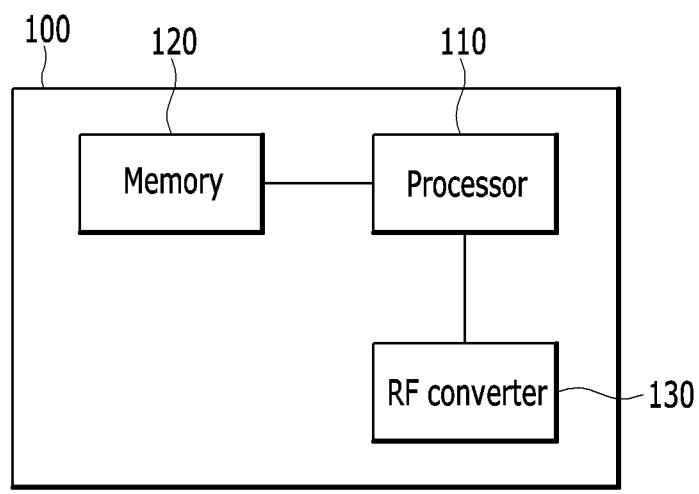
FIG. 37 shows a base station according to an exemplary embodiment of the present invention.

FIG. 37 shows a base station 100 according to an exemplary embodiment of the present invention.

The base station 100 includes a processor 110, a memory 120, and a radio frequency (RF) converter 130.

The processor 110 may be composed to realize functions, processes, and methods that are described in relation to the base station, cell, or TP in the present specification. Further, the processor 110 may control respective compositions of the base station 100.

The memory 120 is connected to the processor 110, and stores various kinds of information relating to an operation of the processor 110.

The RF converter 130 is connected to the processor 110, and transmits or receives radio signals.

Figure 38:
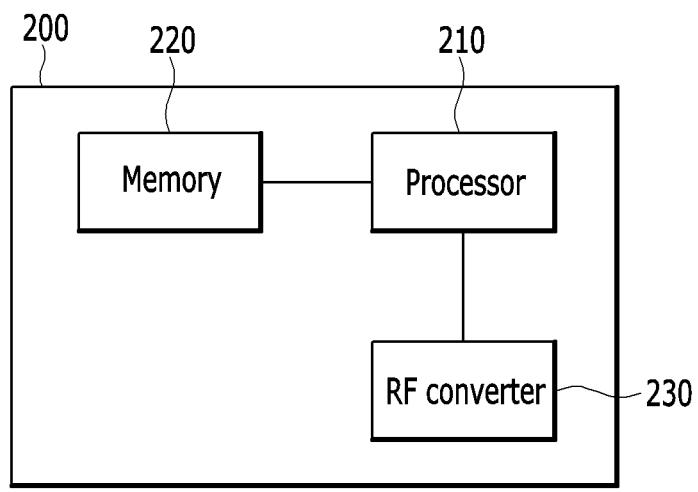
FIG. 38 shows a terminal according to an exemplary embodiment of the present invention.

FIG. 38 shows a terminal 200 according to an exemplary embodiment of the present invention.

The terminal 200 includes a processor 210, a memory 220, and an RF converter 230.

The processor 210 may be composed to realize functions, processes, and methods that are described in relation to the terminal in the present specification. Further, the processor 210 may control respective compositions of the terminal 200.

The memory 220 is connected to the processor 210, and stores various kinds of information relating to an operation of the processor 210.

The RF converter 230 is connected to the processor 210 and transmits or receives radio signals.

While this invention has been described in connection with what is presently considered to be practical exemplary embodiments, it is to be understood that the invention is not limited to the disclosed embodiments, but, on the contrary, is intended to cover various modifications and equivalent orderings included within the spirit and scope of the appended claims.

The invention claimed is:

1. A method for receiving channel state information (CSI)-reference signal (RS) by a terminal, the method comprising:
   receiving first information on a number of CSI-RS antenna ports of each port group and second information on a number of port from a base station;
   when the number of port groups is 2 and the number of CSI-RS antenna ports of each port group is 8, deriving port numbers of 8 first CSI-RS antenna ports belonging to a first port group and 8 second CSI-RS antenna ports belonging to a second port group based on the first information and the second information;

when the number of port groups is 3 and the number of CSI-RS antenna ports of each port group is 4, deriving port numbers of 4 third CSI-RS antenna ports belonging to a third port group, 4 fourth CSI-RS antenna ports belonging to a fourth port group, and 4 fifth CSI-RS antenna ports belonging to a fifth port group, based on the first information and the second information; and receiving the CSI-RS based on the derived port numbers.

2. The method of claim 1, wherein, the deriving of port numbers of 8 first CSI-RS antenna ports and 8 second CSI-RS antenna ports comprises:
deriving new port numbers of 15 to 30 for the 8 first CSI-RS antenna ports and the 8 second CSI-RS antenna ports, using 8 first existing port numbers of 15 to 22 of the 8 first CSI-RS antenna ports and 8 second existing port numbers of 15 to 22 of the 8 second CSI-RS antenna ports.

3. The method of claim 2, wherein, receiving the CSI-RS comprises:
receiving the CSI-RS using first resource elements and second resource elements,
wherein the 8 first CSI-RS antenna ports are mapped to the first resource elements using a first mapping rule based on the existing port numbers,
and the 8 second CSI-RS antenna ports are mapped to the second resource elements using the first mapping rule based on the existing port numbers $N_{ports}^{group}$ $N_{group}$.

4. The method of claim 1, wherein, the deriving of port numbers of 8 first CSI-RS antenna ports and 8 second CSI-RS antenna ports comprises:
deriving new port numbers of 15 to 30 for the 8 first CSI-RS antenna ports and the 8 second CSI-RS antenna ports using the following equation:

$$p = \begin{cases} p' + \frac{N_{ports}^{group}}{2} i, & \text{for } p' \in \left\{15, \ldots, 15 + \frac{N_{ports}^{group}}{2} - 1\right\} \\ p' + \frac{N_{ports}^{group}}{2}(i + N_{group} - 1), & \text{for } p' \in \left\{15 + \frac{N_{ports}^{group}}{2}, \ldots, 15 + N_{ports}^{group} - 1\right\} \end{cases}$$ [Equation]

(p: a new port number derived for a CSI-RS antenna port whose existing port number is p' and belonging to a port group whose index is i, p': an existing port number for each CSI-RS antenna port belonging to a port group whose index is i, $N_{ports}^{group}$: the number of CSI-RS antenna ports of each port group, $N_{group}$: the number of port groups, i: an index of a port group where CSI-RS antenna ports belong to, wherein i=0 for the first port group, i=1 for the second port group).

5. The method of claim 1, wherein, the deriving of port numbers of 4 third CSI-RS antenna ports, 4 fourth CSI-RS antenna ports, and 4 fifth CSI-RS antenna ports comprises:

deriving new port numbers of 15 to 26 for the 4 third CSI-RS antenna ports, the 4 fourth CSI-RS antenna ports, and the 4 fifth CSI-RS antenna ports, using 4 third existing port numbers of 15 to 18 of the 4 third CSI-RS antenna ports, 4 fourth existing port numbers of 15 to 18 of the 4 fourth CSI-RS antenna ports and 4 fifth existing port numbers of 15 to 18 of the 4 fifth CSI-RS antenna ports $N_{ports}^{group}$ $N_{group}$.

6. The method of claim 5, wherein, the receiving the CSI-RS comprises:

receiving the CSI-RS using third resource elements, fourth resource elements, and fifth resource elements, wherein the 4 third CSI-RS antenna ports are mapped to the third resource elements using a second mapping rule based on the existing port numbers, the 4 fourth CSI-RS antenna ports are mapped to the fourth resource elements using the second mapping rule based on the existing port numbers, and the 4 fifth CSI-RS antenna ports are mapped to the fifth resource elements using the second mapping rule based on the existing port numbers.

7. The method of claim 1, wherein the deriving of port numbers of 4 third CSI-RS antenna ports, 4 fourth CSI-RS antenna ports, and 4 fifth CSI-RS antenna ports comprises:

deriving new port numbers of 15 to 26 for the 4 third CSI-RS antenna ports, the 4 fourth CSI-RS antenna ports, and the 4 fifth CSI-RS antenna ports using the following equation:

$$p = \begin{cases} p' + \frac{N_{ports}^{group}}{2} i, & \text{for } p' \in \left\{15, \ldots, 15 + \frac{N_{ports}^{group}}{2} - 1\right\} \\ p' + \frac{N_{ports}^{group}}{2}(i + N_{group} - 1), & \text{for } p' \in \left\{15 + \frac{N_{ports}^{group}}{2}, \ldots, 15 + N_{ports}^{group} - 1\right\} \end{cases}$$ [Equation]

(p: a new port number derived for a CSI-RS antenna port whose existing port number is p' and belonging to a port group whose index is i, p': an existing port number for each CSI-RS antenna port belonging to the port group whose index is i, $N_{ports}^{group}$: the number of CSI-RS antenna ports of each port group, $N_{group}$: the number of port groups, i: an index of a port group where CSI-RS antenna ports belong to, wherein i=0 for the third port group, i=1 for the fourth port group, i=2 for the fifth port group).

8. The method of claim 1, further comprising:
measuring CSI based on the received CSI-RS and the derived port numbers.

9. The method of claim 8, further comprising:
reporting the measured CSI to the base station.

10. A method for transmitting channel state information (CSI)-reference signal (RS) by a base station, the method comprising:
  transmitting first information on a number of CSI-RS antenna ports of each port group and second information on a number of port groups to a terminal; and
  transmitting the CSI-RS to the terminal,
  wherein when the number of port groups is 2 and the number of CSI-RS antenna ports of each port group is 8, port numbers of 8 first CSI-RS antenna ports belonging to a first port group and port numbers of 8 second CSI-RS antenna ports belonging to a second port group are derived based on the first information and the second information, and,
  wherein when the when the number of port groups is 3 and the number of CSI-RS antenna ports of each port group is 4, port numbers of 4 third CSI-RS antenna ports belonging to a third port group, port numbers of 4 fourth CSI-RS antenna ports belonging to a fourth port group, and port numbers of 4 fifth CSI-RS antenna ports belonging to a fifth port group are derived based on the first information and the second information.

11. The method of claim 10, wherein when the number of port groups is 2 and the number of CSI-RS antenna ports of each port group is 8, new port numbers of 15 to 30 for the 8 first CSI-RS antenna ports and the 8 second CSI-RS antenna ports are derived by using 8 first existing port numbers of 15 to 22 of the 8 first CSI-RS antenna ports and 8 second existing port numbers of 15 to 22 of the 8 second CSI-RS antenna ports.

12. The method of claim 11, wherein the transmitting the CSI-RS comprises:
  transmitting the CSI-RS using first resource elements and second resource elements,
  wherein the 8 first CSI-RS antenna ports are mapped to the first resource elements using a first mapping rule based on the existing port numbers, and the 8 second CSI-RS antenna ports are mapped to the second resource elements using the first mapping rule based on the existing port numbers.

13. The method of claim 10, wherein new port numbers of 15 to 30 for the 8 first CSI-RS antenna ports and the 8 second CSI-RS antenna ports are derived by using the following equation:

$$p = \begin{cases} p' + \dfrac{N_{ports}^{group}}{2} i, & \text{for } p' \in \left\{15, \ldots, 15 + \dfrac{N_{ports}^{group}}{2} - 1\right\} \\ p' + \dfrac{N_{ports}^{group}}{2}(i + N_{group} - 1), & \text{for } p' \in \left\{15 + \dfrac{N_{ports}^{group}}{2}, \ldots, 15 + N_{ports}^{group} - 1\right\} \end{cases}$$ [Equation]

(p: a new port number derived for a CSI-RS antenna port whose existing port number is p' and belonging to a port group whose index is i, p': an existing port number for each CSI-RS antenna port belonging to a port group whose index is i, $N_{ports}^{group}$: the number of CSI-RS antenna ports of each port group, $N_{group}$: the number of port groups, i: an index of a port group where CSI-RS antenna ports belong to, wherein i=0 for the first port group, i=1 for the second port group).

14. The method of claim 10, wherein when the number of port groups is 3 and the number of CSI-RS antenna ports of each port group is 4, new port numbers of 15 to 26 for the 4 third CSI-RS antenna ports, the 4 fourth CSI-RS antenna ports, and the 4 fifth CSI-RS antenna ports are derived by using 4 third existing port numbers of 15 to 18 of the 4 third CSI-RS antenna ports, 4 fourth existing port numbers of 15 to 18 of the 4 fourth CSI-RS antenna ports, and 4 fifth existing port numbers of 15 to 18 of the 4 fifth CSI-RS antenna ports.

15. The method of claim 14, wherein the transmitting the CSI-RS comprises:
  transmitting the CSI-RS using third resource elements, fourth resource elements, and fifth resource elements,
  wherein the 4 third CSI-RS antenna ports are mapped to the third resource elements using a second mapping rule based on the existing port numbers,
  the 4 fourth CSI-RS antenna ports are mapped to the fourth resource elements using the second mapping rule based on the existing port numbers,
  and the 4 fifth CSI-RS antenna ports are mapped to the fifth resource elements using the second mapping rule based on the existing port numbers.

16. The method of claim 10, wherein,
new port numbers of 15 to 26 for the 4 third CSI-RS antenna ports, the 4 fourth CSI-RS antenna ports, and the 4 fifth CSI-RS antenna ports are derived by using the following equation:

$$p = \begin{cases} p' + \dfrac{N_{ports}^{group}}{2} i, & \text{for } p' \in \left\{15, \ldots, 15 + \dfrac{N_{ports}^{group}}{2} - 1\right\} \\ p' + \dfrac{N_{ports}^{group}}{2}(i + N_{group} - 1), & \text{for } p' \in \left\{15 + \dfrac{N_{ports}^{group}}{2}, \ldots, 15 + N_{ports}^{group} - 1\right\} \end{cases}$$ [Equation]

(p: a new port number derived for a CSI-RS antenna port whose existing port number is p' and belonging to a port group whose index is i, p': an existing port number for each CSI-RS antenna port belonging to the port group whose index is i, $N_{ports}^{group}$: the number of CSI-RS antenna ports of each port group, $N_{group}$: the number of port groups, i: an index of a port group where CSI-RS antenna ports belong to, wherein i=0 for the third port group, i=1 for the fourth port group, i=2 for the fifth port group).

17. The method of claim 10, further comprising:
receiving CSI reported from the terminal,
wherein the CSI is measured by the terminal based on the CSI-RS and the derived port numbers.

* * * * *

UNITED STATES PATENT AND TRADEMARK OFFICE
CERTIFICATE OF CORRECTION

| | |
|---|---|
| PATENT NO. | : 9,999,074 B2 |
| APPLICATION NO. | : 15/316544 |
| DATED | : June 12, 2018 |
| INVENTOR(S) | : Sung-Hyun Moon et al. |

It is certified that error appears in the above-identified patent and that said Letters Patent is hereby corrected as shown below:

In the Claims

Claim 1, Column 66, Line 61, change "a number of port from" to -- a number of port groups from --.

Signed and Sealed this
Seventh Day of March, 2023

Katherine Kelly Vidal
*Director of the United States Patent and Trademark Office*